US010102209B2

(12) United States Patent
Dorairajan et al.

(10) Patent No.: US 10,102,209 B2
(45) Date of Patent: Oct. 16, 2018

(54) SYSTEMS AND METHODS FOR ELECTRONICALLY GENERATING SUBMITTAL REGISTERS

(71) Applicant: PYPE INC, Chantilly, VA (US)

(72) Inventors: Sunil Dorairajan, Chantilly, VA (US); Karuna Ammireddy, Aldie, VA (US); Varadarajulu Pyda, Chantilly, VA (US)

(73) Assignee: PYPY INC, Chantilly, VA (US)

( * ) Notice: Subject to any disclaimer, the term of this patent is extended or adjusted under 35 U.S.C. 154(b) by 0 days.

(21) Appl. No.: 15/900,302

(22) Filed: Feb. 20, 2018

(65) Prior Publication Data

US 2018/0173711 A1 Jun. 21, 2018

Related U.S. Application Data

(63) Continuation of application No. 15/439,605, filed on Feb. 22, 2017.

(60) Provisional application No. 62/298,927, filed on Feb. 23, 2016.

(51) Int. Cl.
*G06F 17/30* (2006.01)
*G06F 17/24* (2006.01)
*G06F 17/27* (2006.01)

(52) U.S. Cl.
CPC ...... *G06F 17/30076* (2013.01); *G06F 17/241* (2013.01); *G06F 17/2705* (2013.01)

(58) Field of Classification Search
CPC ............ G06F 17/30076; G06F 17/241; G06F 17/2705
See application file for complete search history.

(56) References Cited

U.S. PATENT DOCUMENTS

| 7,064,848 B2* | 6/2006 | Jackson | G06F 3/1217 358/1.13 |
| 2005/0108232 A1* | 5/2005 | Rockey | G06Q 30/06 |
| 2008/0015918 A1* | 1/2008 | Pangrazio | G06Q 10/00 705/7.26 |
| 2012/0066213 A1* | 3/2012 | Ohguro | G06F 17/30654 707/723 |
| 2012/0102050 A1* | 4/2012 | Button | G06F 17/30867 707/749 |

OTHER PUBLICATIONS

NASA, "https://specsintact.ksc.nasa.gov/webhelp/PR/siSubmittal_Register.htm", www.nasa.gov, pp SpecsIntact Cited Sections (Year: 2015).*

(Continued)

*Primary Examiner* — Alexander Khong
(74) *Attorney, Agent, or Firm* — Arent Fox LLP

(57) ABSTRACT

A system and method for generating a submittal register for various construction projects or other items is disclosed. Among other things, the system and method include inputting the construction project specifications in a file format, such as PDF, into a web application interface to convert the same to a text file, applying an algorithm to the text file, identifying all required submittals into a spreadsheet, running a quality control check of the generated spreadsheet, applying an analysis program to the spreadsheet, generating final submittal register by the program, and delivering the final submittal register.

16 Claims, 58 Drawing Sheets

(56) References Cited

OTHER PUBLICATIONS

Wayback Machine, "https://specsintact.ksc.nasa.gov/webhelp/PR/siSubmittal_Register.htm" last saved date, Apr. 12, 2018, web.archive.org (Year 2018) (Year: 2018).*

* cited by examiner

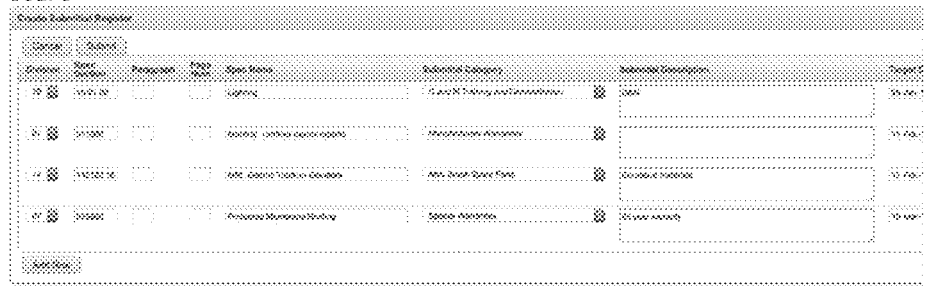

SYSTEMS AND METHODS FOR ELECTRONICALLY GENERATING SUBMITTAL REGISTERS

This application is a continuation of U.S. patent application Ser. No. 15/439,605, filed on Feb. 22, 2017, which claims priority to U.S. Provisional Patent Application No. 62/298,927, titled "Systems and Methods for Electronically Generating Submittal Registers," filed on Feb. 23, 2016, the entirety of each are hereby incorporated herein by reference.

FIELD OF THE INVENTION

Aspects of the present disclosure relate to methods and systems for managing data resources and more particularly to systems and methods for managing submittal of data electronically in construction projects.

BACKGROUND

In construction projects, the process of generating a submittal register is tedious and cumbersome. Most of the time, a team working on identifying and classifying required submittals for a construction project spends weeks of time on the tedious task of creating submittal registers, as well as revising and updating them with new information. Specifications received from various architects are voluminous and include a large amount of data. Further, reading and comprehending hundreds of pages of details from the specifications of a project to create an accurate submittal register within a stipulated time is nearly impossible. In such scenarios, most often the register thus created remains incomplete and thereby creates loopholes, which can affect the project results and/or the project schedule.

Hence, there remains an unmet need for systems and methods that generate a submittal register electronically, with higher efficiency and accuracy, and in a fraction of the time compared to traditional ways, along with less human effort.

SUMMARY

It is to be understood that this application is not limited to the particular systems and methods described, as there may be multiple possible embodiments that are not expressly illustrated in the present disclosure. It is also to be understood that the terminology used in the description is for the purpose of describing the particular versions or embodiments only, and is not intended to limit the scope of the present application.

In accordance with the present disclosure, aspects include providing a method and system for generating an electronic submittal register from a given project specification document for various construction projects.

In one example embodiment, aspects provide a method and system for generating submittal registers electronically for various construction projects (see, e.g., graphical user interface (GUI) screens as shown in the appended figures hereto). The method and system may include receiving project specifications by a reviewer, reviewing the specifications by the reviewer, inputting the specifications in a web application interface, receiving the output in a specific format, reviewing the submittal register thus generated, and delegating the generated submittal register upon review to a team for further processing.

In another example embodiment, a method and system of generating a submittal register via a web application interface are described. The method includes: inputting a document image (e.g., a raster document) or a text based file (e.g., a vector document) to the web application interface, and optionally converting the same to a plain text document as necessary, removing conversion errors from the plain text document, applying an algorithm to the text file and generating a spreadsheet, running a quality control check of the generated spreadsheet, re-applying the algorithm to the spreadsheet generating a final submittal register, and delivering the final submittal register (see, e.g., GUI screen for implementing portions of a method for generating a submittal register shown in the figures appended hereto).

In yet an embodiment, the generated submittal register in a web application interface may be repeatedly modified by various reviewers (see, e.g., example GUI screen for a form for modifying a submittal register, and example GUI screen for editing submittal records shown in the figures appended hereto).

In an aspect of the present disclosure, a system for generating a submittal register is disclosed. The system comprises: a server, wherein the server receives input from the user via a network. The server is operatively coupled to a Submittal Register User Interface (UI). The Submittal Register UI is further coupled to a Submittal Register Engine. The Submittal Register Engine comprises: a data repository (e.g., a database), wherein the database is coupled to a service provider, and a parser (e.g., which may comprise a processor) configured to customize a project document accordingly.

In another aspect of the present disclosure, the data repository as disclosed may further be configured to store the log details of modification of the project document before and after the project document is received via the web application interface.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 6 shows an example GUI screen for generating a submittal register via a web application interface, in accordance with aspects of the present disclosure.

FIG. 7 shows an example GUI screen for implementing portions of a method for generating a submittal register, in accordance with aspects of the present disclosure.

FIG. 9 shows an example GUI screen for editing submittal records, in accordance with aspects of the present disclosure.

FIG. 10 presents representative examples showing adjustments to the text file to bring the file into common format standards for use in re-applying an algorithm, in accordance with aspects of the present disclosure.

FIG. 24 shows an example of insertion of modeled parameters for use with an example Machine Learning based approach for identifying "product data" as an example feature, in accordance with aspects of the present disclosure.

FIG. 32 shows an example GUI screen containing selectable information for selecting particular specification features relating to plumbing specific information, in accordance with aspects of the present disclosure.

DETAILED DESCRIPTION

Some embodiments, illustrating its features, will now be discussed in detail. The words "comprising," "having," "containing," and "including," and other forms thereof, are intended to be equivalent in meaning and to be open ended, in that an item or items following any one of these words is not meant to be an exhaustive listing of such item or items, nor to be limited to only the listed item or items. It must also be noted that, as used herein and in the appended claims, the singular forms "a," "an," and "the" include plural references, unless the context clearly dictates otherwise. Although any methods and systems similar or equivalent to those described herein may be used in the practice or testing of embodiments thereof, example preferred methods and systems are now described. The disclosed embodiments are mere examples.

Figure 1:
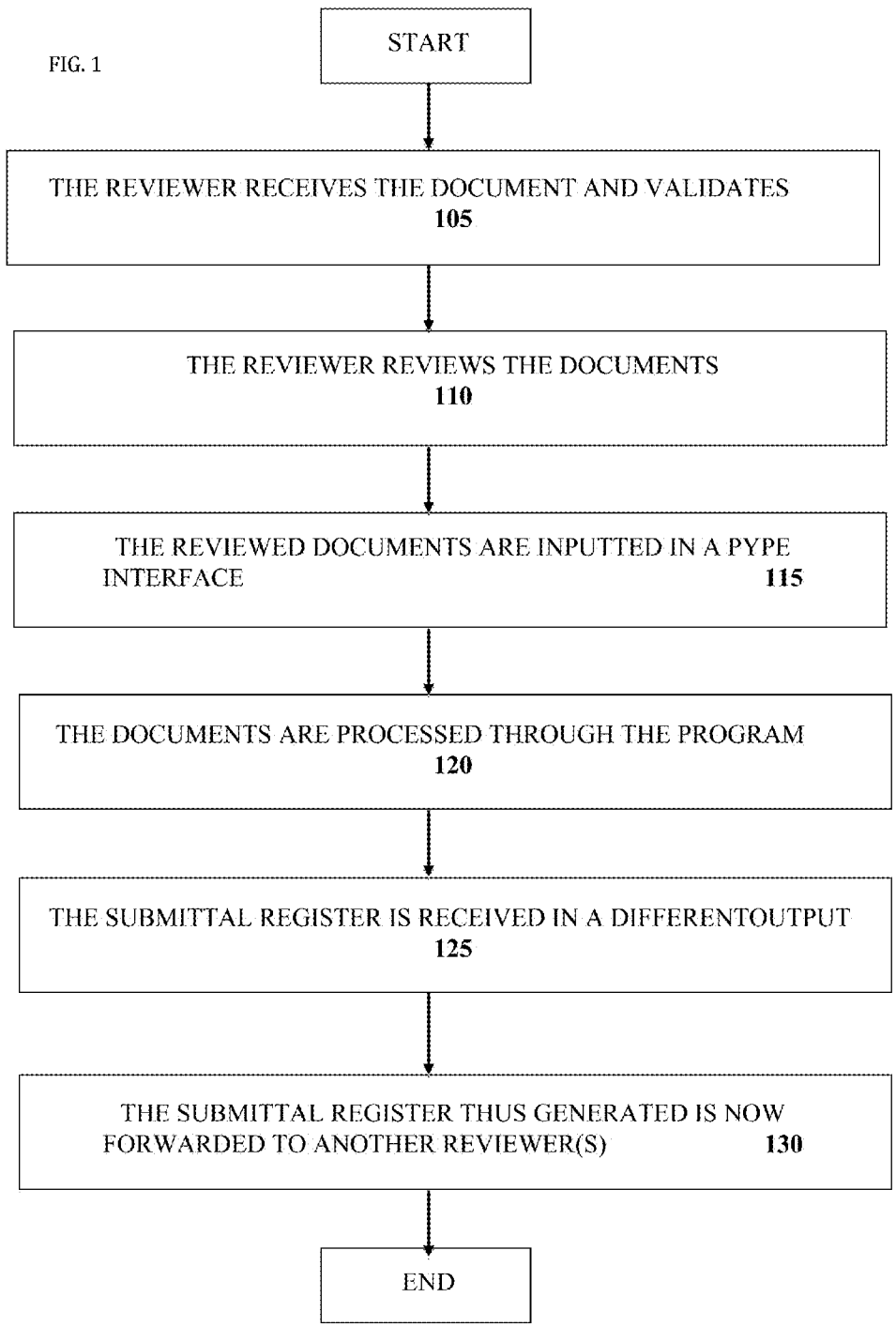
FIG. 1 illustrates a representative flow chart for a method of generating a submittal register, in accordance with aspects of the present disclosure.

FIG. 1 illustrates a flow chart defining the various steps involved in an example submittal register generating process for a construction project, in accordance with aspects of the present disclosure. Initially, after a project is identified, and typically prior to the process of FIG. 1 commencing, an architect or others typically involved in such projects, such as an owner team, provide architectural documents to a contractor who reviews such documents as needed for the construction project. Such architectural documents may contain drawings and specifications, for example. At step 105, the reviewer receives the documents (also interchangeably referred to herein as "specifications") and validates the contents based on expertise. At step 110, the same or a different reviewer reviews in detail the documents received.

At step 115, the reviewed documents may be input via a web application interface. The interface may comprise a software program, for example, and associated hardware (see, e.g., FIGS. 4 and 5 and description relating thereto), which is used to convert project specifications that may be received in an image or non-image file format (e.g., PDF format) into a spreadsheet based format (e.g., Microsoft Excel made by Microsoft Corporation of Redmond, Wash.) for use in submittal registers. Once the documents are have been inputted, as described at step 115, the documents may then be processed further, such as through an algorithm, in step 120 to generate a submittal register. The submittal register is received in the required output format at step 125. The submittal register thus generated is then forwarded, at step 130, to another reviewer(s) for review. The additional reviewer(s) may add additional records and/or delete or modify existing records in the submittal register, as appropriate.

In one example embodiment in accordance with aspects of the present disclosure, the reviewer reviewing the generated submittal register may invite (e.g., via an invitation through a network, such as the Internet or an intranet) other interested reviewers to review the same. It is noted that the activities thus created, in terms of the invitation and any modification of the submittal register, for example, may be stored in a reviewable log.

Figure 2:
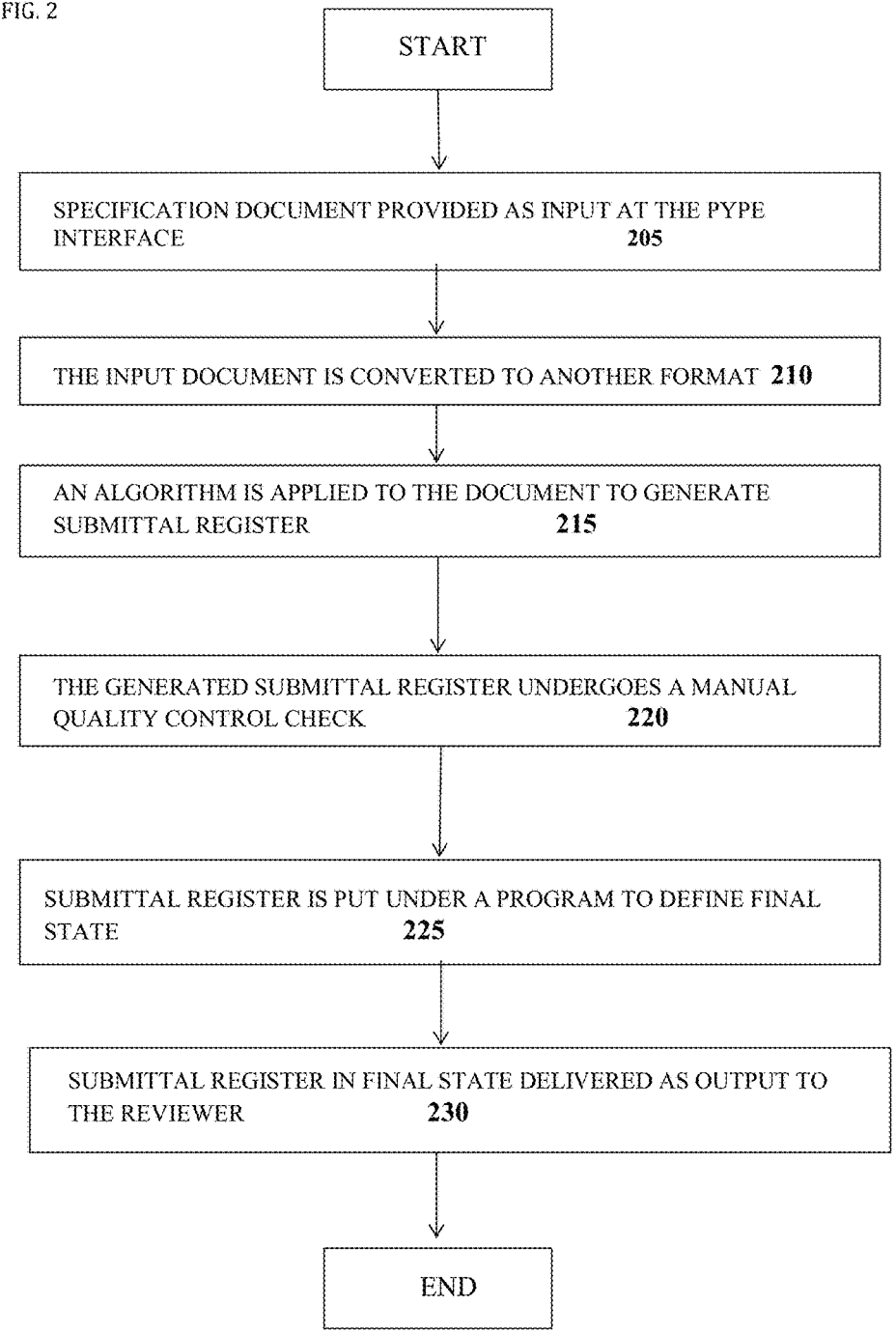
FIG. 2 is a representative flow chart for a process followed in an example web application interface, in accordance with aspects of the present disclosure.
Figure 12:
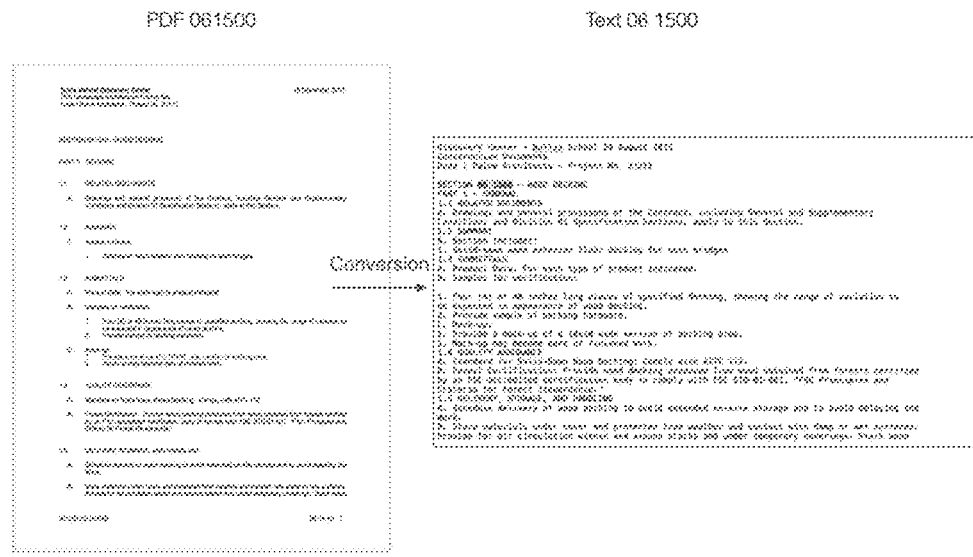
FIG. 12 presents representative examples of an input document conversion taking place, in which the input document is converted to a first file converted format, such as a text file, as shown, in accordance with aspects of the present disclosure.

FIG. 2 provides further detail with regard to an example process by which the document received (e.g., from the architecture team) is provided as input to an example web application interface to generate a submittal register (e.g., generated electronically), according to aspects of the present disclosure, further to the description of FIG. 1. Once the reviewed document is provided to a reviewer, at step 205, the document may be provided as input via a web application interface in a first format. The document first format may be of any type supported by the web application interface, including, but not limited to Microsoft Word and/or Excel, text, rtf or any other file format that involves text input (see e.g., FIG. 7 for an example input screen). At step 210, conversion of the input document takes place, in which the input document is converted to a first file converted format, such as a text file. (See, e.g., conversion example shown in FIG. 12).

Figures 9, 10:
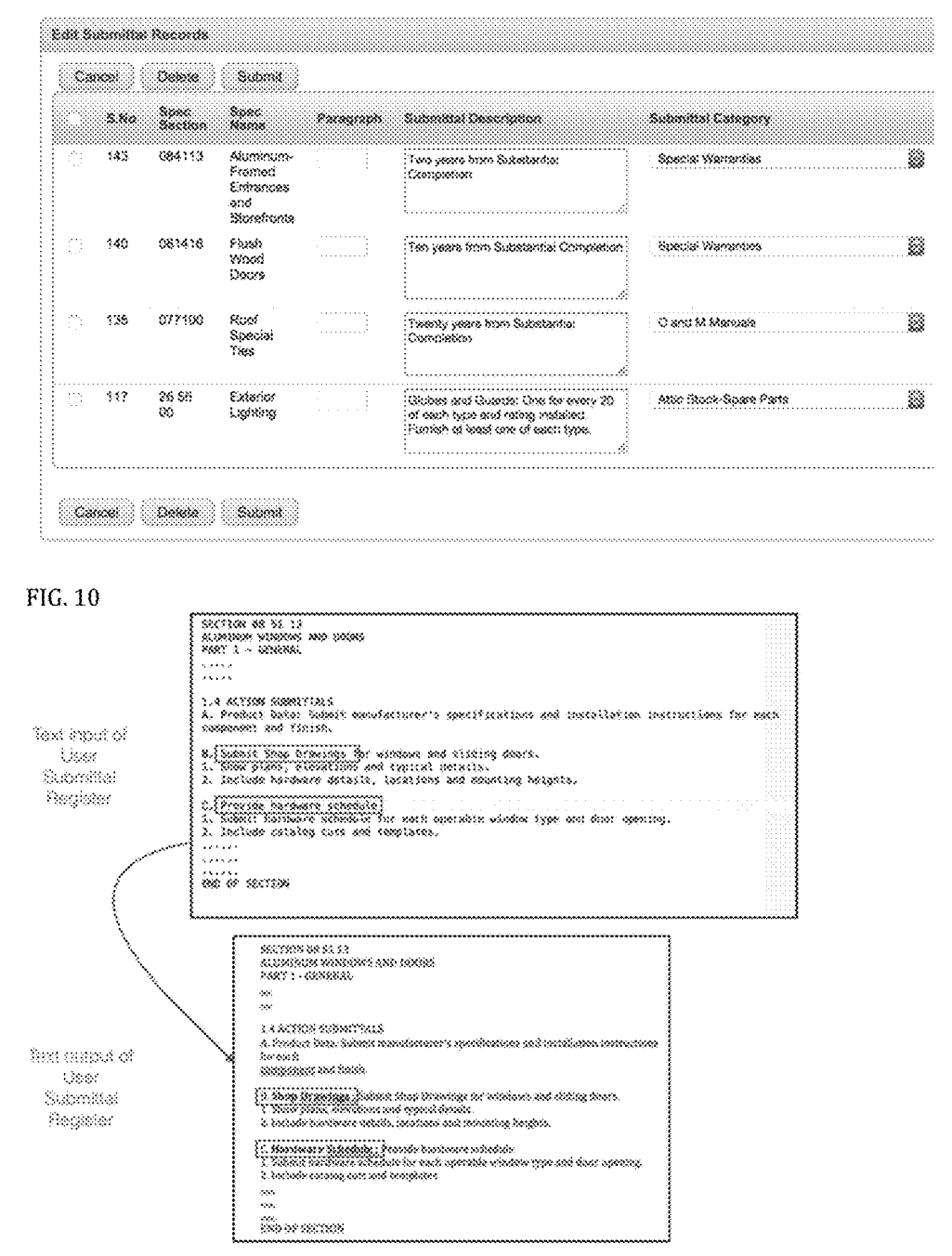
Figure 13:
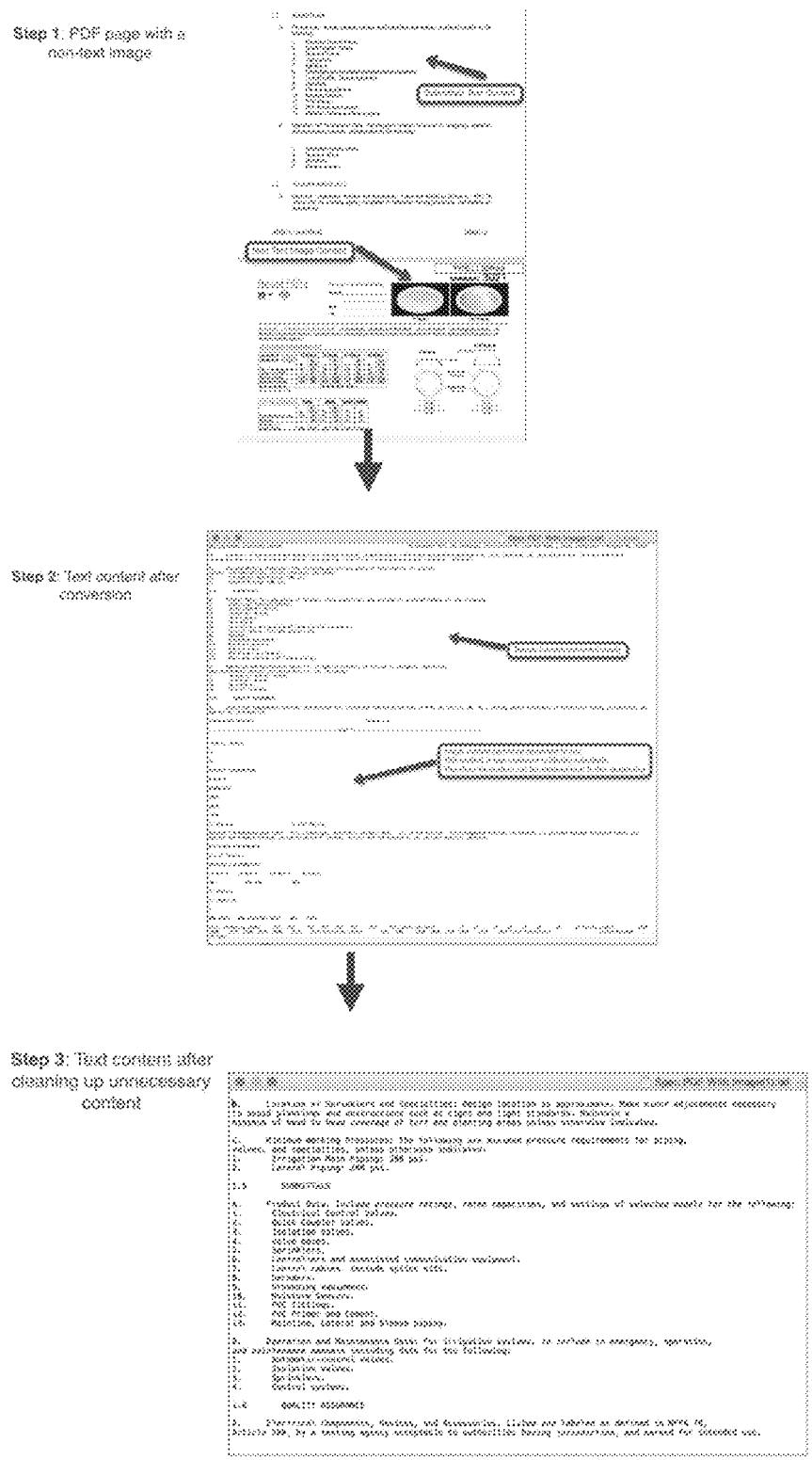
FIG. 13 presents representative examples of text and information from non-textual content being reformatted and/or reorganized, for example, reflecting the type and location of the text and non text content, upon comparison of the original input to the converted text file, in accordance with aspects of the present disclosure.

During the conversion of step 210, conversion errors may be removed (e.g., if any textual information is found to be misplaced, such misplaced information may be removed). For example, it may be known that the information in the document provided is a combination of textual and non-textual content. In the case of such mixed content, the text and the information from the non-textual content may be reformatted and/or reorganized, for example, reflecting the type and location of the text and non text content, upon comparison of the original input to the converted text file (see FIGS. 9 and 13 for examples of various features of such conversion).

Figure 11:
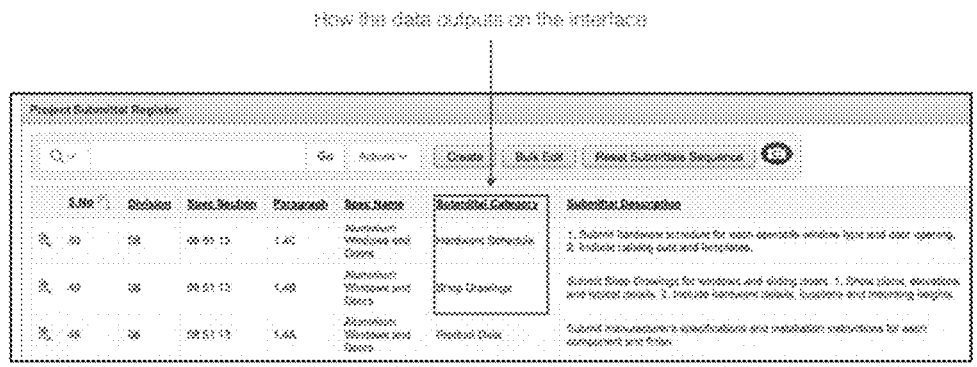
FIG. 11 shows an example GUI screen containing example information generated on the submittal register that may be extracted from the file and transformed to spreadsheet format, in accordance with aspects of the present disclosure.

At step 215, a process (e.g., an algorithm) may be applied to the text file to generate a "Submittal Register." A Submittal Register may include, for example, a list of all documents that are exchanged among different project stakeholders, such as General Contractor, Architect, Subcontractor, etc., during the course of Project Execution. Generation of an accurate Submittal Register may be a good project management practice in any large scale project, for example. The algorithm or other process applied to the text file may include, but not be limited to, for example, a text analysis algorithm or the like. More specifically, for example, information generated on the submittal register may be extracted from the file and transformed to spreadsheet format in the web application interface (see, e.g., the example spreadsheet shown in FIG. 11). At step 220, the generated submittal register may undergo a quality control check (e.g., a manual check, which may alternatively be automated). A set of rules incorporated into software code, for example, may be applied to determine whether the spreadsheet meets certain basic formatting requirements or not.

Figure 14:
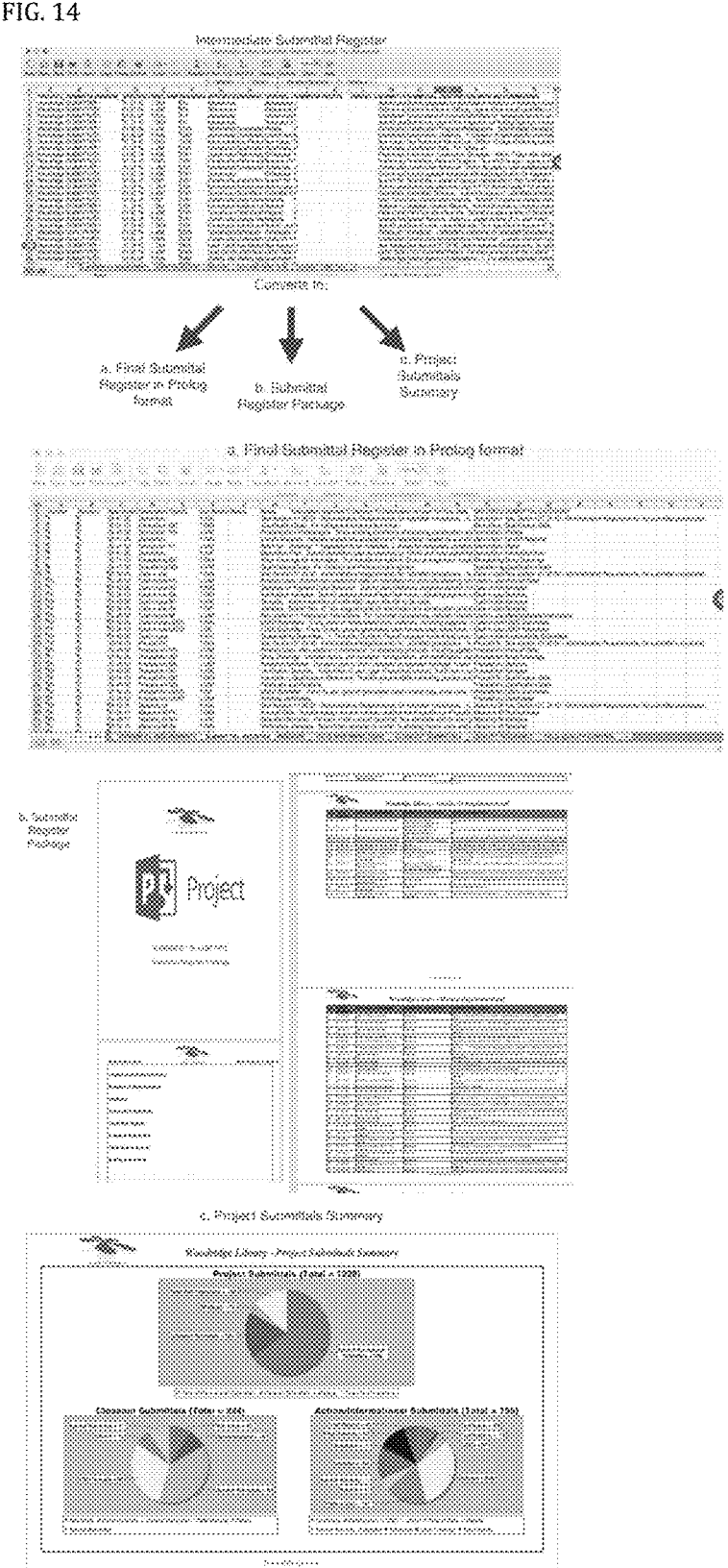
FIG. 14 presents representative examples of final state output information for a submittal register, based on customer's output format requirements, in accordance with aspects of the present disclosure.

It is noted that many architects, for example, may follow certain standards while writing such specifications. If the specification inputted into the web application interface, at step 205, does not follow certain common formatting standards, then quality control step 220 may include some adjustments to the text file to bring the file into common format standards for use in re-applying the algorithm of step 215 (see, e.g., FIG. 10 for an example of such adjustment). The quality control step 220 may include other adjustments to the intermediate output file generated as part of the process. At step 225, a program (e.g., software code) may be applied to the intermediate output file in order to obtain the final state of the Submittal Register. For example, the program may define the final state of a Submittal Register in accordance with customer's output format requirements, which may include, but not be limited to, branding of the same, generating of a PDF, etc. (see, e.g., FIG. 14 for example final state output information).

Figure 15:
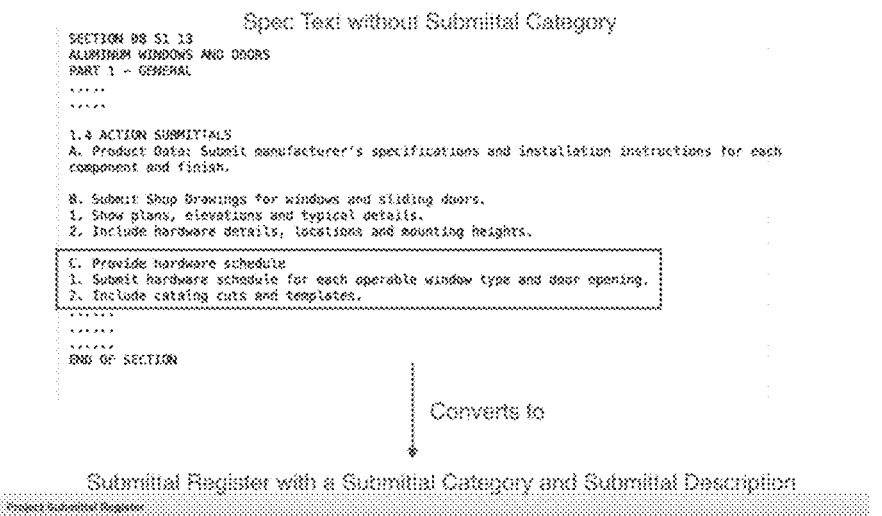
FIG. 15 presents representative examples showing use an algorithm to identify the summary text, Submittal Category for the submittal information, and/or Submittal Description provided by the architect, in accordance with aspects of the present disclosure.
Figure 16:
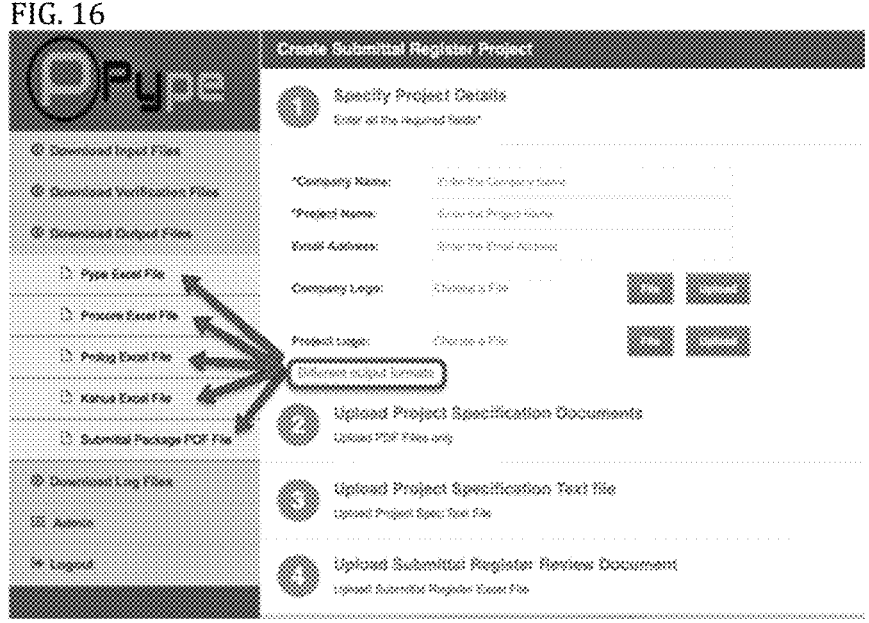
FIG. 16 shows an example GUI screen indicating that the submittal register may be delivered in the output format as specified by the customer, in accordance with aspects of the present disclosure.
Figure 17:
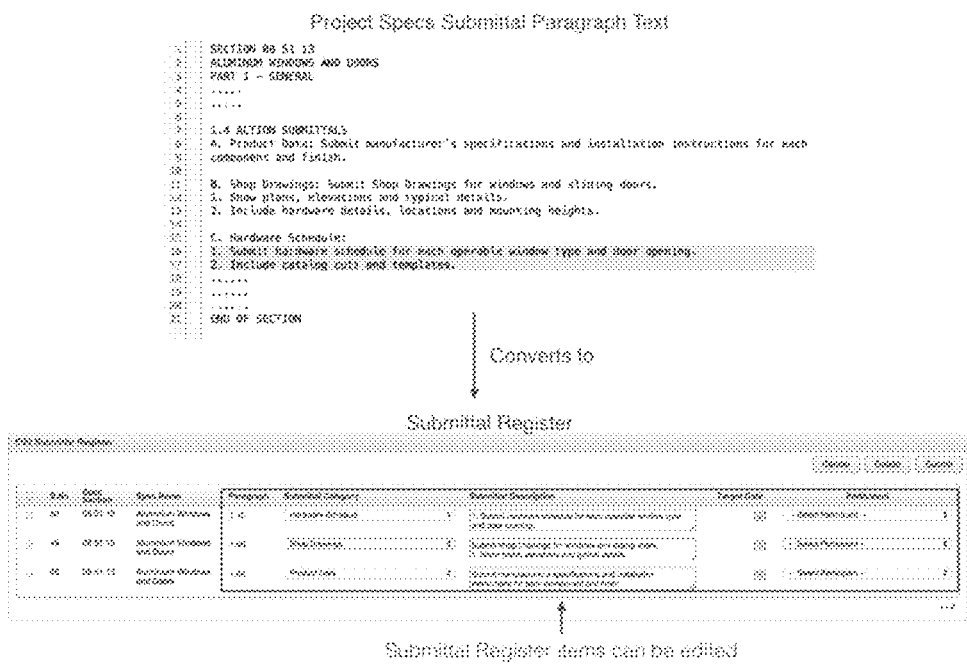
FIG. 17 presents representative examples showing that the output content may be altered depending on the needs of the client or other user of the output, in accordance with aspects of the present disclosure.

During the processing of the input documents by the program in Step 215, the program may use an algorithm, for example, to identify the summary text, Submittal Category for the submittal information, and/or Submittal Description provided by the architect (see, e.g., FIG. 15). Such Submittal Register information may be pre-defined. Alternatively, if the Submittal Register is not defined, such as in the submittal-heading paragraph in a commonly used format, then the web application interface may operate so as to identify the contents of the submittal register. Along with such identification, the program may also determine appropriate Submittal Category and Submittal Description, for example. Upon completion of the program runtime, at step 230, the Submittal Register is delivered in the output format as specified by the user (see, e.g., FIG. 16). The output may be delivered in the following formats, for example, text, CSV, Excel, and/or PDF. The output content may be altered depending on the needs of the client or other user of the output (see, e.g., FIG. 17).

Figure 3:
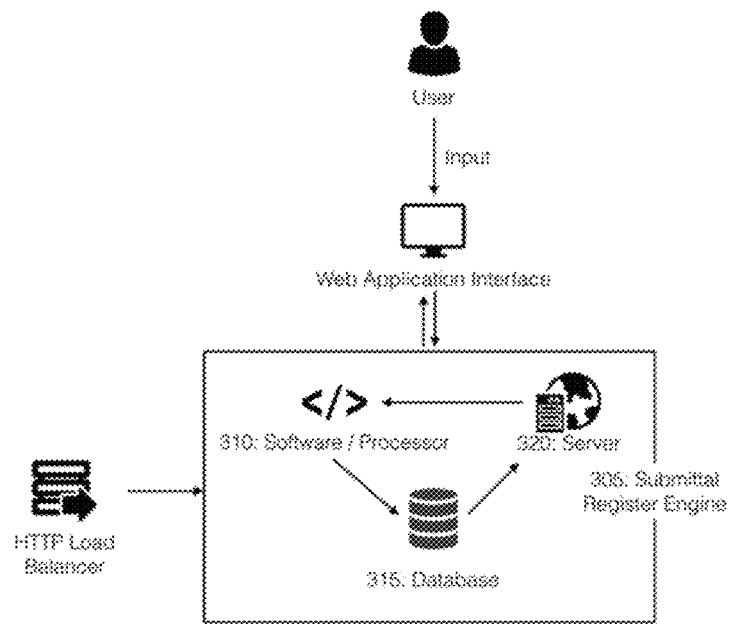
FIG. 3 shows an example system configured to execute the method of generating submittal register, in accordance with aspects of the present disclosure.

FIG. 3 contains a representative diagram of an example system 300 configured to execute a method of generating submittal register, according to an embodiment of the present disclosure. The system 300, which may comprise one or more hardware and/or software features as shown in and described with respect to FIGS. 4 and 5, may include a submittal register engine 305, wherein the submittal register engine 305 is coupled with a HTTP Load balancer, for example. The submittal register engine 305 may further comprise a processor 310, a data repository, such as a database 315, and a server 320, wherein all three components are intercoupled.

A reviewer/user may input the architectural project via a web application interface, for example. See representative features shown in FIG. 7. In-built software may run in the backend of the system, for example, which may be coupled to the server 320, as shown in FIG. 3. The server 320 may power the front-end part of the application. In this regard, reviewer/user may use a web interface (see FIG. 7) and/or an application interface to interact with the product. Thus, the submittal register may thereby be generated and processed in the submittal register engine 305.

The submittal register may access data in and/or transmit data to the data repository 315. The data repository 315 may have certain parameters set for use with the Submittal Register. The server 320, upon receiving the Submittal Register, may transmit the same to the processor 310, along with the parameters set therein. The data repository 315 and the processor 310 may be coupled via a network, such as the Internet or an intranet (the processor may be located at a user device through which the web application interface operates, or alternatively may be located at the server 320, for example, or elsewhere on the network). The processor 310 may execute the Submittal Register based on the parameters set. The processor 310 may format the Submittal Register in line with the parameters set. The processor 310 may further upload the same to the data repository 315. The data repository 315 may then forward the Submittal Register to the server 320. The data repository 315 and the server 320 may be coupled via the network. The reviewer/user may be able to retrieve information about the generated and updated Submittal Register via the server 320. However, action of the reviewer/user may be regulated, for example, by the HTTP load balancer, which maintains inbound and outbound traffic flow for the submittal register engine 305.

Further, the processor 310/data repository 315 may also interoperate so as to maintain a log sheet. The log sheet may contain, but not be limited to, for example, reviewer/user input to a project specification and/or to the submittal register engine 305, login history of the reviewer/user, modifications made by any other reviewer/user, etc. The log sheet may be updated in real-time, thereby making this information available, for example, to any authorized reviewer/user who logs in to the system and the submittal register engine 305.

Further, the processor 310 may be configured to incorporate or act in conjunction with various other components, such as, but not limited to, an application server, an authentication server etc., as will be well known to a person skilled in the art of this field.

The system may include additional components that perform each of the functions of the method of the aforementioned flowchart of FIGS. 1-3, or other algorithms. As such, each block in the aforementioned flowcharts of FIGS. 1-3 may be performed by a component, and the system may include one or more such components. The components may include one or more hardware components specifically configured to carry out the stated processes/algorithm, implemented by a processor configured to perform the stated processes/algorithm, stored within a computer-readable medium for implementation by a processor, or some combination thereof.

Thus, aspects may include a non-transitory computer-readable medium for reducing multipath propagation of a navigational aid station, the non-transitory computer-readable medium having control logic stored therein for causing a computer to perform the aspects described in connection with, e.g., FIGS. 1-3.

Figure 18:
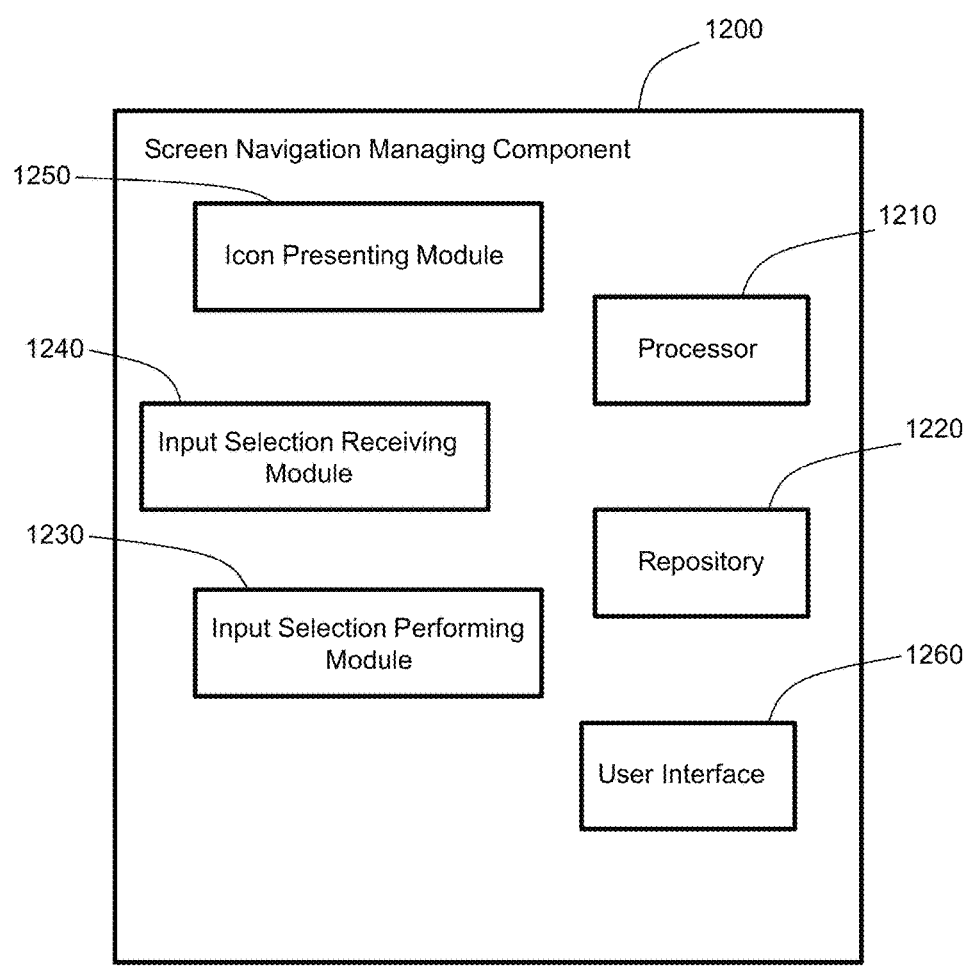
FIG. 18 contains a representative diagram of an example screen navigation managing component for use in accordance with aspects of the present disclosure.

FIG. 18 contains a representative diagram of an example screen navigation managing component for use in accordance with aspects of the present disclosure. The screen navigation managing component 1200 may include a processor 1210, a repository, 1220, an input selection performing module 1230, an input selection receiving module 1240, an icon presenting module 1250, and a user interface 1260, such as GUI.

Additional features relating to aspects of the present application will now be described.

One feature in accordance with aspects of the present disclosure includes further details of a natural language processing (NLP) framework based on rules. Further to as discussed above, a number of input specifications from, for example, architects or other system users, may be used to develop a general pattern for format and other features of the written text of the specifications for use in annotating the specifications.

Such identified patterns may then be used to develop a set of rules and/or regular expressions for recognizing how documents are parsed for annotation using the methods and systems in accordance with aspects of the present disclosure. These rules and/or regular expressions may take the form of software analysis tools and/or a set of developed lookup rules to determine the meaning of such text and classify the text within the method and system.

In a simple example in accordance with aspects of the present disclosure, it may be recognized that subparts within such specifications often begin with an alphanumeric character, followed by a period (e.g., "A.") that may contain regularly recognizable portions of such documents. Each such subparts may be identified, collected (e.g., in a spreadsheet) and associated with a common classification.

Figure 19:
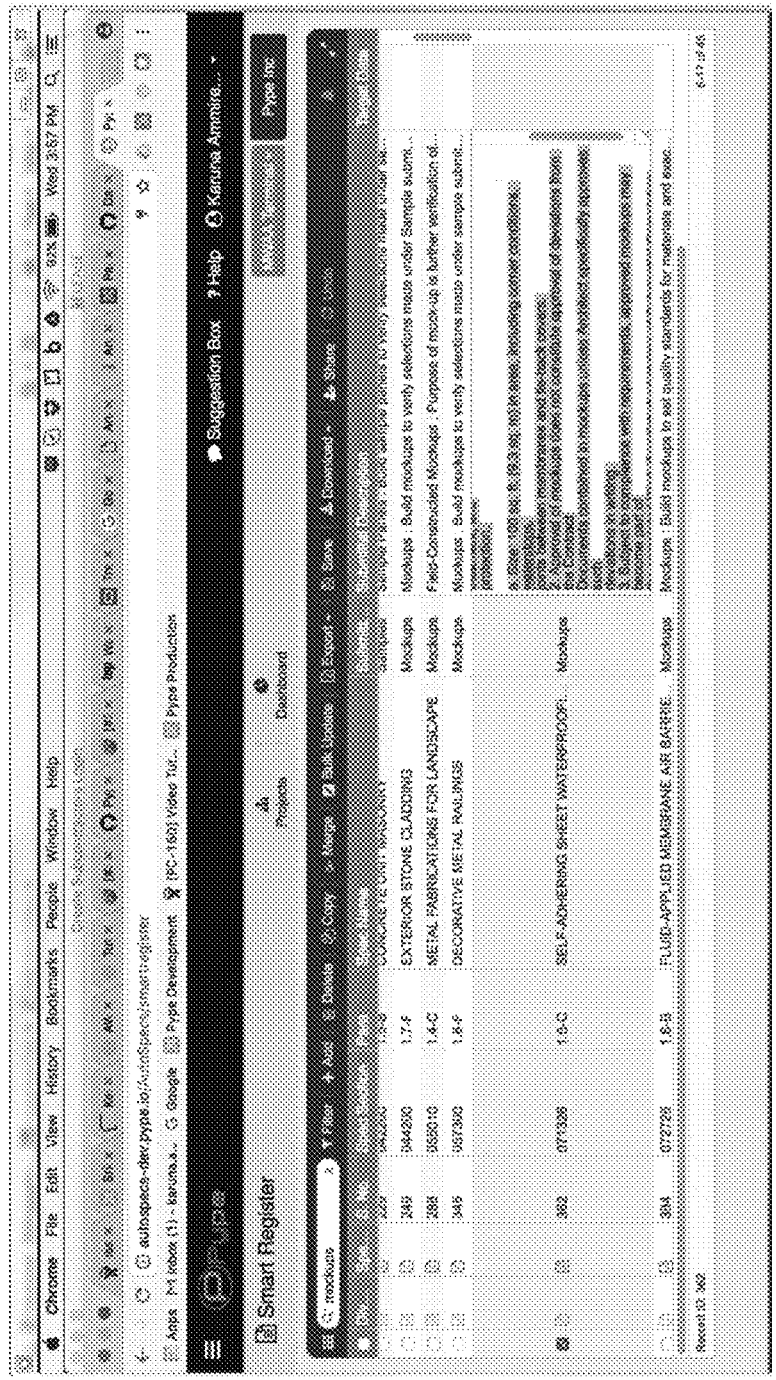
FIG. 19 shows an example GUI screen containing submittal information as presented in accordance with aspects of the present disclosure.

In another example, the specifications (after conversion, for example, to a text readable format) may include typical phrases or terms, such as "product data," that may trigger selection of the line of text or paragraph or subpart of the text relating to that feature ("product data"), which then may be classified, extracted, and included within the tabulated format of the specification information, along with other information, such as location information ("spec section") within the specification and paragraph number with in the specification (see, e.g., information highlight showing the spec section, paragraph, and full text for an example specification as shown in FIG. 19).

Figure 20:
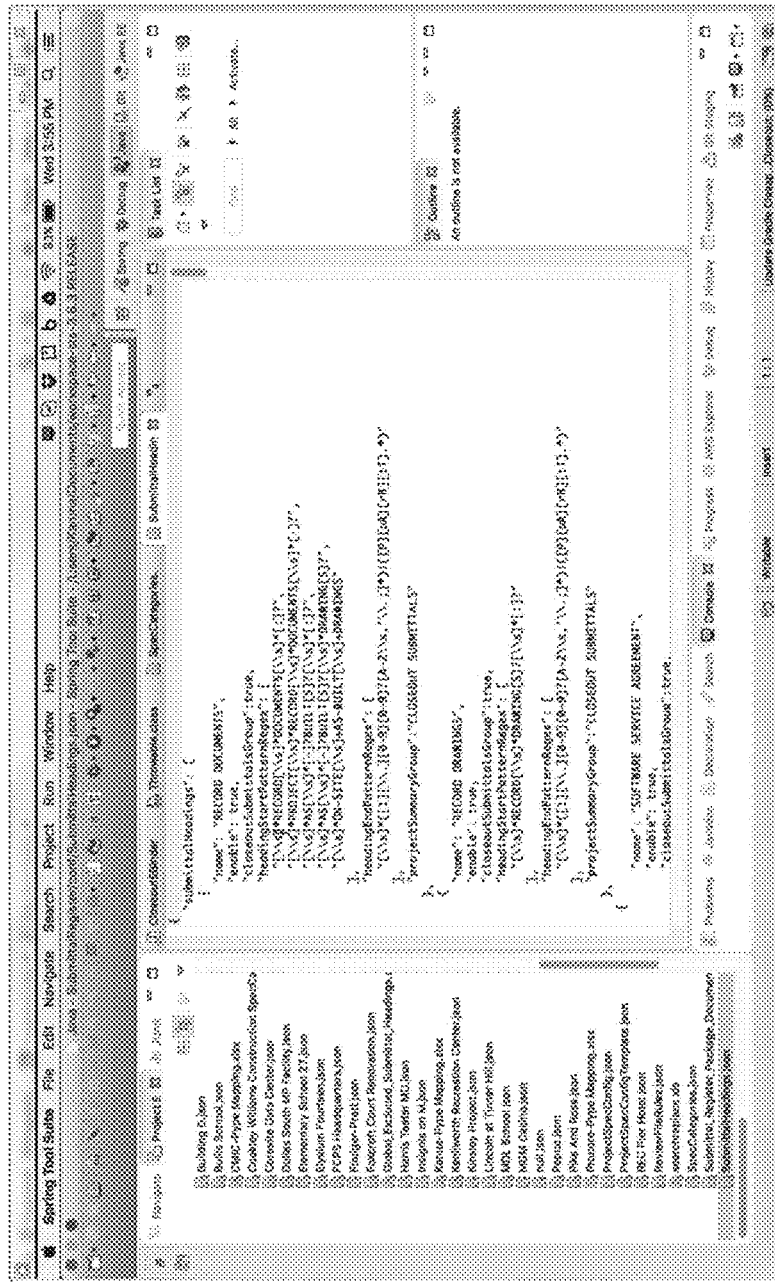
FIG. 20 shows an example GUI screen containing sample code for conducting searching in the context of processing a specification or other information, in accordance with aspects of the present disclosure.

In order to identify all such text, for example, a basic search function may be constructed (e.g., to search for the phrase .*product data.*, where .* triggers identification of the occurrence of the phrase "product data" within the text document), to identify all occurrences of this phrase within the specifications. This type of such function within textual searches may involve a search pattern commonly referred to in the art as "regular expression syntax." Example code for performing such searching is shown in FIG. 20 (relating to identification of "record documents").

In one example implementation, after the identification of such occurrences, an analyzing user of the method or system for classifying such text may then review and select text surrounding the occurrence, which in turn may be used to classify the text. Once classified, a common identifier for the classified text may then be associated with the text, and the relevant text stored (e.g., in a data repository). A later user of the system (e.g., a user desiring to use the classified version of the specification) may then use the identified to quickly access the relevant text (e.g., the common identifier itself may hyperlink to the full extracted text associated with the identifier for that specification. The extracted text, for example, may have a spec name, spec section, and the associated description (i.e., the extracted text itself). The extracted text may also have a submittal category associated therewith.

Figure 21:
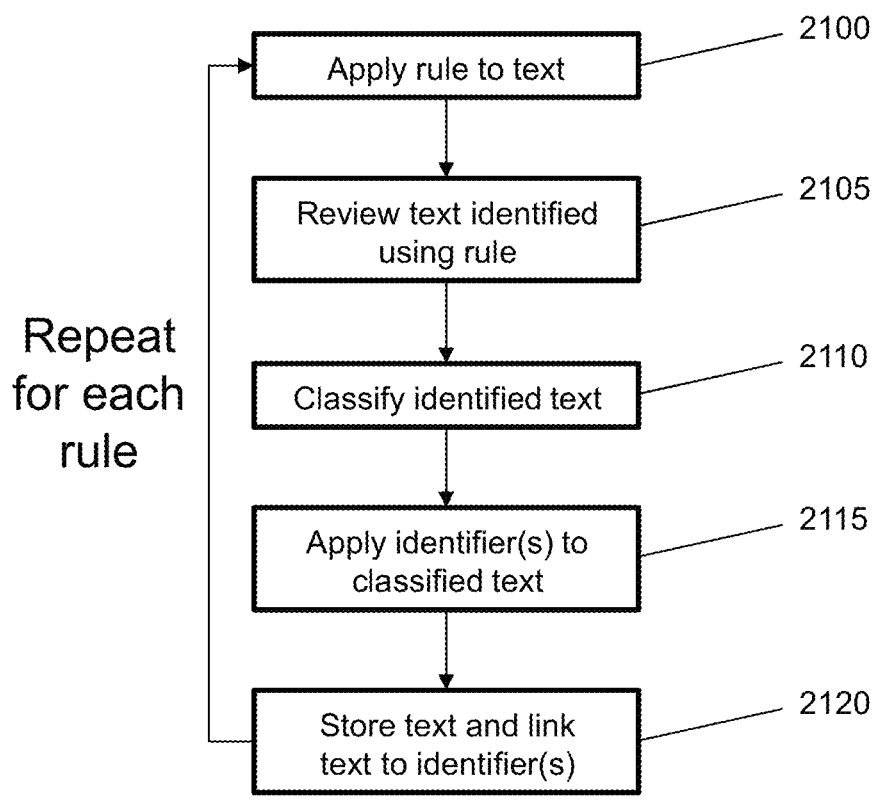
FIG. 21 shows an example flow chart of an example method for applying an NLP framework based on rules or regular expressions, for example, in accordance with aspects of the present disclosure.
Figure 22:
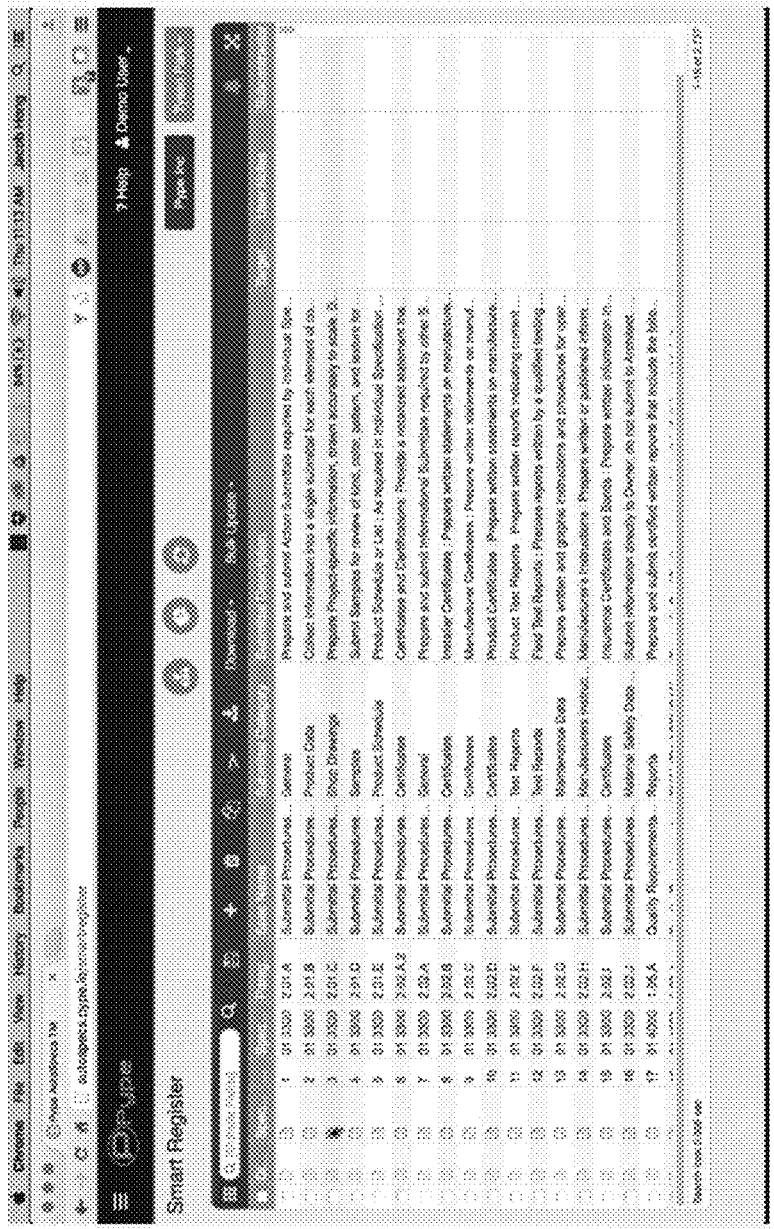
FIGS. 22 and 23 show example GUI screens with stored text that is retrieved and shown based on a selected identifier linked to the text, in accordance with aspects of the present disclosure.
Figure 23:
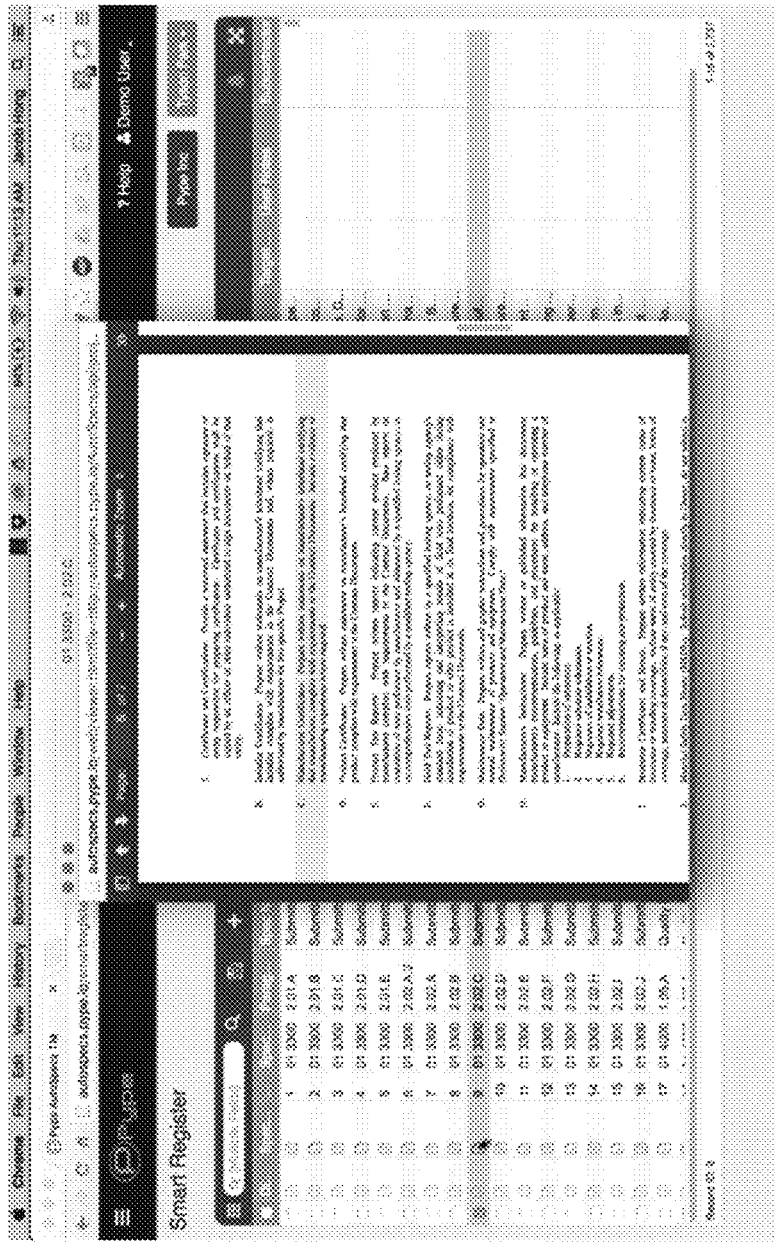

FIG. 21 shows an example flow chart of an example method for applying an NLP framework based on rules or regular expressions, for example, in accordance with aspects of the present disclosure. As shown in FIG. 21, the method may include applying a rule to text 2100, reviewing the text identified by the rule application 2105, including any surrounding text to an identified portion, classifying the identified text 2110, such as by comparing the text or terms within the text to a library of identified classifications, applying one or more identifiers to the classified text 2115, and storing and linking the text and identifiers 2120. This process may be repeated for each rule. For example, the selected text may be stored within a data repository, such as a spreadsheet. FIGS. 22 and 23 show example GUI screens with stored text that is retrieved and shown based on a selected identifier linked to the text.

After processing text from a specification as described above, the results may be verified (e.g., manually verified).

After each specification entry and analysis or at regular intervals in specification entries, for example, the rules/regular expressions may be revised, or they may be amended for new or differing types of text. An iterative process may then be used to develop more universally applicable rules/regular expressions (e.g., universally applicable to a type of specification, such as an apartment construction specification). The iteratively developed rules/regular expressions may also be used to re-process previously processed specifications to increase uniformity, among other purposes.

Another additional feature may include application of Machine Learning concepts, such as to the NLP process described above. The above NLP process may be performed partially or wholly by manual procedures. Aspects of the present disclosure relate to using Machine Learning concepts to perform various aspects of the above procedure, such a identifying expressions, developing rules/regular expressions, and verifying the terms and portions of expressions. A variety of Machine Learning programs are available that may be adapted (e.g., by setting or creating parameters within those programs) for use in this process. Examples of such programs usable in accordance with aspects of the present disclosure include Apache OpenNLP made by the Apache Software Foundation of Forest Hill, Md.; Stanford CoreNLP, made by the Stanford NPL Group of Stanford, Calif.; Waikato Environment for Knowledge Analysis (Weka), made by the University of Waidato, New Zealand; Natural Language Toolkit (NLTK) developed Steven Bird and Edward Loper of the University of Pennsylvania, in Philadelphia, Pa.; and Spark Machine Learning Library (MLlib), made by Apache Software Foundation of Forest Hill, Md.

Figure 24:
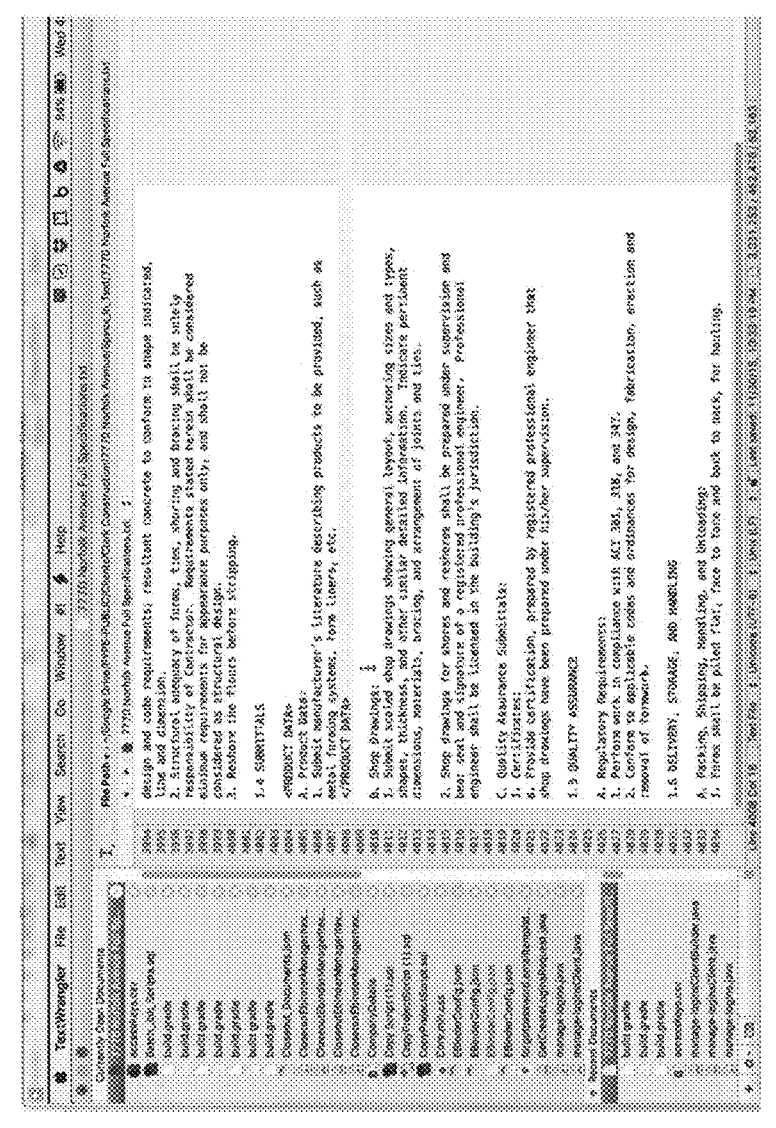

With the Machine Learning program assistance, for example, a number of specifications may be processed by the adapted Machine Learning programs so as to develop "learned" terminology and other features for setting the annotation parameters in a model. The modeled parameters for annotation may then be applied to additional specification examples to confirm the modeling. An example of insertion of modeled parameters for use with an example Machine Learning based approach for identifying "product data" as an example feature are shown in FIG. 24. By using this type of annotation among a number of specifications, for example, the Machine Learning program can further develop the scope of the definition of "product data" across that set of specifications (e.g., by identifying and associating certain words in each definition across the number of specifications, to identify the most common words), which in turn may be used to improve the NLP processing.

Figure 25:
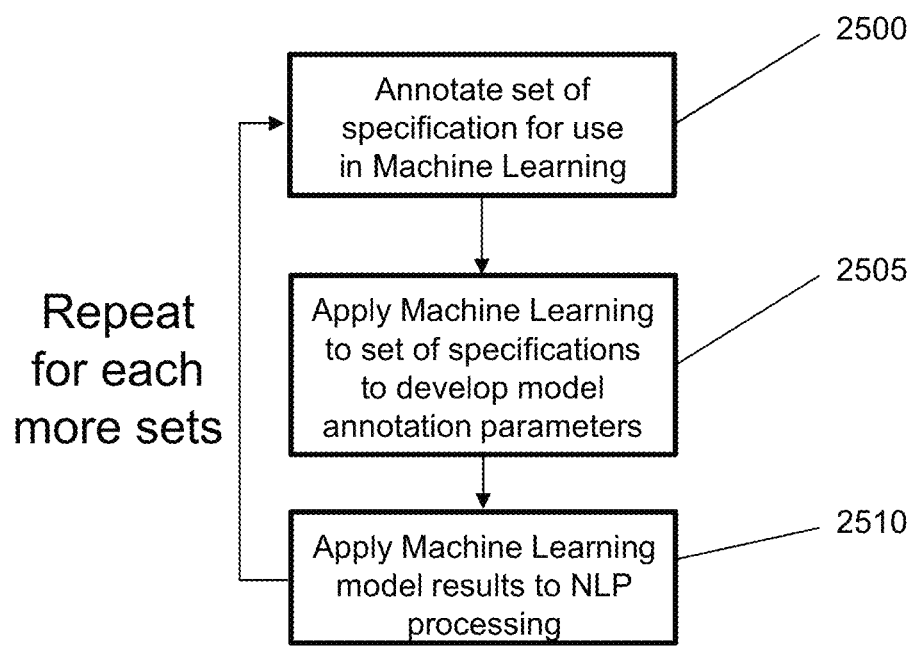
FIG. 25 shows an example flowchart of an example process for using Machine Learning program assistance in develop of an NLP framework, in accordance with aspects of the present disclosure.

FIG. 25 shows a flowchart of an example process for using Machine Learning program assistance in develop of an NLP framework, in accordance with aspects of the present disclosure. As shown in FIG. 25, a set of specifications may initially be annotated for use in Machine Learning 2500. The Machine Learning program may then be applied to the set of specifications to develop model annotation parameters 2505. The annotation parameters developed using the Machine Learning program may then be used in NLP processing for new specifications 2510. Optionally, the process may then be repeated, so that any such new specifications may be used as annotated sets for use in further refining the Machine Learning program approach, in order to iteratively continue to refining the NLP framework.

Another additional feature may include aspects to support specification versions, such as within a single project as that specification changes over time. For example, construction specification documents are generally created by architects. Often, such as in Design-Build projects, specifications may go through multiple versions. Aspects of the present disclosure may include comparing specifications and/or annotated portions of the specifications across versions, and showing the changes in a format that allows the user to readily identify the change portions. For example, the changes in text information may be shown in underline (added portions) and strikethrough (deleted portions) so that the user may easily identify the changed portions. In addition, aspects of the present disclosure provide for options to download the changes in a spreadsheet format and also to use the results in interactive dashboards (e.g., to identify changed portions with regard to certain features of interest).

Figure 26:
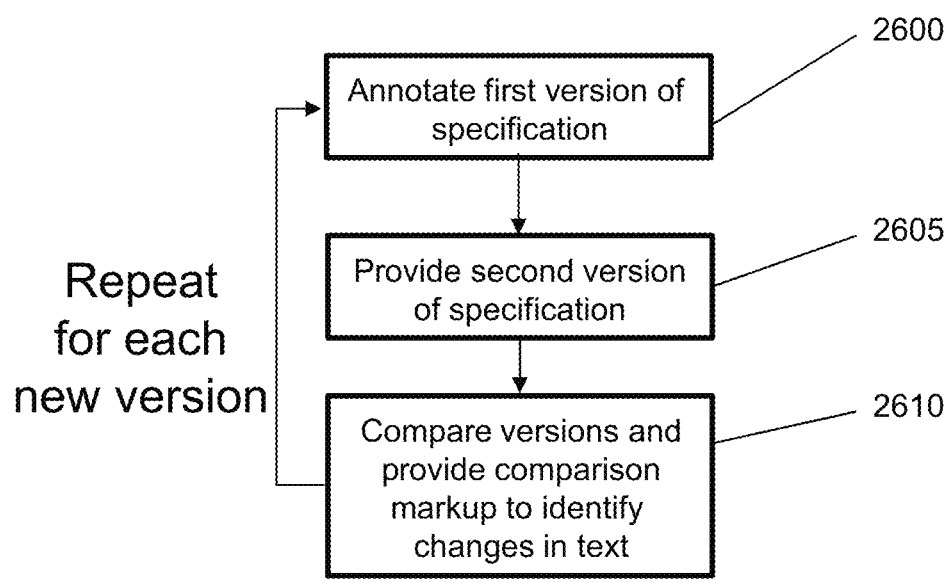
FIG. 26 shows an example flowchart of an example method of providing version comparison information across multiple specification versions, in accordance with aspects of the present disclosure.

FIG. 26 shows a flowchart of an example method of providing version comparison information across multiple specification versions. As shown in FIG. 26, a first version of a specification is annotated (e.g., using the above methods described and shown with respect to FIGS. 21 and 25) 2600. A second version of the specification is then provided 2605. The two versions are compared and annotated, such that the changes in text between the two versions is indicated (e.g., showing additions in underline and deletions in strikethrough) 2610. This process may be repeated with additional versions.

Similar to how text in specifications is annotated, drawings may be similarly be converted to text format and annotated. In addition, and common images (e.g., the common image for a toilet or other construction feature shown in common symbol or image format) may also be identified and annotated. The drawings typically indicate all of the construction work that needs to be performed, including, for example, notes on formal submissions to the owner/architect on approvals for various materials to be used for the construction project. This annotated information may likewise be linked to the textual portion of the annotated specification documents associated with the project. Common construction phases that may include these aspects, for example, may include drywall installation, mechanical work, sprinklers, plumbing, and electrical. The automation of the process of identifying, annotating, and linking this image information is highly time saving on such projects.

Figure 27:
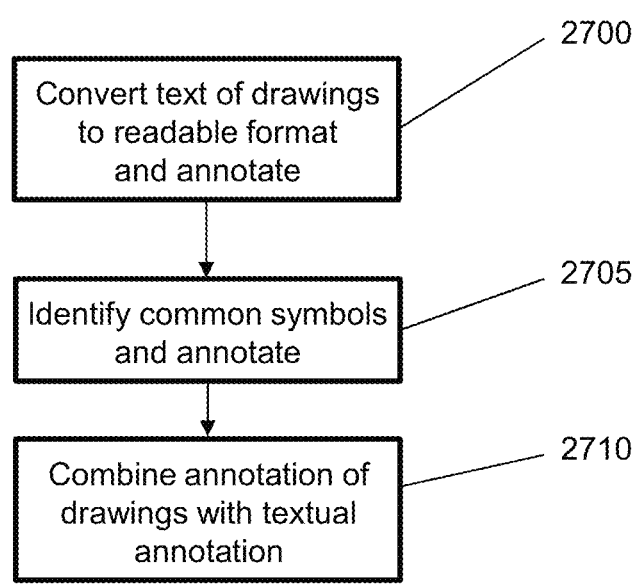
FIG. 27 shows an example flowchart of an example method of providing annotation of drawings, in accordance with aspects of the present disclosure.
Figure 28:
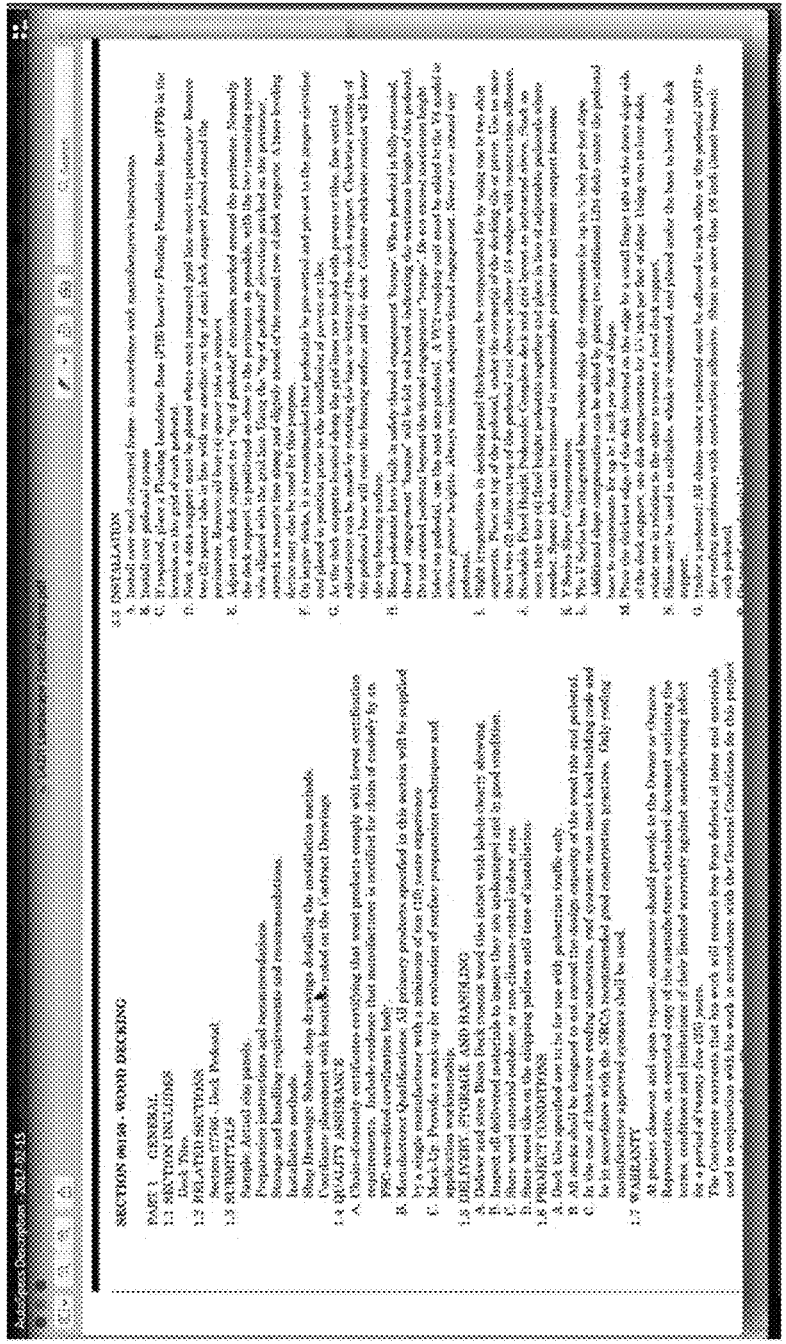
FIG. 28 shows an example GUI screen containing drawing related textual description, in accordance with aspects of the present disclosure.

FIG. 27 shows a flowchart of an example method of providing annotation of drawings, in accordance with aspects of the present disclosure. As shown in FIG. 27, text in drawings is converted to a readable format (e.g., using optical character recognition) and then annotated similarly to text in specification documents 2700. Common symbols/drawing elements are similarly recognized and annotated 2705. For example, the annotation may be to a drawing element that has drawing related textual description, as shown in FIG. 28. The annotated text and symbols/drawing elements may then commonly linked in their annotation (as well as with any corresponding specification annotation) to allow easy reference from drawings to specifications 2710.

Figure 29:
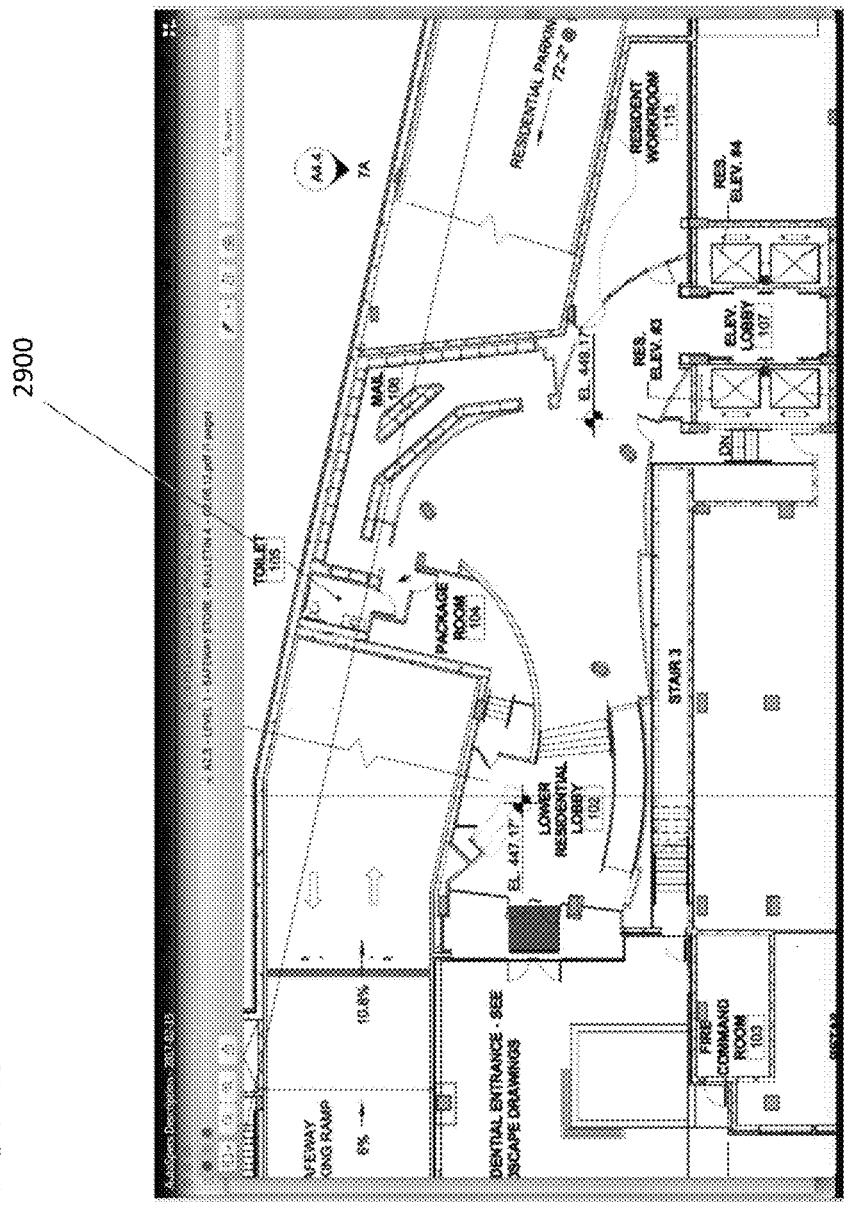
FIG. 29 shows an example GUI screen containing drawing related information having non-textual image information, in accordance with aspects of the present disclosure.

For example, one or more hyperlinks may be used to link the drawing elements and the specifications. In an aspect of the present disclosure, one or more drawing links may be displayed by the system, which link drawing elements to specific portions of the specifications and/or classifications or terms, for example. Similarly, links in the specifications and/or classifications or terms may be linked to drawing sheets and/or specific drawing elements. In an example implementation, as shown in FIG. 29, a user may select a link from a GUI (e.g., a SmartRegister screen) screen to access a drawing where a material, product, or equipment is identified.

Figure 30:
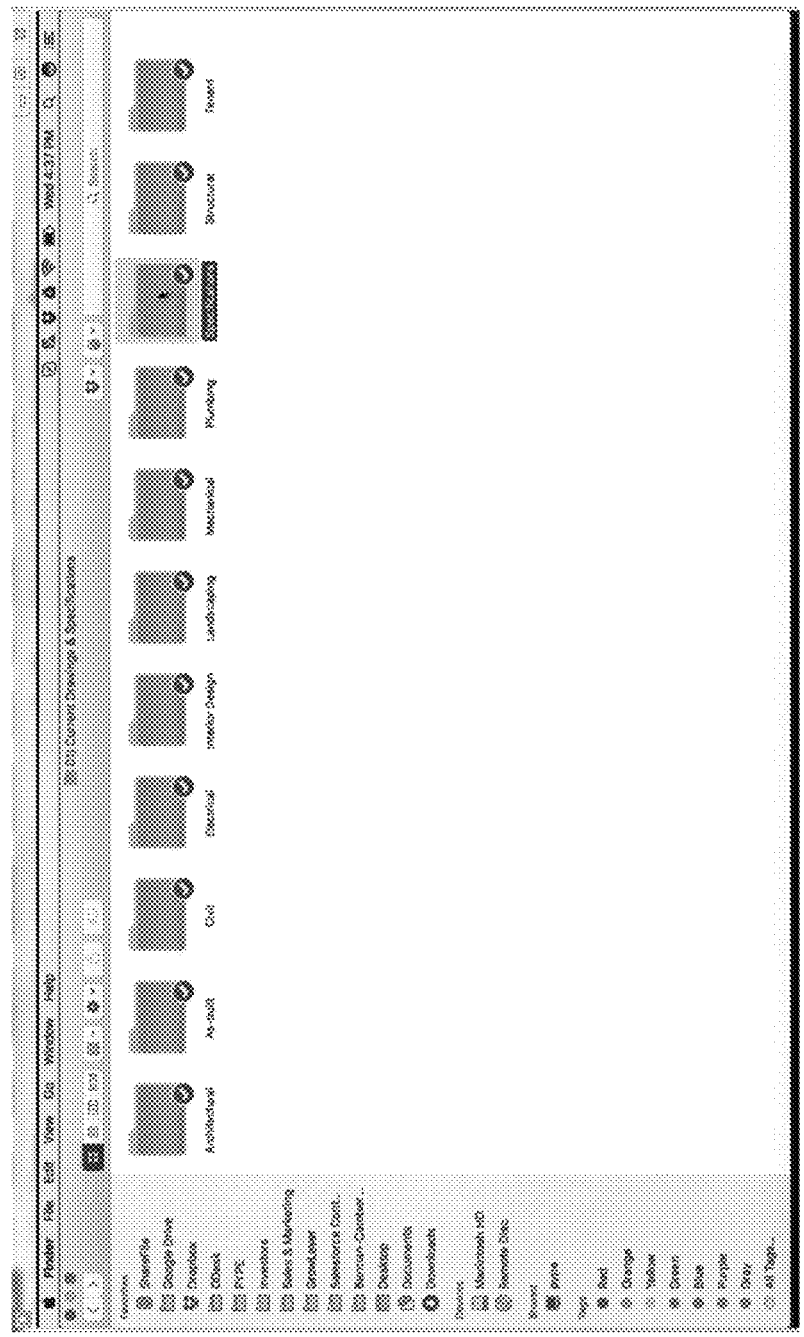
FIG. 30 shows an example GUI screen containing selectable information for specification terms, in accordance with aspects of the present disclosure.
Figure 31:
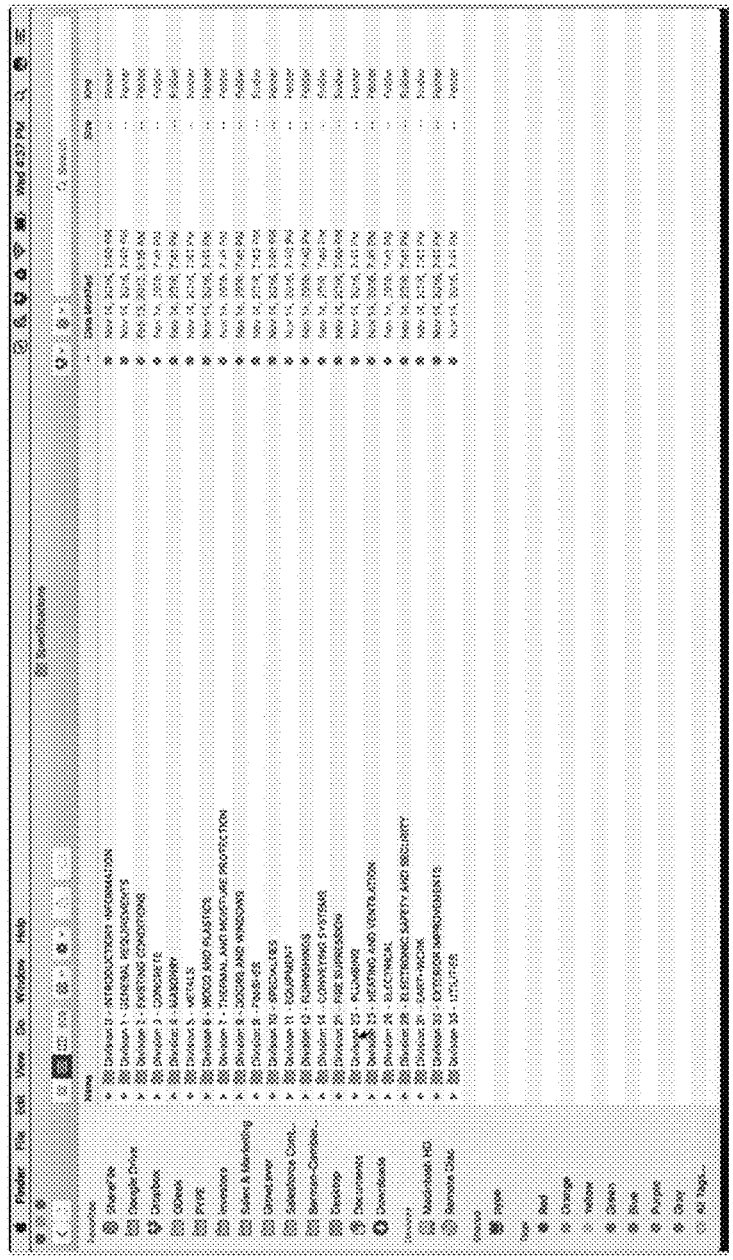
FIG. 31 shows an example GUI screen containing selectable information for selecting plumbing specific information, in accordance with aspects of the present disclosure.
Figure 32:
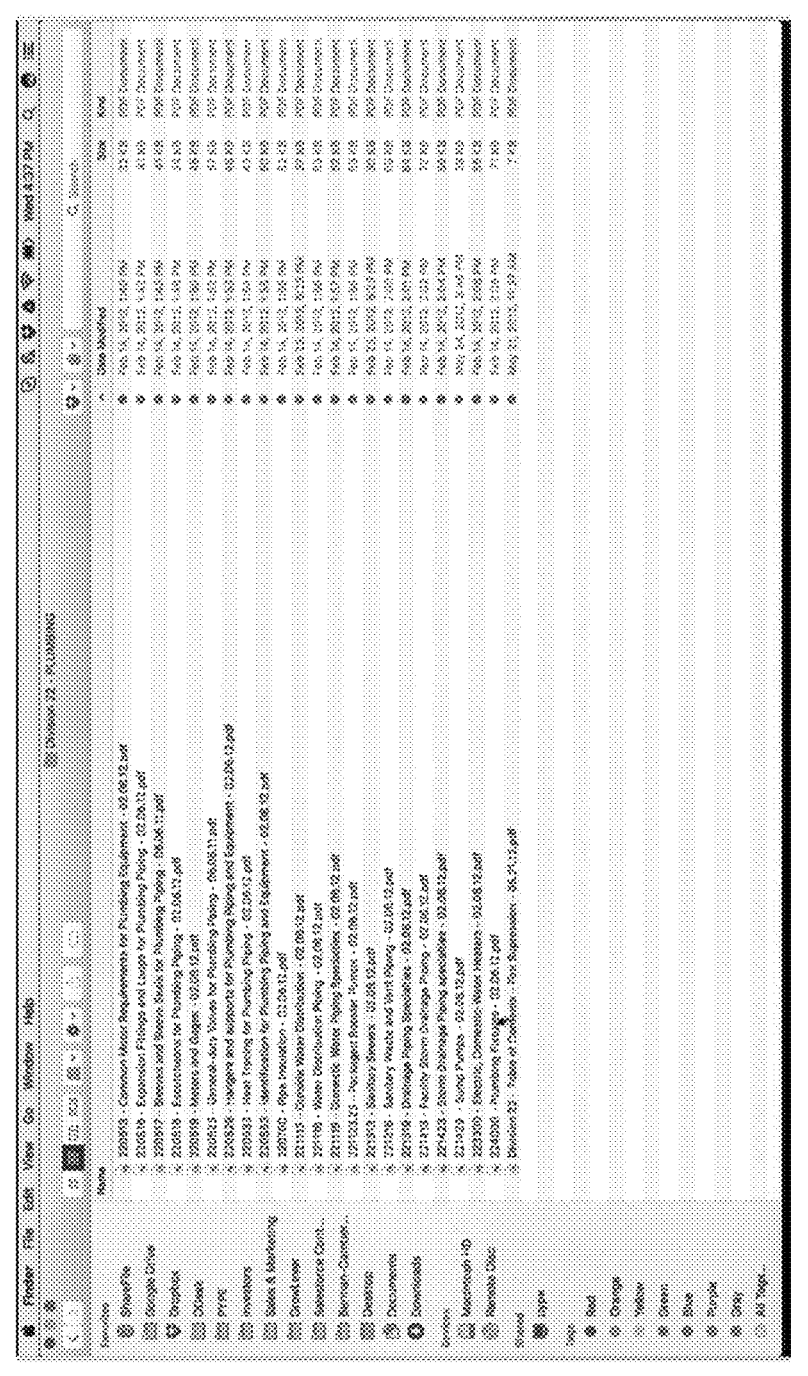
Figure 33:
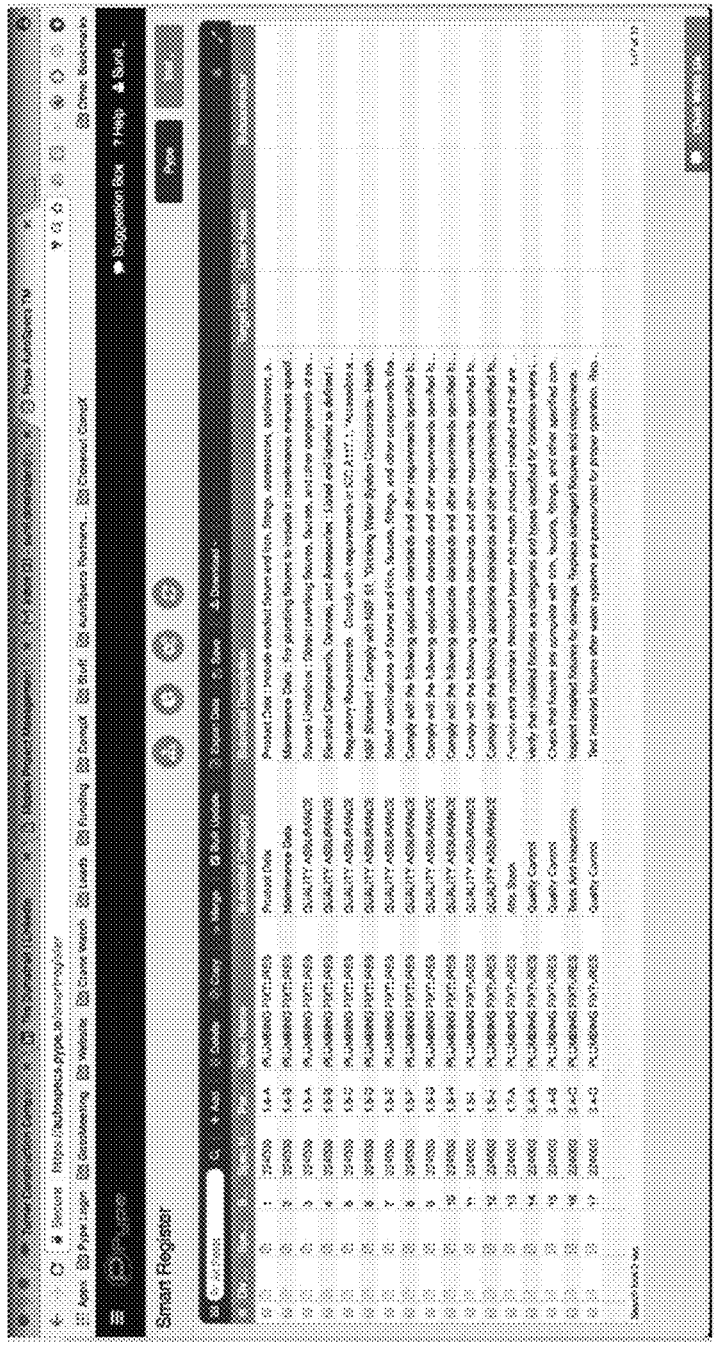
FIG. 33 shows an example GUI screen containing sample product requirements, in accordance with aspects of the present disclosure.
Figure 34:
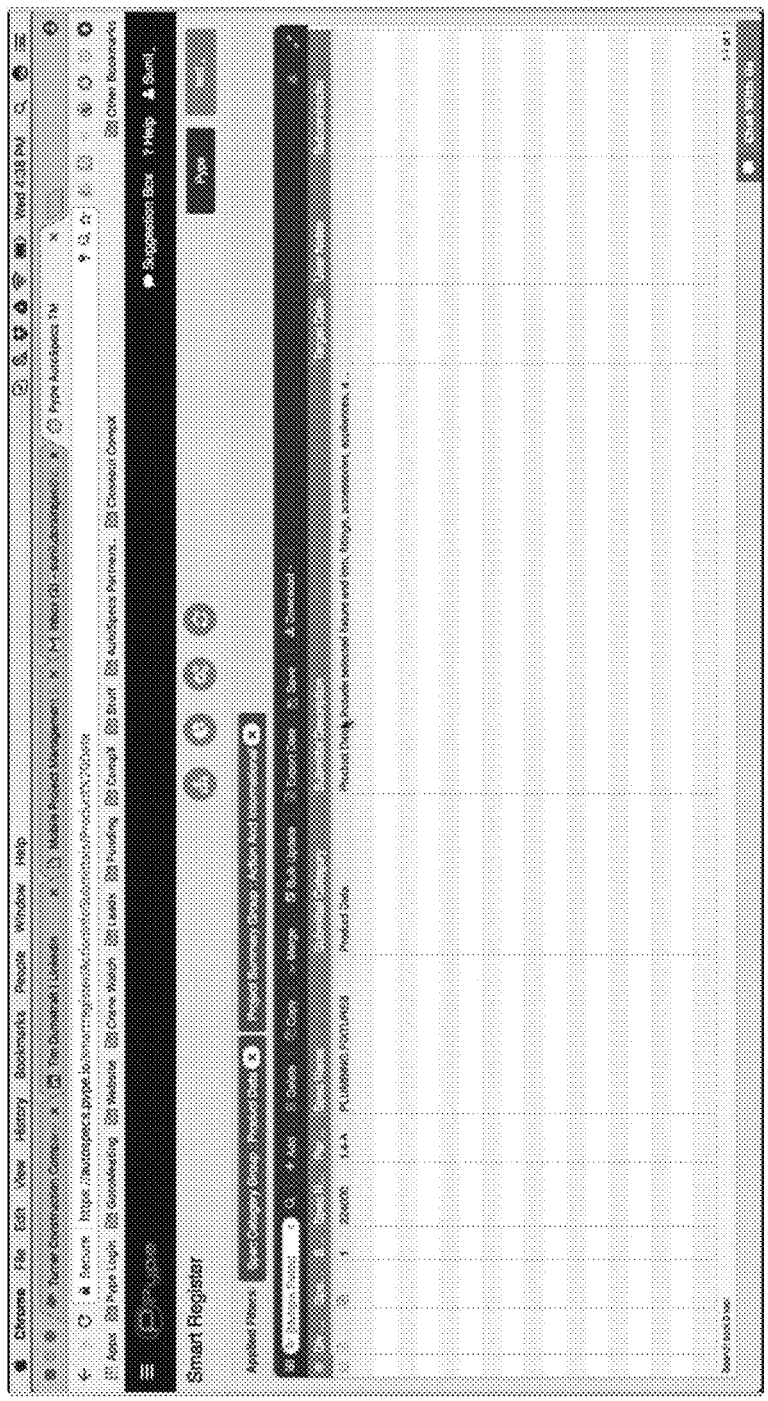
FIG. 34 shows an example GUI screen containing selected product data relating to product requirements, in accordance with aspects of the present disclosure.
Figure 35:
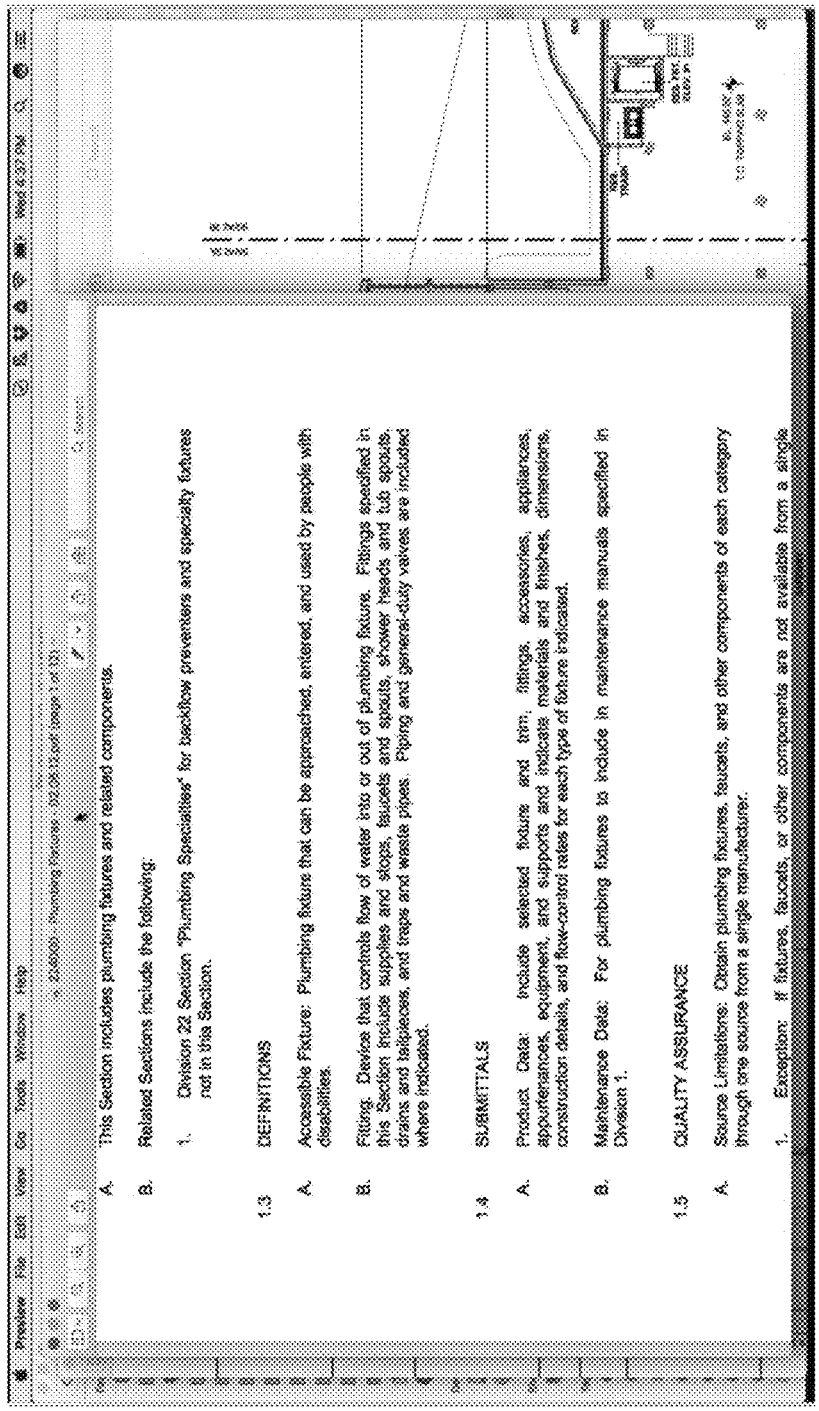
FIG. 35 shows an example GUI screen containing selected data from a specification, in accordance with aspects of the present disclosure.

Further, where, for example, such drawings are provided, but detailed specifications are not provided, the user may select specification elements and create links to those specification elements, in order to build out the details in the system for a contractor to use in completing each item. For example, in FIG. 29, a link may be added for a toilet 2900 shown in the image, and a user may identify from the classifications various specification options for the term "toilet" (see, e.g., FIG. 30 for selecting specification terms, FIG. 31 for selecting the plumbing division and FIG. 32 for selecting particular specification features relating to plumbing specification information). The user may then select to open the "product requirements" (see, e.g., 17 product requirements shown in FIG. 33) for these features, and then select the product data from the product requirements (see, e.g., FIG. 34), in order to then select specific product data (FIG. 35, for example) from specifications, to associate with the item 2900 in FIG. 29. The product data and the relevant drawing and/or portion of the drawing may then be hyperlinked, for example, to one another. The drawing, for example, may have highlighted the relevant figure portion or portions.

FIGS. 36 to 63 show additional example GUI screens for an example implementation in accordance with aspects of the present disclosure.

Figure 36:
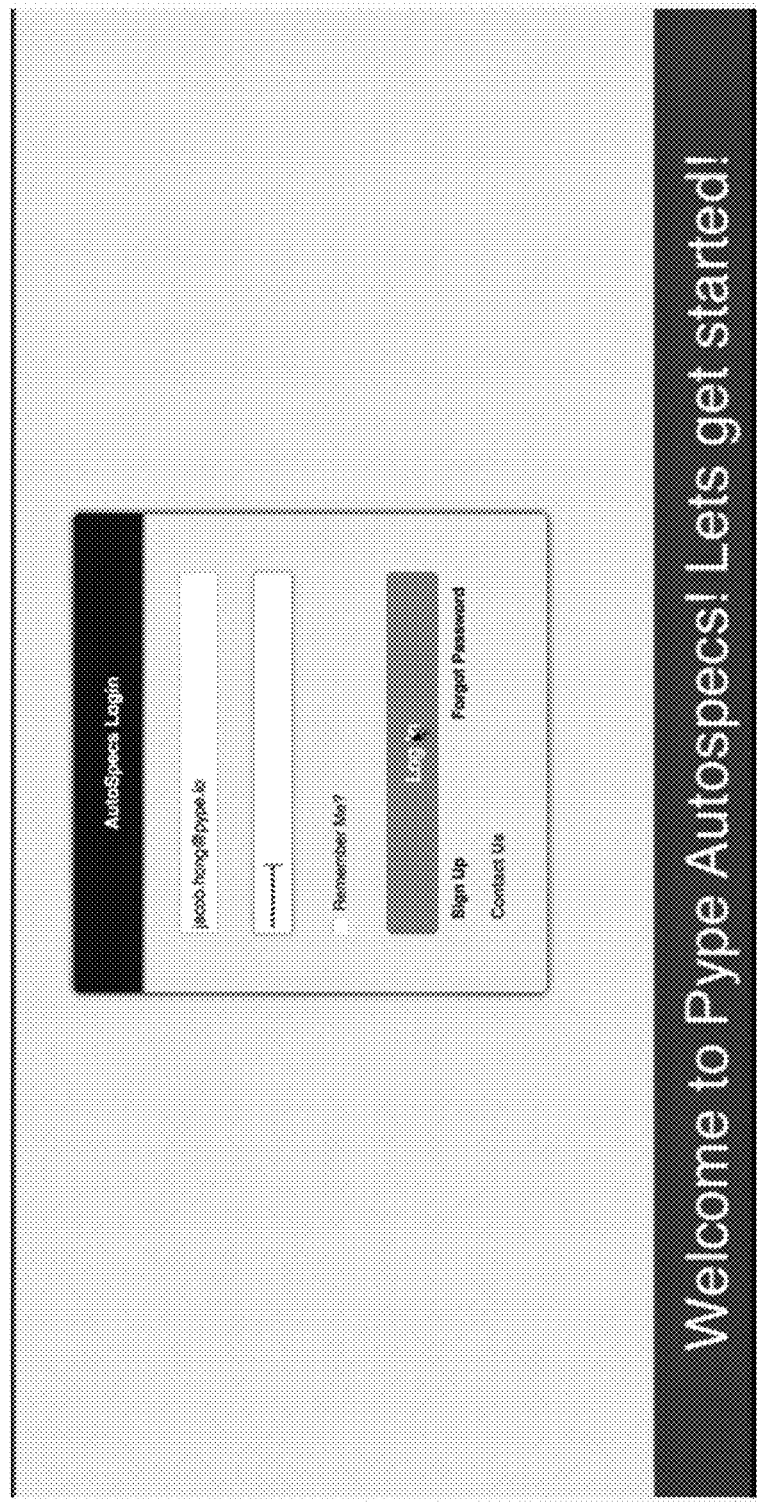
FIG. 36 shows a GUI screen for initial login for an example implementation, in accordance with aspects of the present disclosure.

FIG. 36 shows a GUI screen for initial login for an example implementation, in accordance with aspects of the present disclosure.

Figure 37:
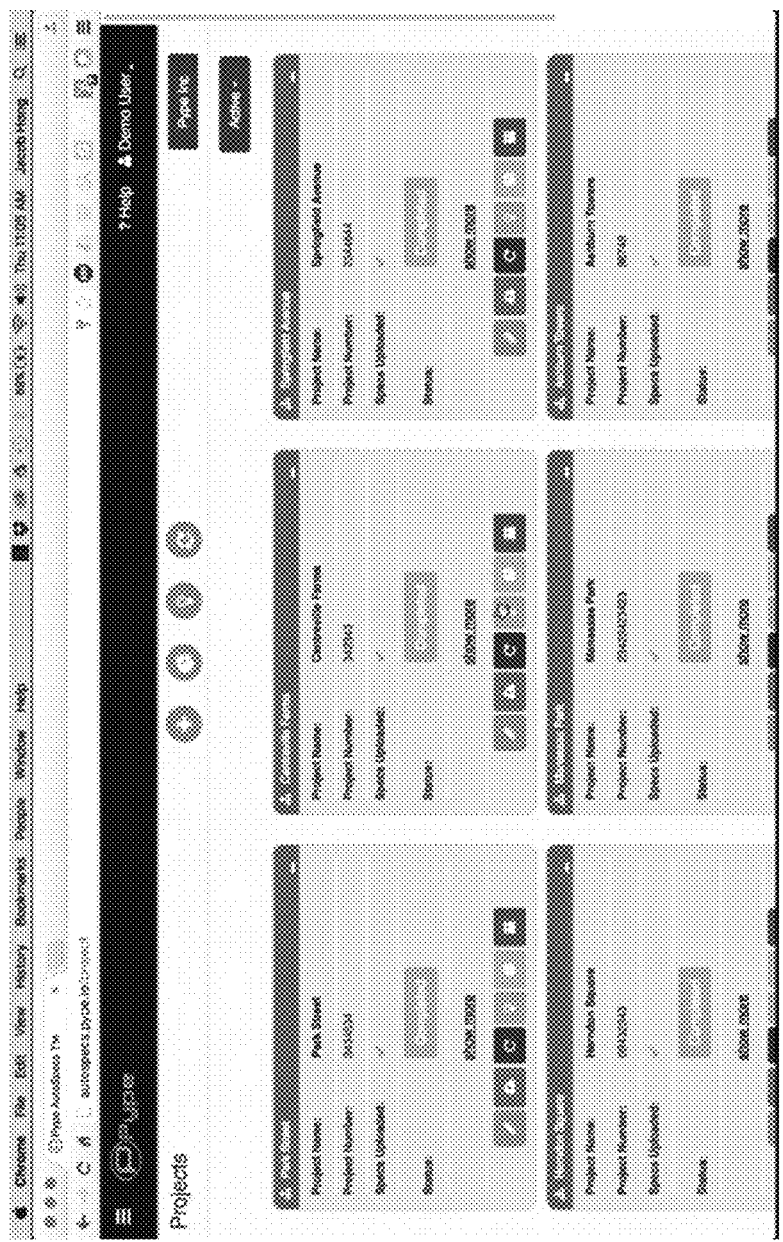
FIG. 37 shows a GUI screen containing a number of projects having specifications in an example implementation of a system in accordance with aspects of the present disclosure.

FIG. 37 shows a GUI screen containing a number of projects having specifications in an example implementation of a system in accordance with aspects of the present disclosure. As shown, the system thereby allows multiple projects to be accessed from a single system location in a uniform manner.

Figure 38:
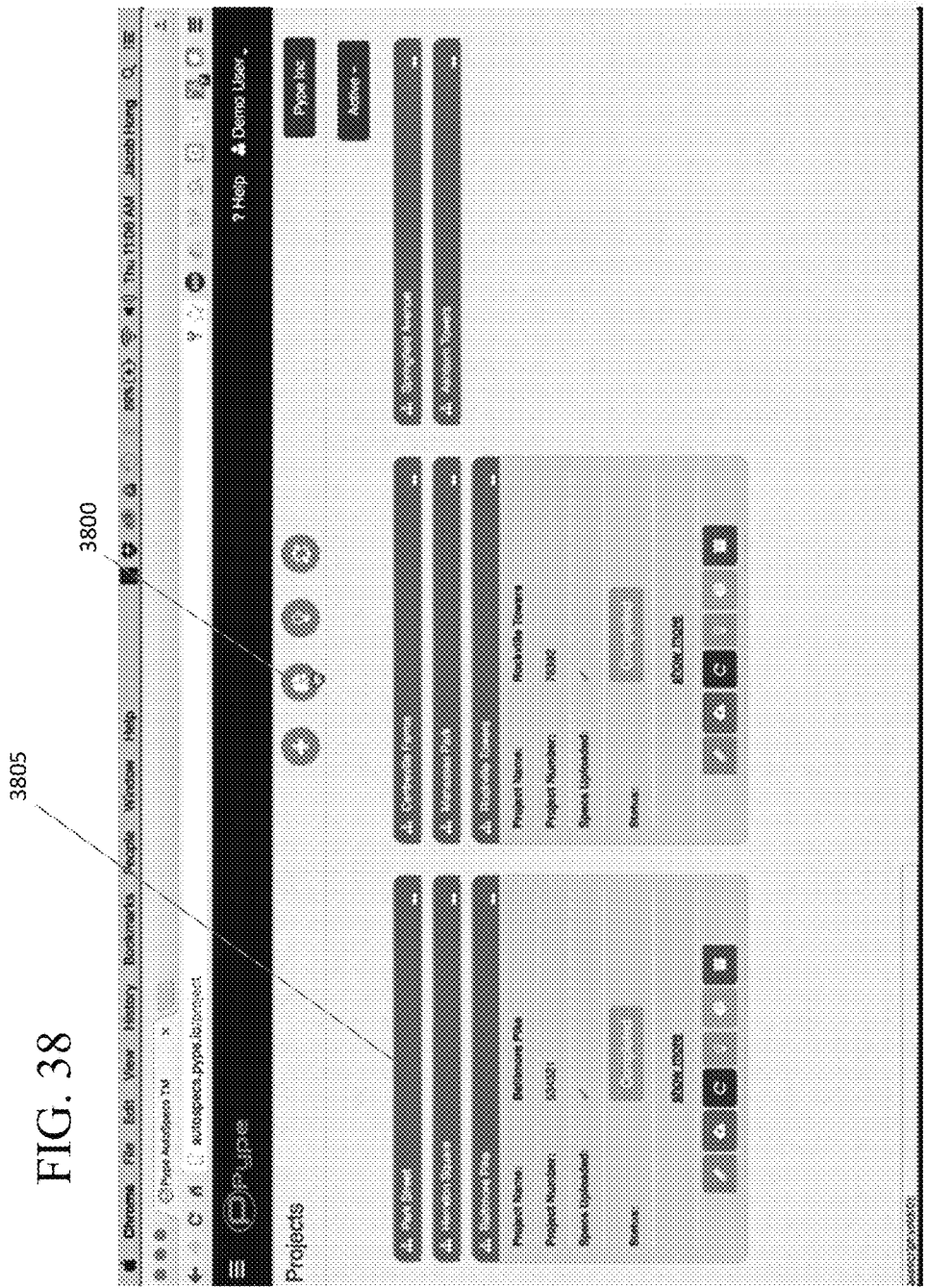
FIG. 38 shows a GUI screen containing the projects of FIG. 37 presented in a more compact file format for an example implementation of a system in accordance with aspects of the present disclosure.

FIG. 38 shows a GUI screen containing the projects of FIG. 37 presented in a more compact file format for an example implementation of a system in accordance with aspects of the present disclosure. If the project chart button 3800 is selected (e.g., for the Park Street project 3805), project submittal information is presented in chart form, as shown in FIG. 39, including information on the status of project submittals.

Figure 39:
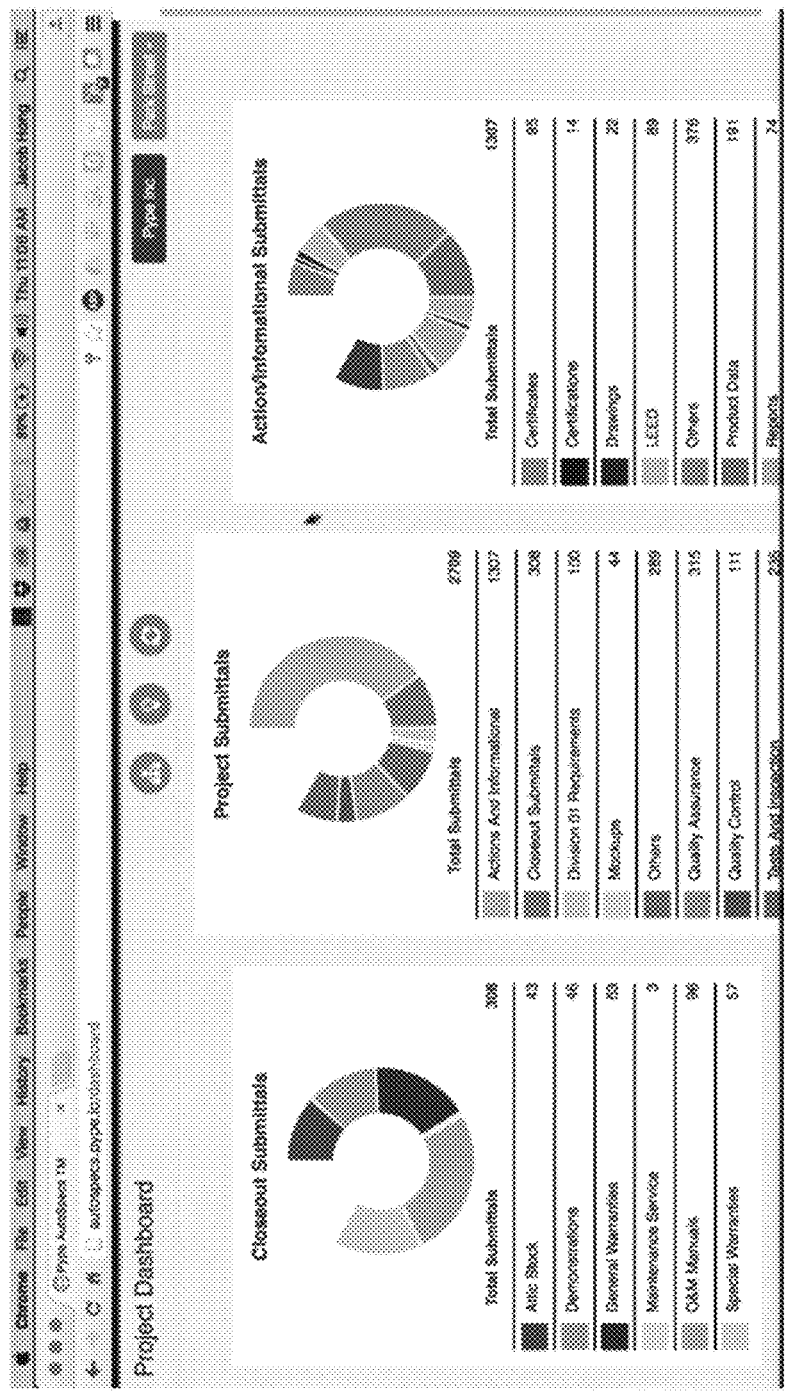
FIG. 39 shows a GUI screen for project submittal information presented in chart form, in accordance with aspects of the present disclosure.
Figure 40:
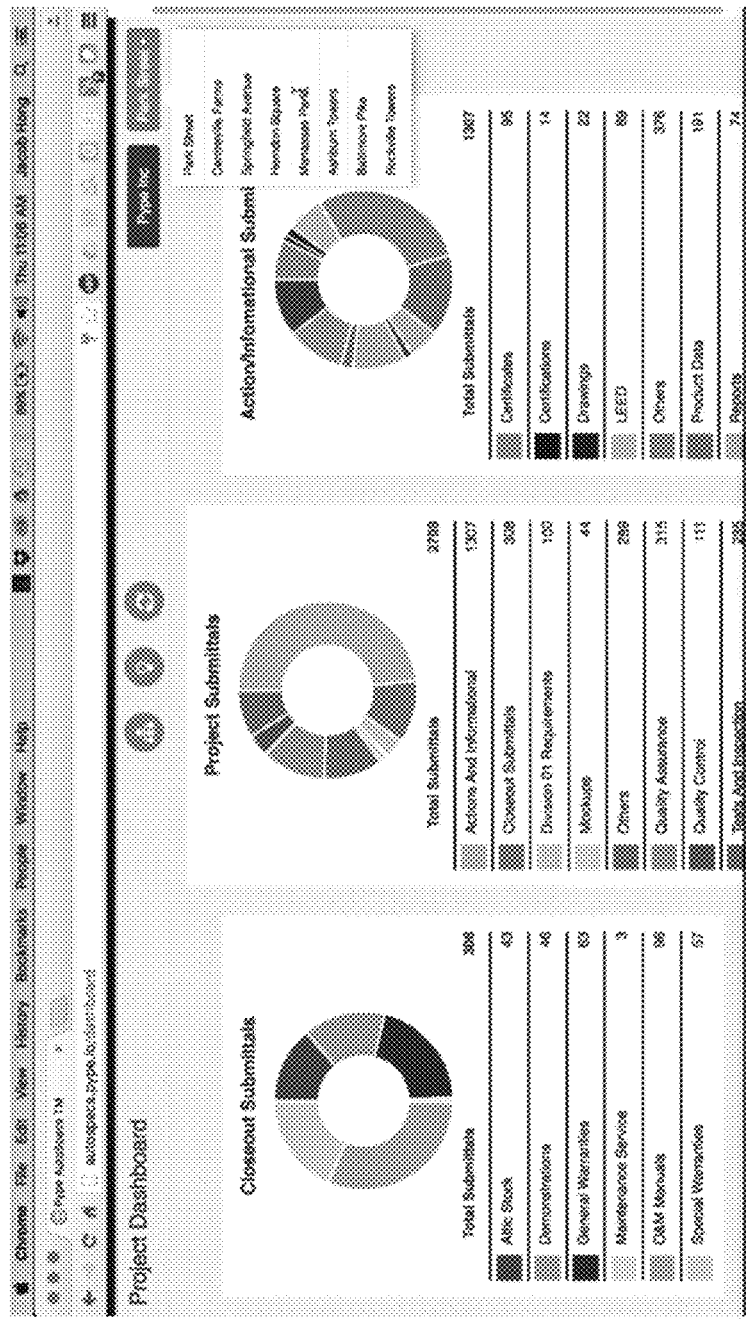
FIG. 40 shows the GUI screen of FIG. 39 with a change in projects being selected, in accordance with aspects of the present disclosure.
Figure 41:
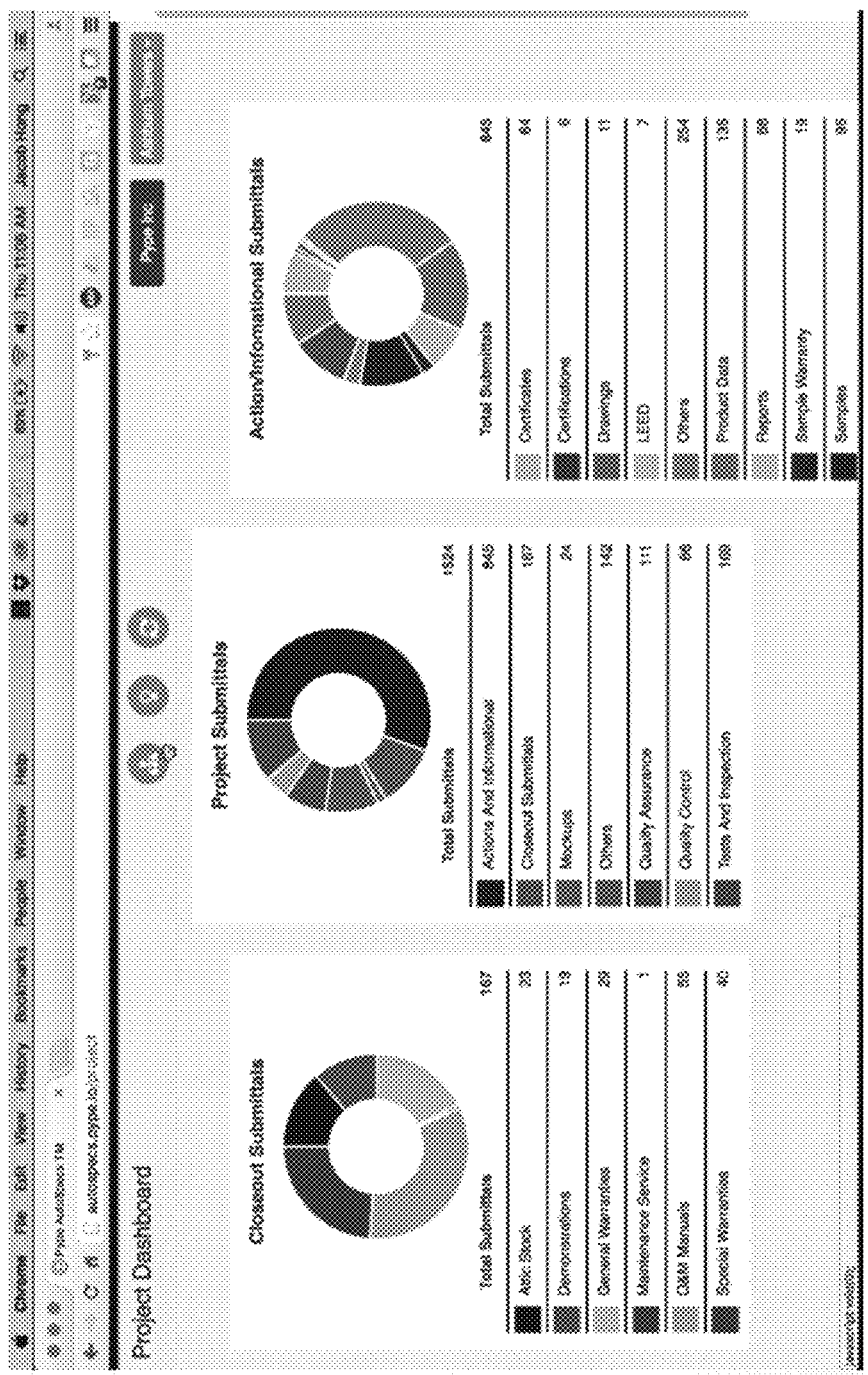
FIG. 41 shows project submittal information for a newly selected project presented, in accordance with aspects of the present disclosure.

FIG. 40 shows the GUI screen of FIG. 39 with a change in projects being selected, in accordance with aspects of the present disclosure, and FIG. 41 shows the project submittal information for the newly selected project then presented.

Figure 42:
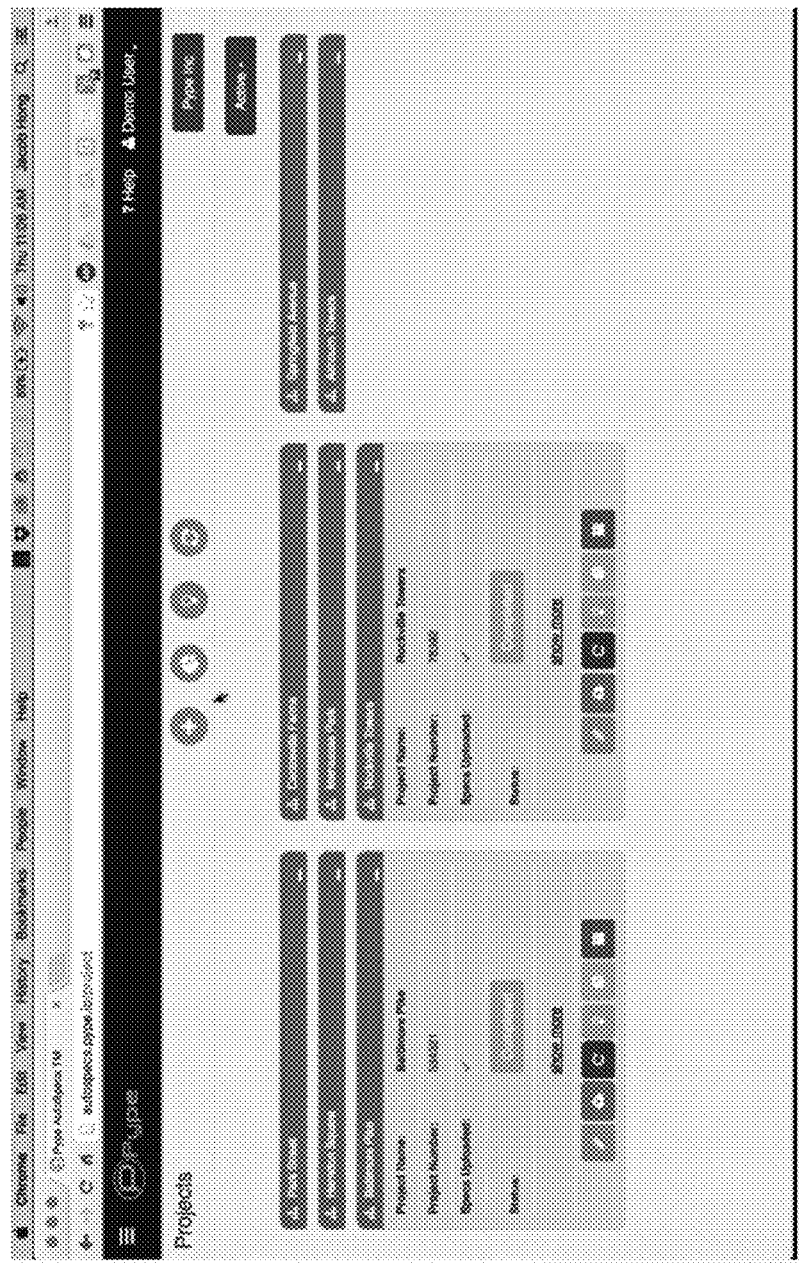
FIG. 42 shows a return to the projects overview GUI screen after selection of the projects overview button of FIG. 41.
Figure 43:
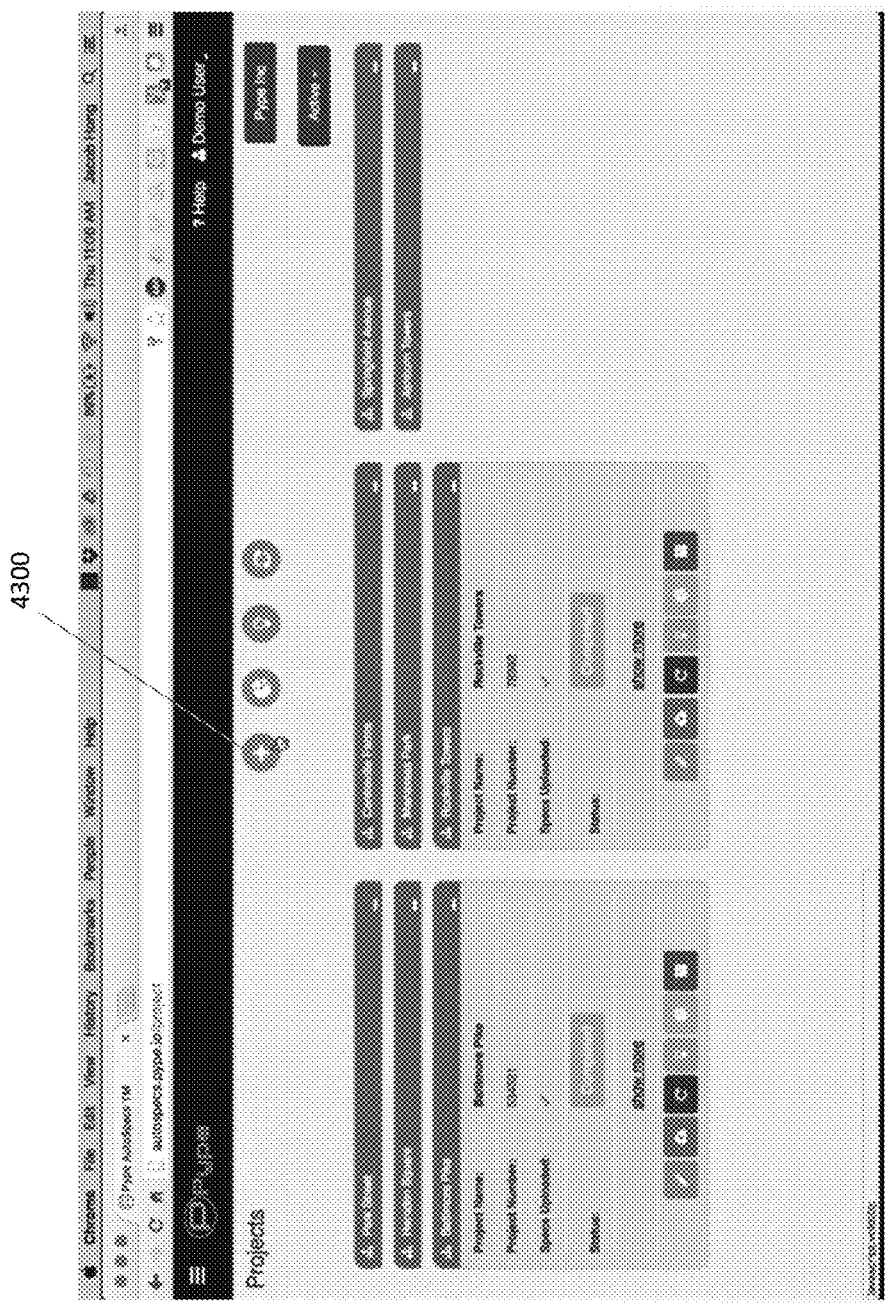
FIG. 43 shows an example GUI screen containing a selectable option for adding project information, in accordance with aspects of the present disclosure.
Figure 44:
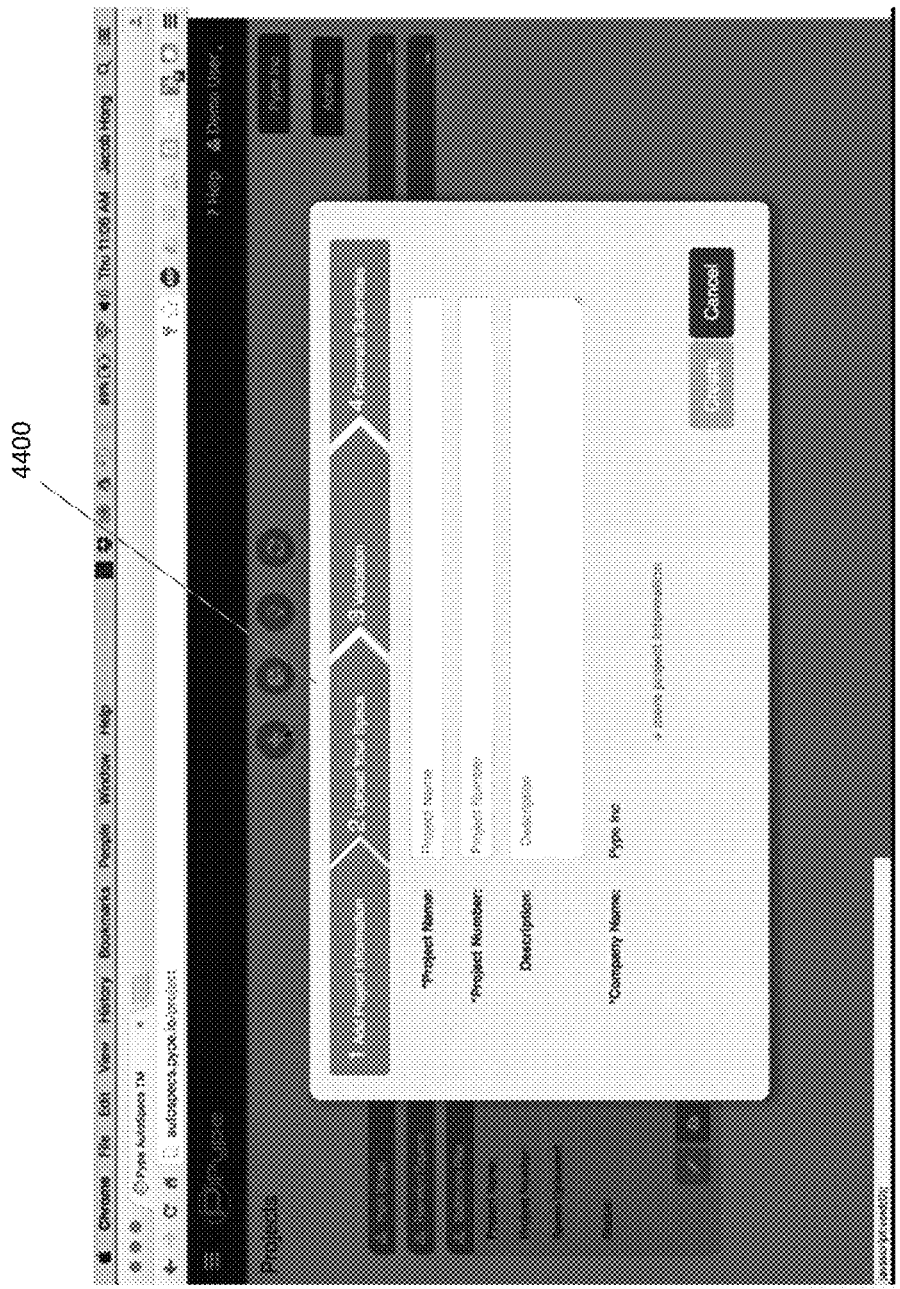
FIG. 44 shows an example GUI screen containing an add project pop up window, providing for a progression of entries to add a project, in accordance with aspects of the present disclosure.
Figure 45:
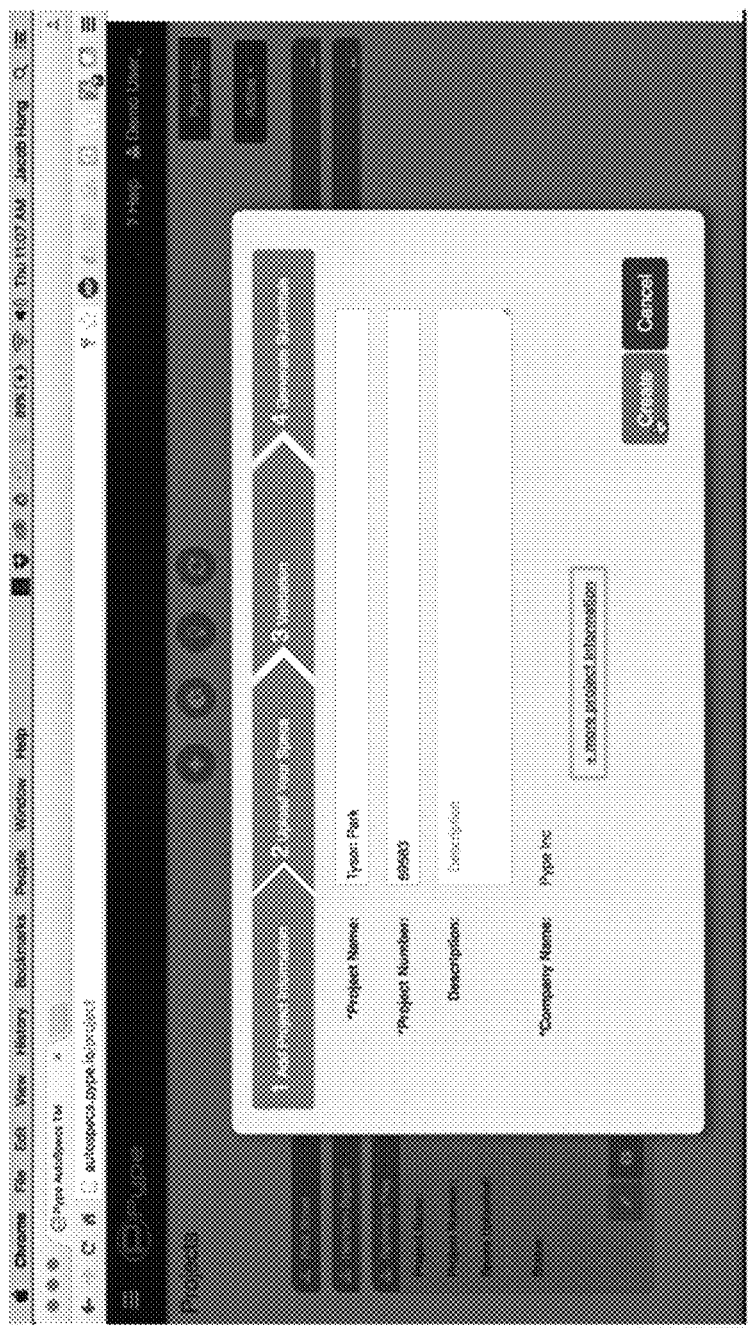
FIG. 45 shows the add project information portion of the add project pop up window of FIG. 44 with information input.

FIG. 42 shows a return to the projects overview (similar to the screen shown in FIG. 38) after selection of the projects overview button 4100 of FIG. 41. In FIG. 43, if the "+" button 4300 is then selected, the add project pop up window 4400 appears, as shown in FIG. 44, providing for a progression of entries to add a project. In FIG. 44, the basic project information may be input, and example input for the new project is shown in FIG. 45.

Figure 46:
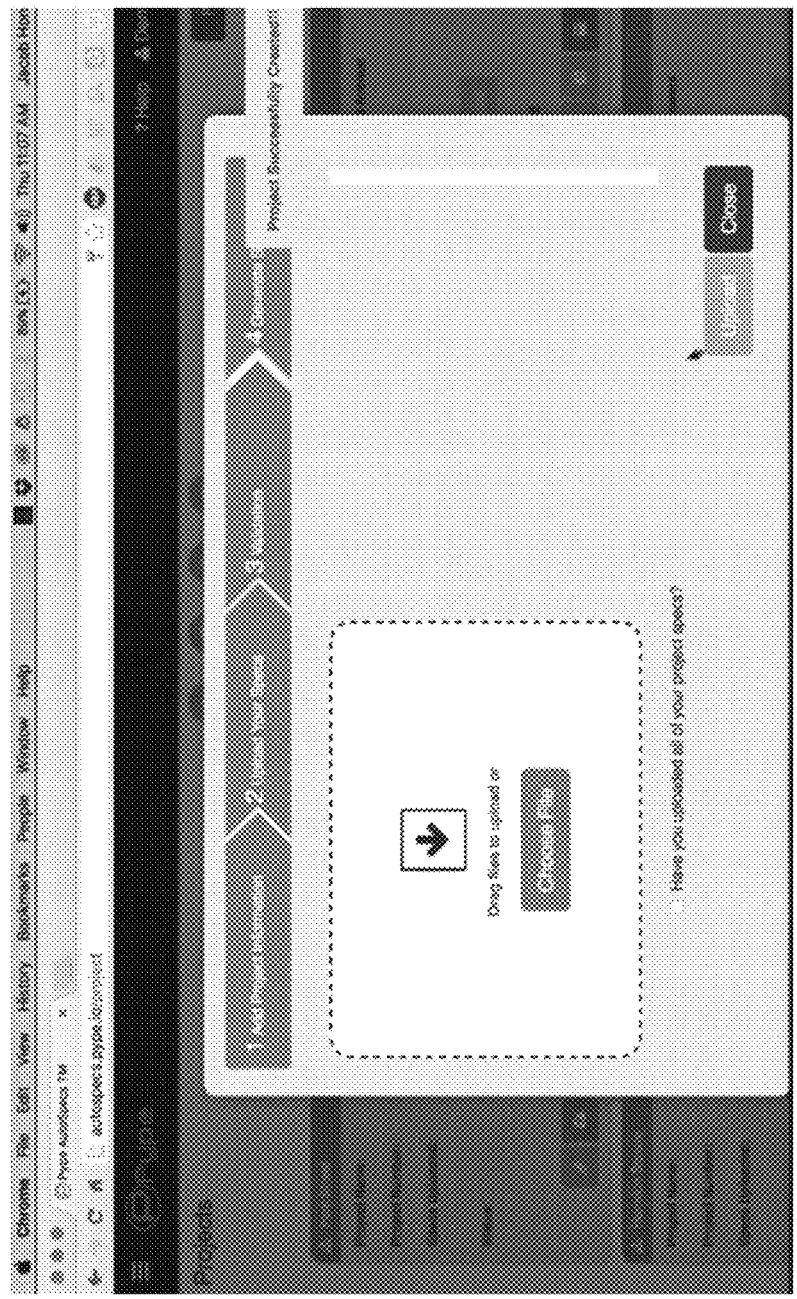
FIG. 46 shows an example GUI screen containing a pop up window for choosing a file for a new project, in accordance with aspects of the present disclosure.
Figure 47:
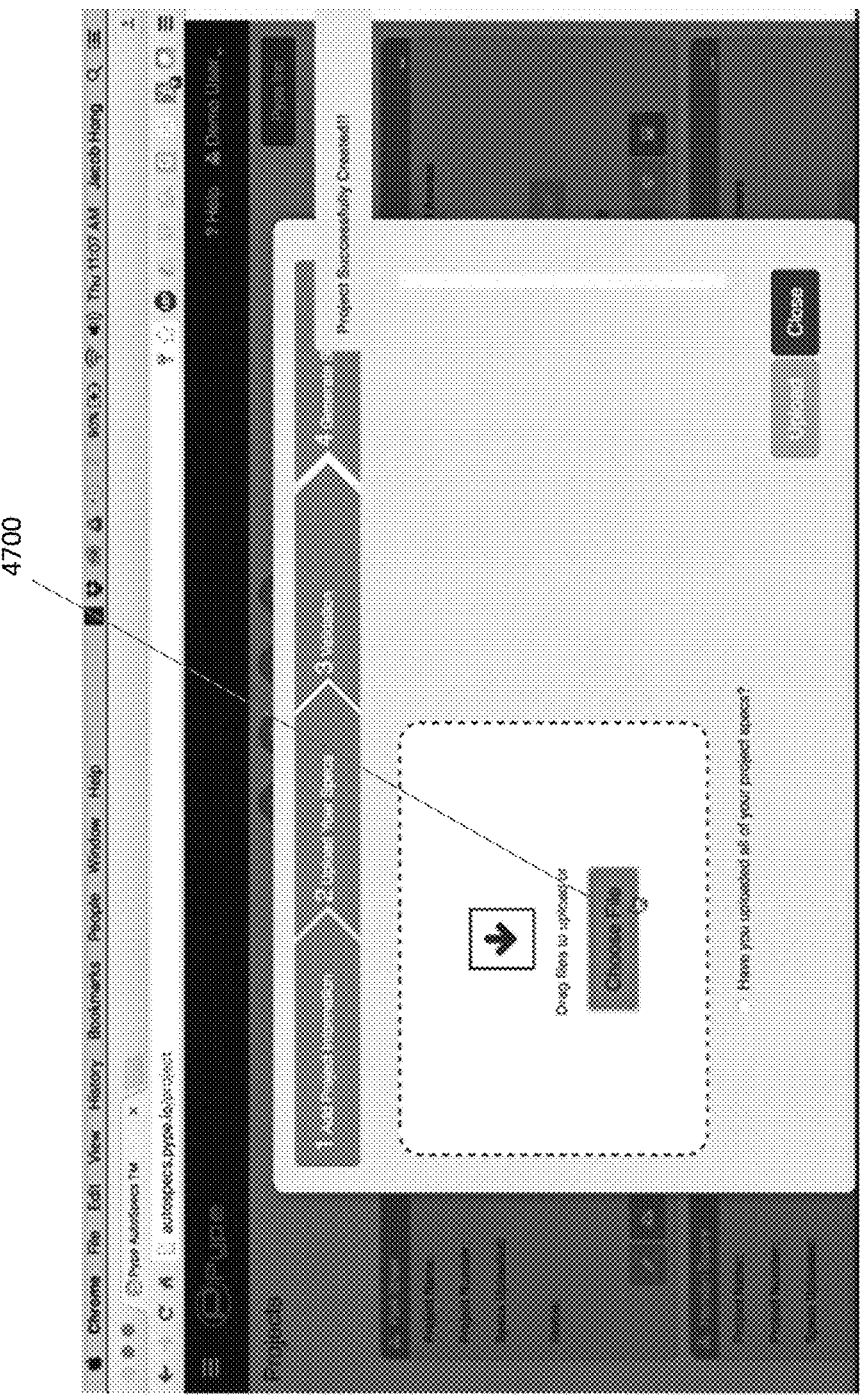
FIG. 47 shows an example GUI screen containing a selection option for choosing a file to upload for a new project, in accordance with aspects of the present disclosure.
Figure 48:
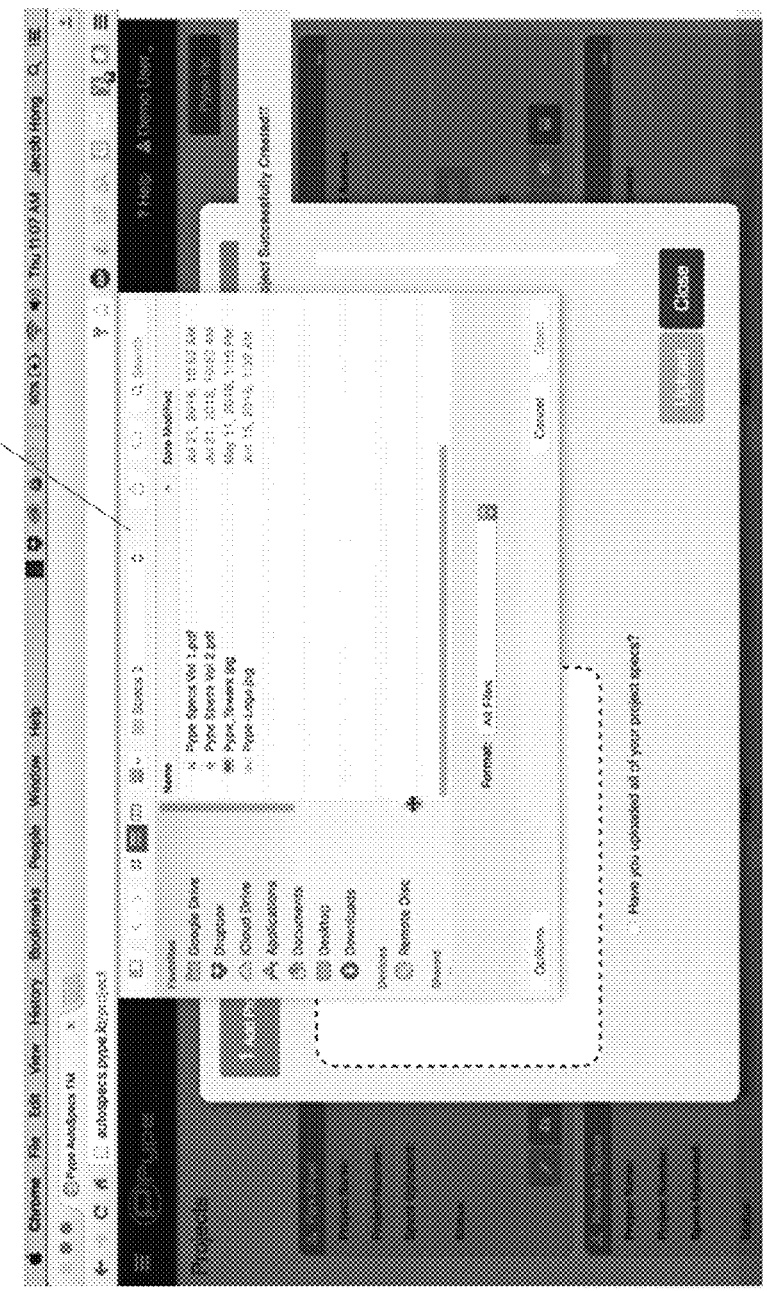
FIG. 48 shows an example GUI screen containing a file selection pop up menu for choosing a specific file to upload for a new project, in accordance with aspects of the present disclosure.
Figure 49:
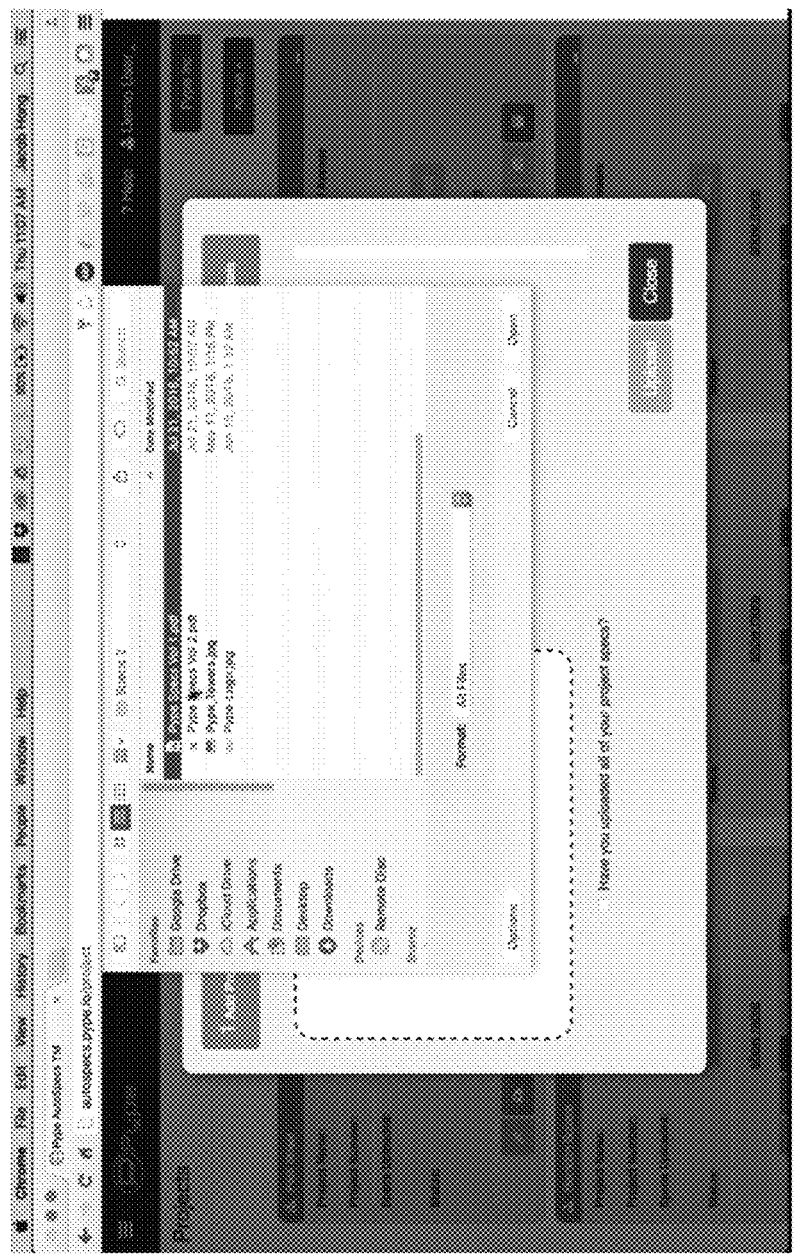
FIG. 49 shows the example GUI screen of FIG. 48 with a file selected.

The screen of FIG. 46 appears after the new project information is added, and a selection appears for uploading a new project file. Once the button 4700 to upload file is selected in FIG. 47, a file selection pop up menu 4800 appears, as shown in FIG. 48, allowing selection of a file for upload, as shown in FIG. 49.

Figure 50:
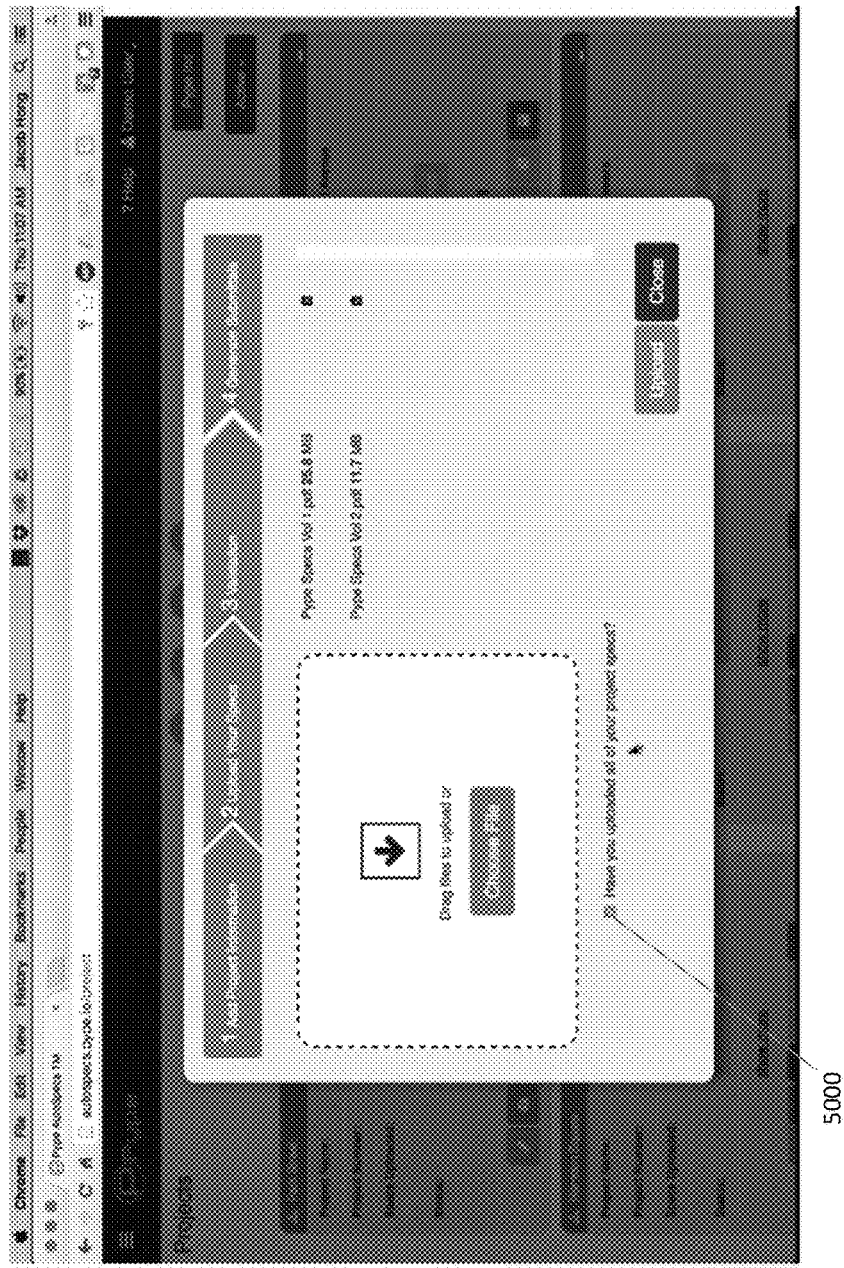
FIG. 50 shows the example GUI screen of FIG. 47 after file upload, and the selection that upload is completed.
Figure 51:
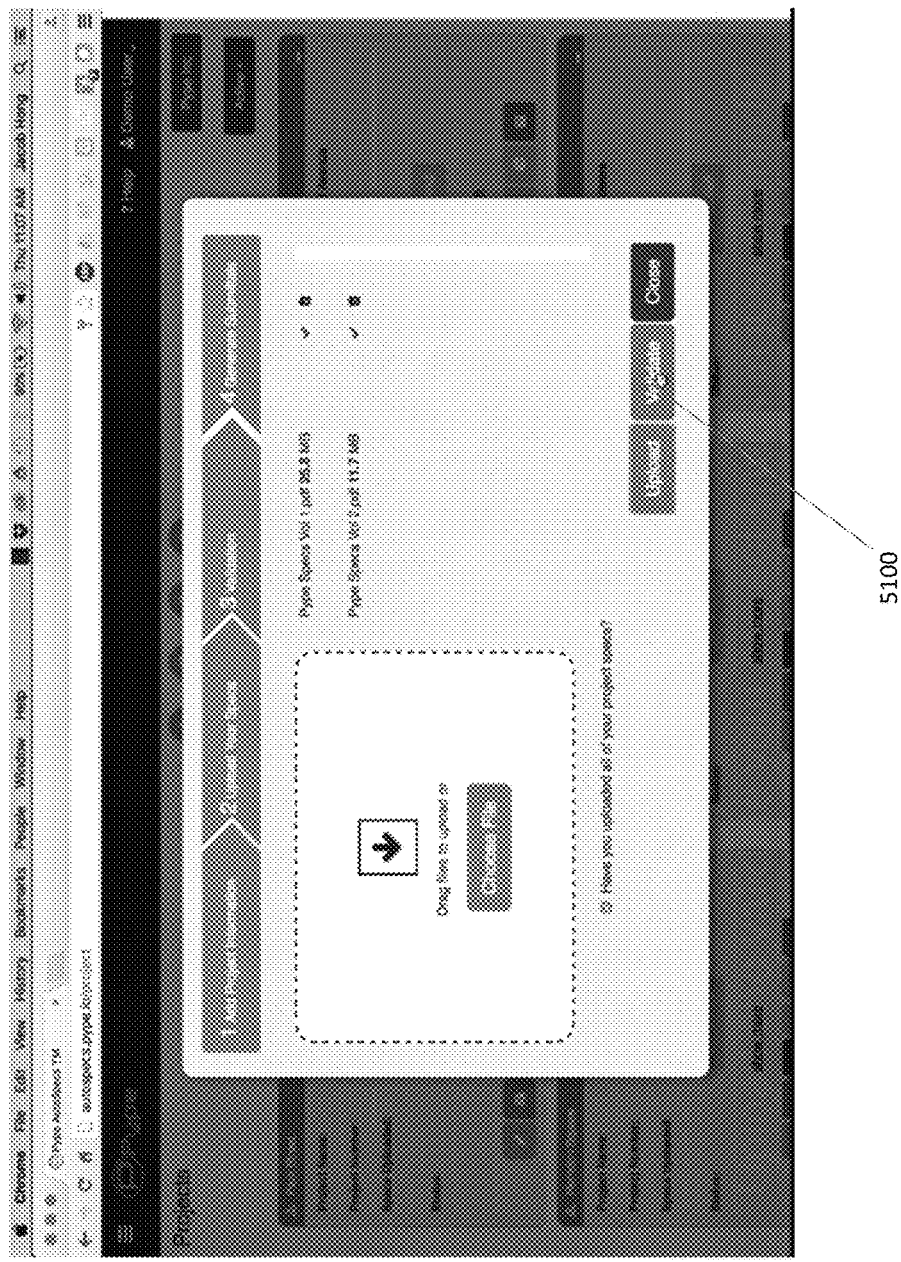
FIG. 51 shows the example GUI screen of FIG. 50 with the upload completed and an option to validate provided.
Figure 52:
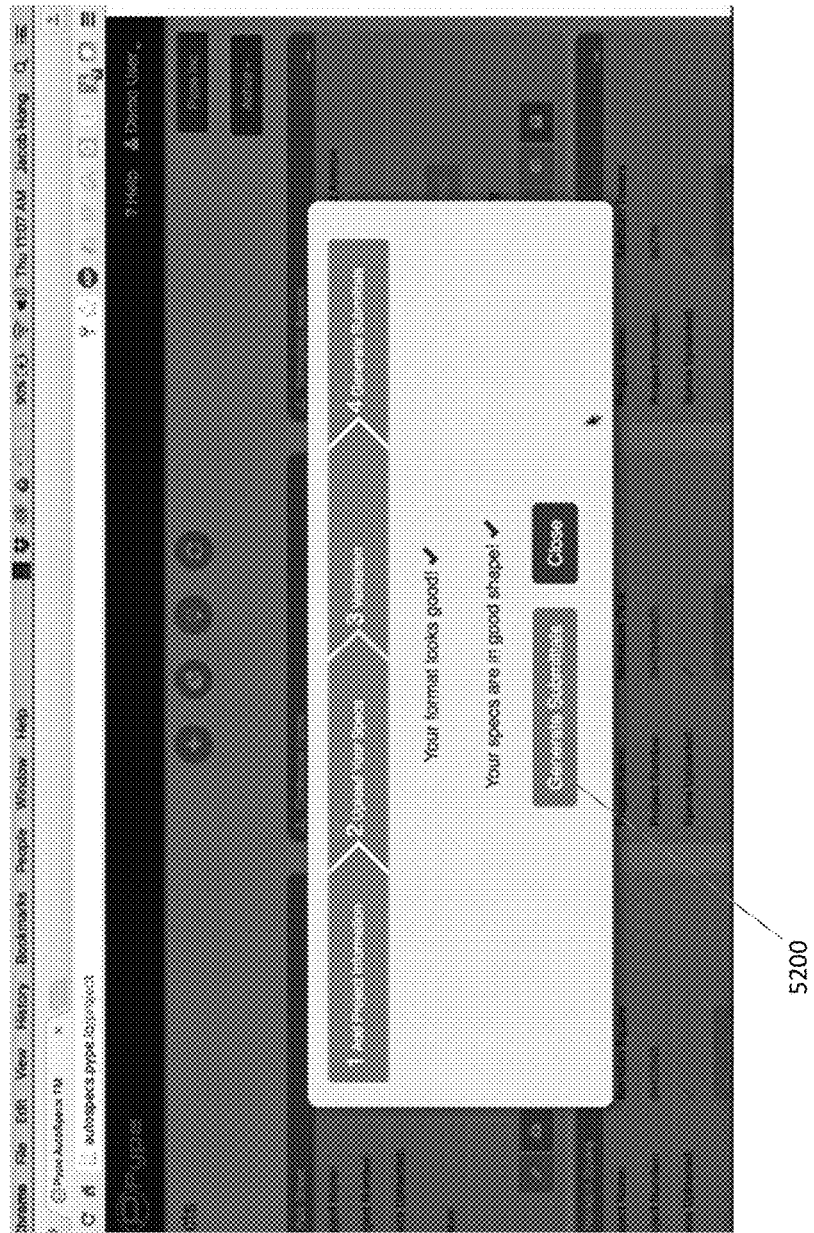
FIG. 52 shows the example GUI screen containing the add project pop up window of FIG. 44, showing a selection to generate submittals.
Figure 53:
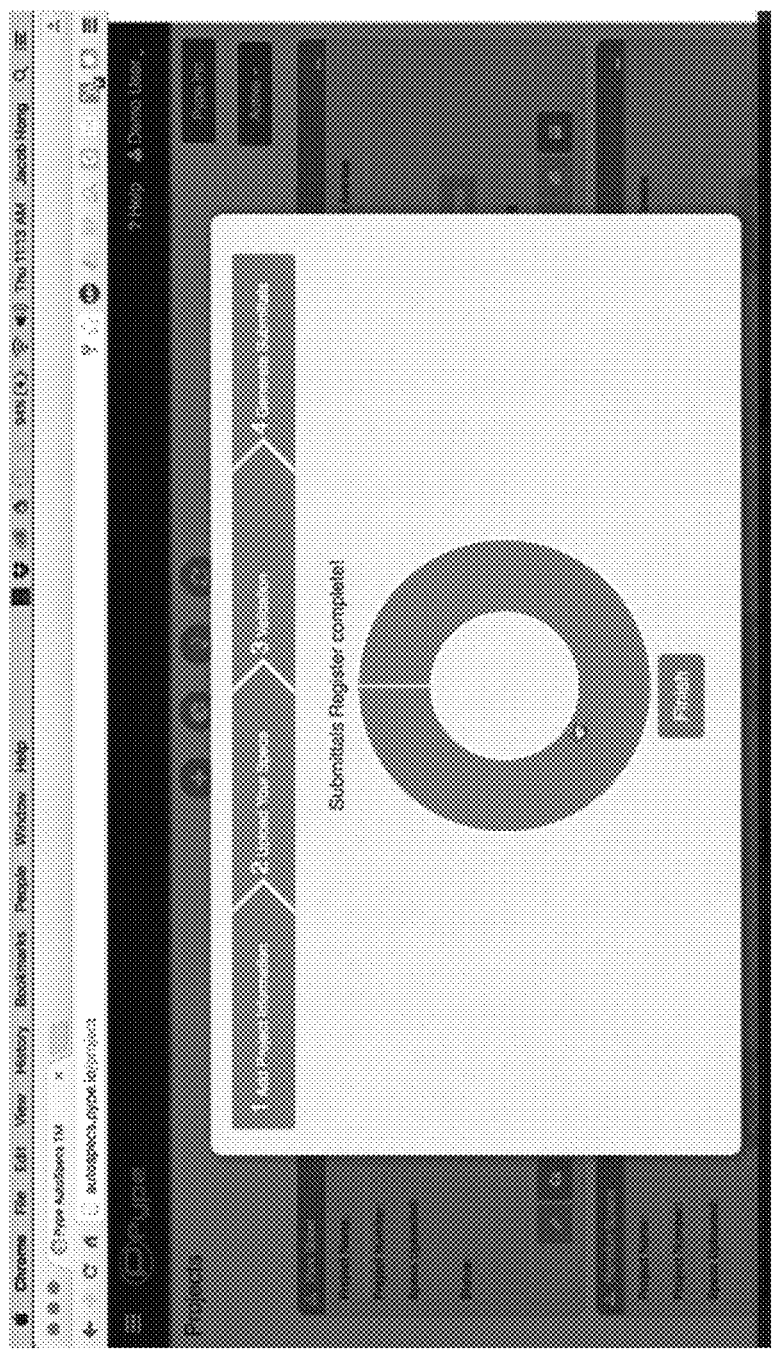
FIG. 53 shows an example GUI screen that may appear upon completion of the Submittals Registration selected in FIG. 52.

Once file upload is completed, as shown in FIG. 50, the selection 5000 can be made, and the option to validate 5100 the uploaded files may be selected, as shown in FIG. 51. Once validation is completed, as shown in FIG. 52, a selection to generate submittals 5200 may be made. FIG. 53 shows an example GUI screen that may appear upon completion of the Submittals Registration.

Figure 54:
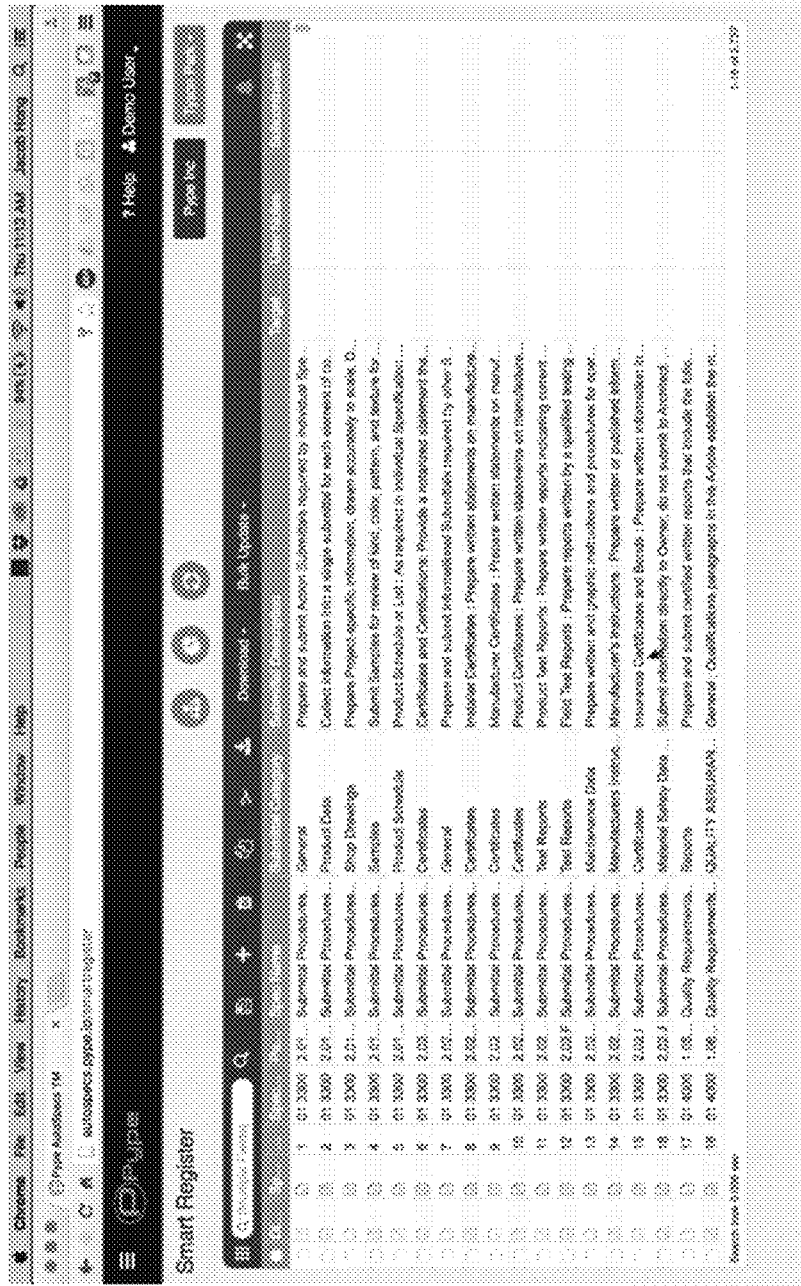
FIG. 54 shows a GUI screen for an example project, containing various classified portions of a Submittal Register, in accordance with aspects of the present disclosure.
Figure 55:
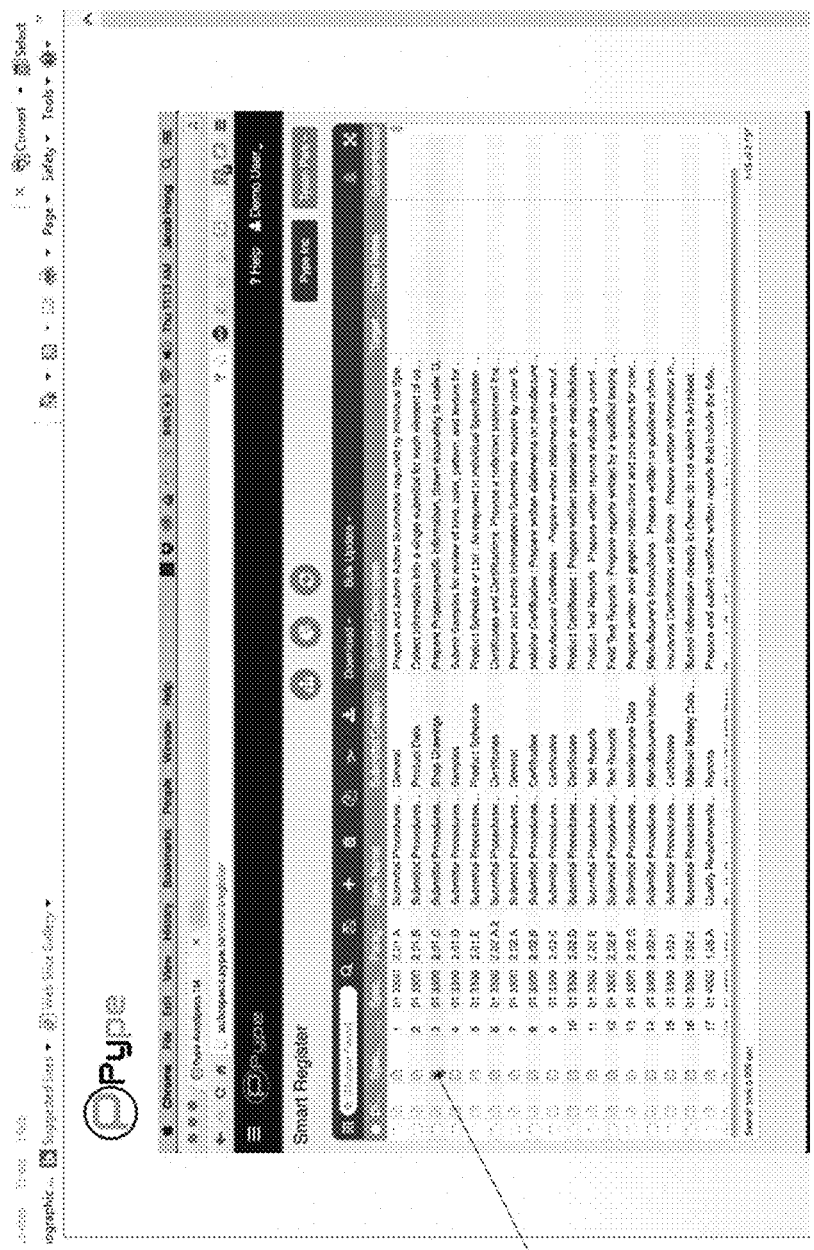
FIG. 55 shows an example GUI screen containing a selection of a classified portion from a list of classified portions of a specification, in accordance with aspects of the present disclosure.
Figure 56:
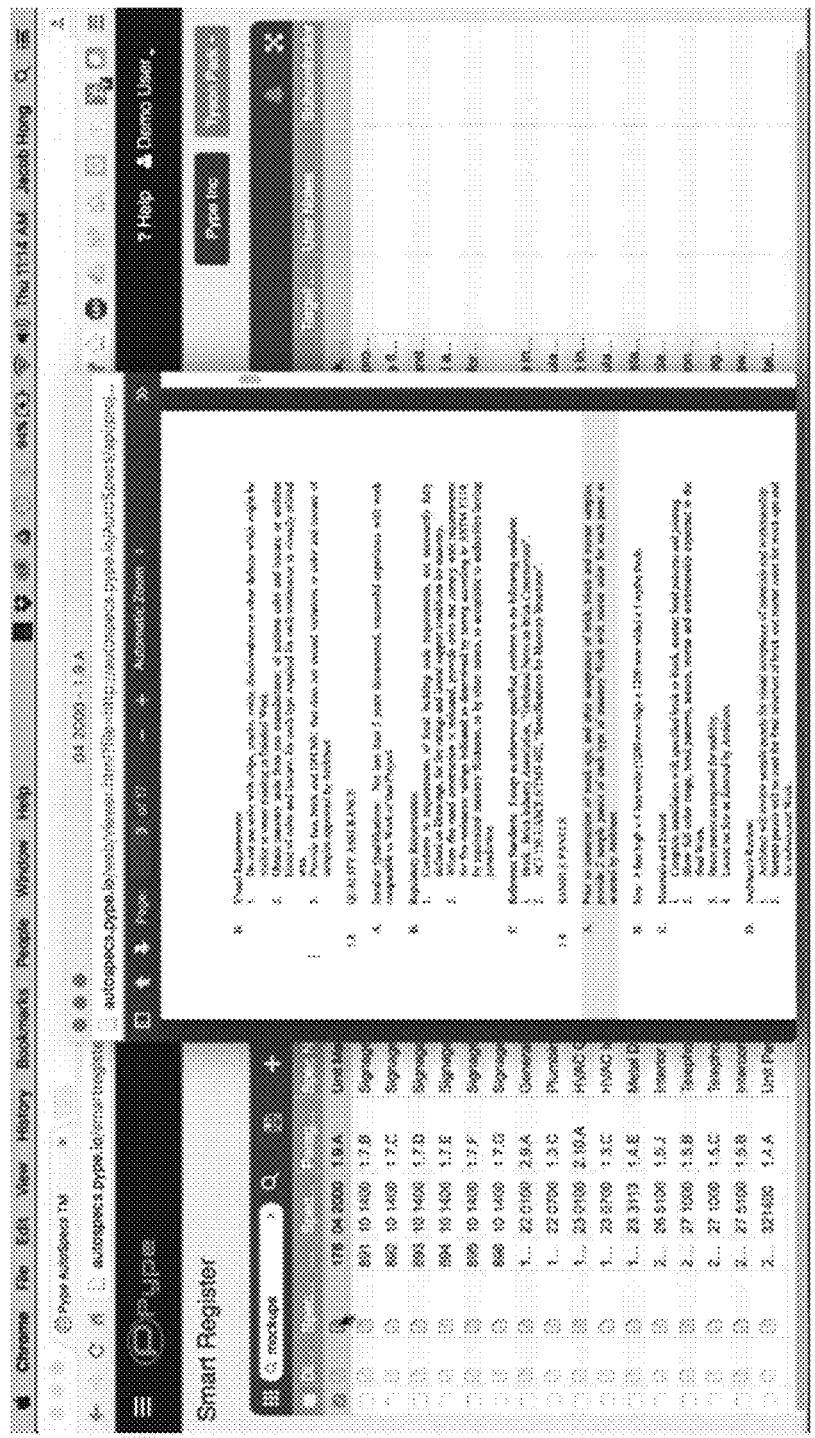
FIG. 56 shows an example GUI screen with a relevant portion specification retrieved, based on the selection in FIG. 55.

FIG. 54 shows a GUI screen for an example project, containing various classified portions of a Submittal Register. As shown in FIG. 55, a selection may be made of a classified portion, such as "shop drawings." For example, if the "spec" column item corresponding to "shop drawings" 5500 is selected, the relevant specification portion may be retrieved, as shown in FIG. 56.

Figure 57:
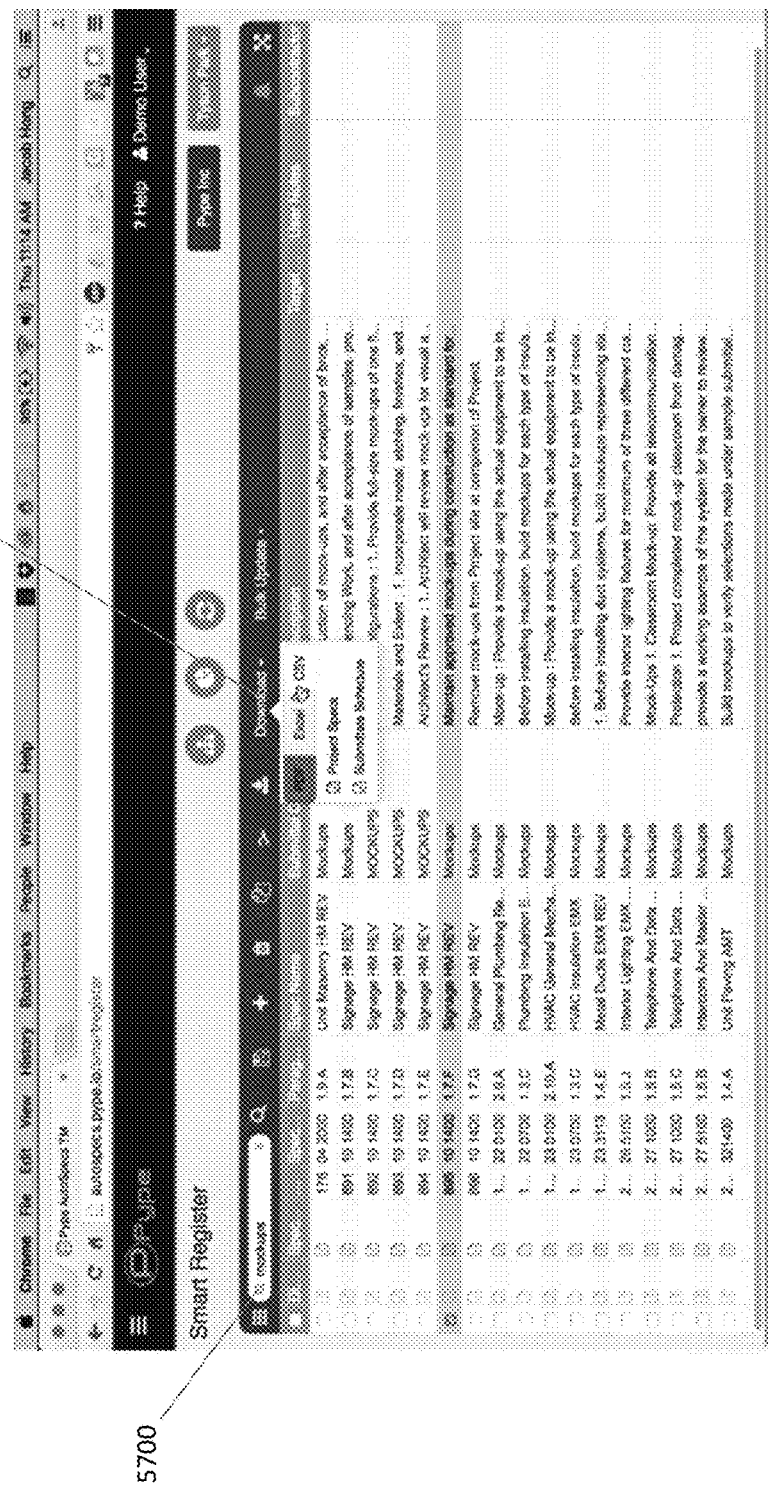
FIG. 57 shows a GUI screen for downloading example results for a key word search of an input specification, in accordance with aspects of the present disclosure.

FIG. 57 shows example results for a search using the key word "mockups" in the search box 5700. Once selected, the data relating to the selected result may be downloaded using the "download" button 5705, for example.

Figure 58:
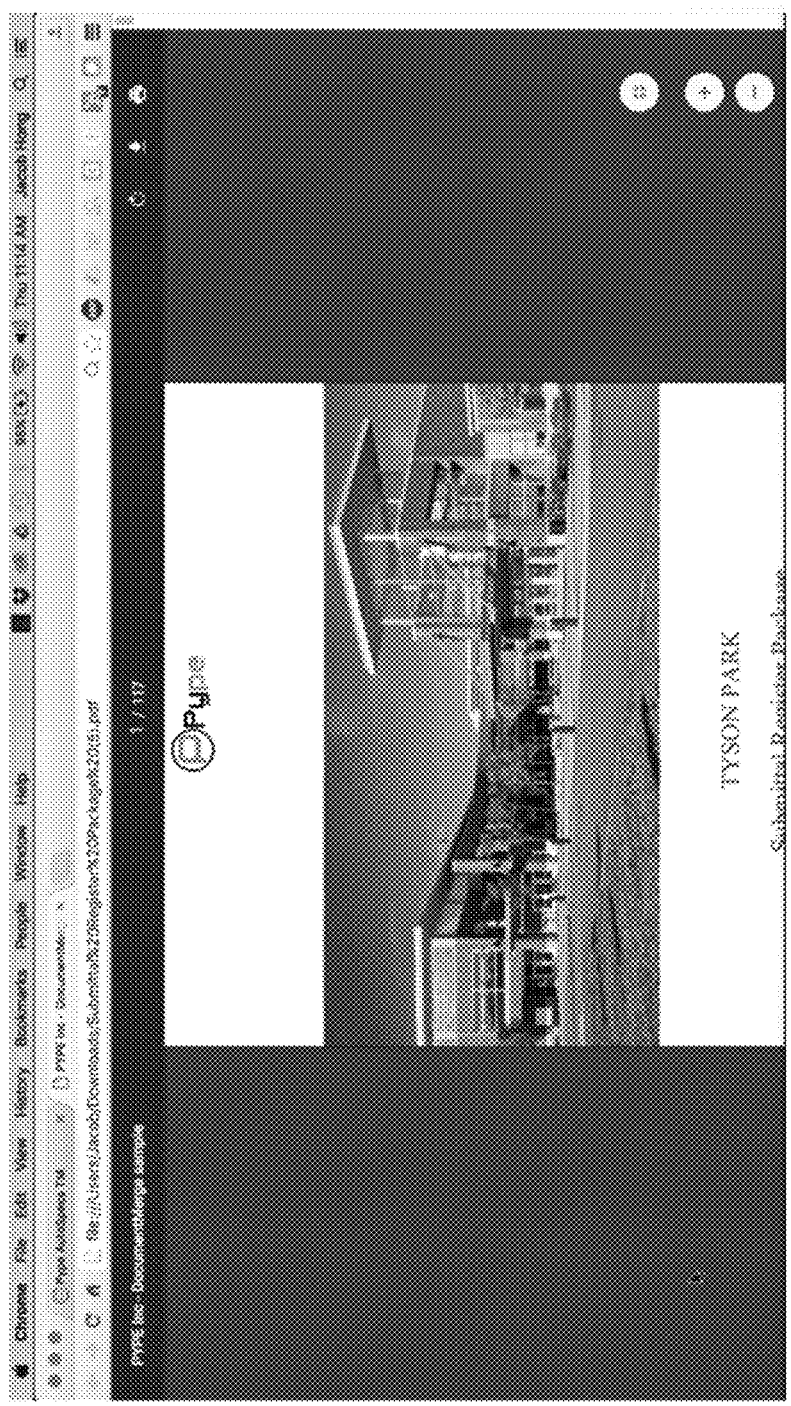
FIGS. 58-60 show example views of a portion of Submittal Register Package for the project that was downloaded in FIG. 57.
Figure 59:
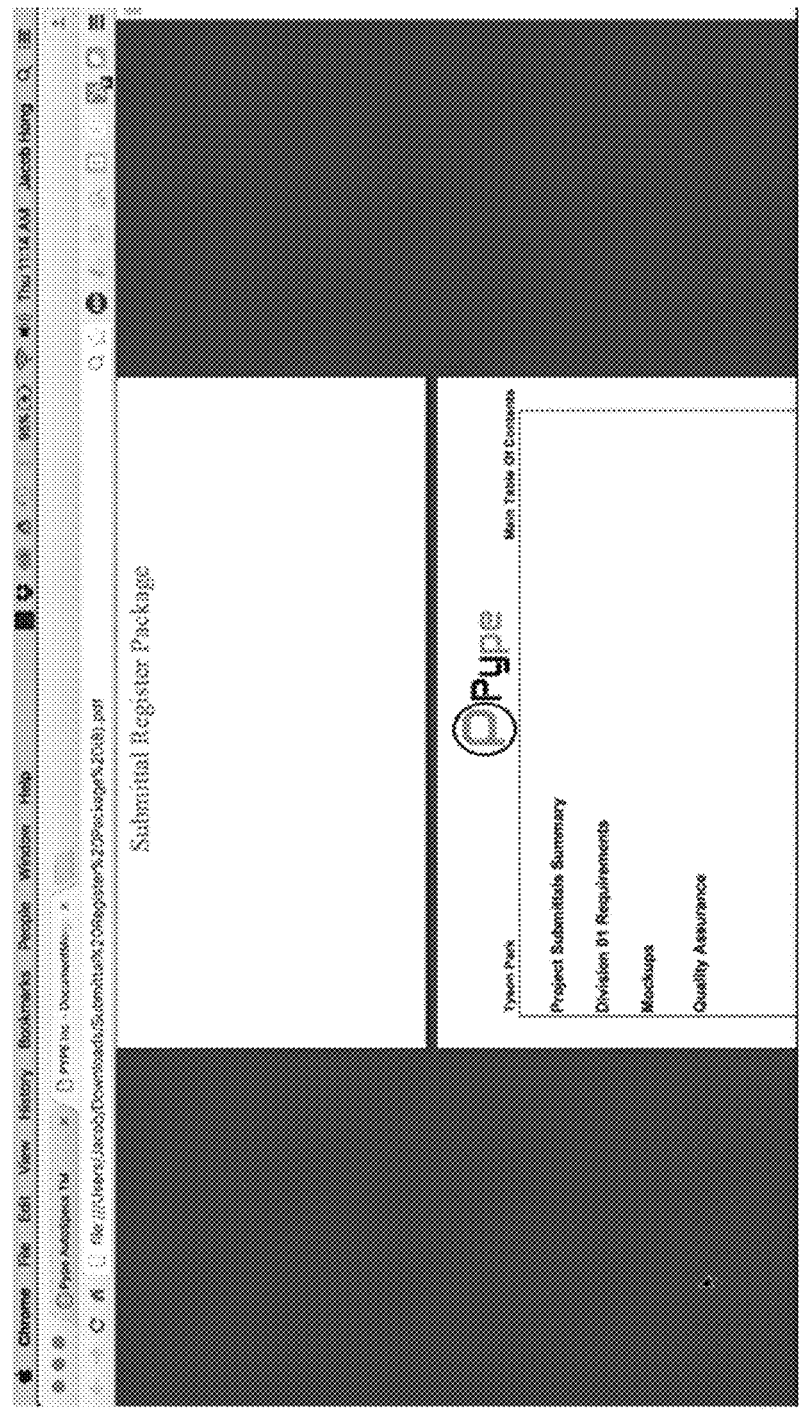
Figure 60:
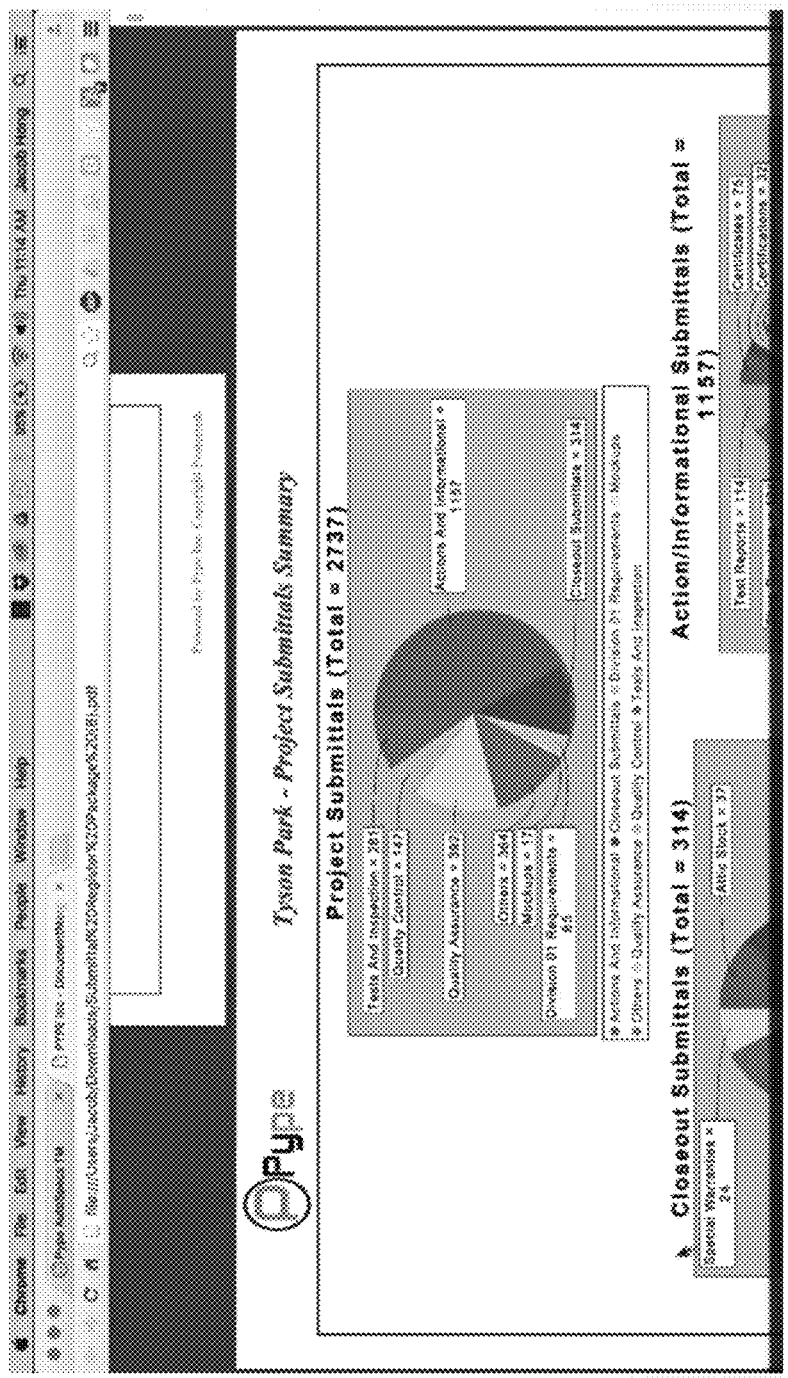

FIGS. 58-60 show example views of a portion of Submittal Register Package for the project that was downloaded in FIG. 57, which has been formatted in the system using custom branding.

Figure 61:
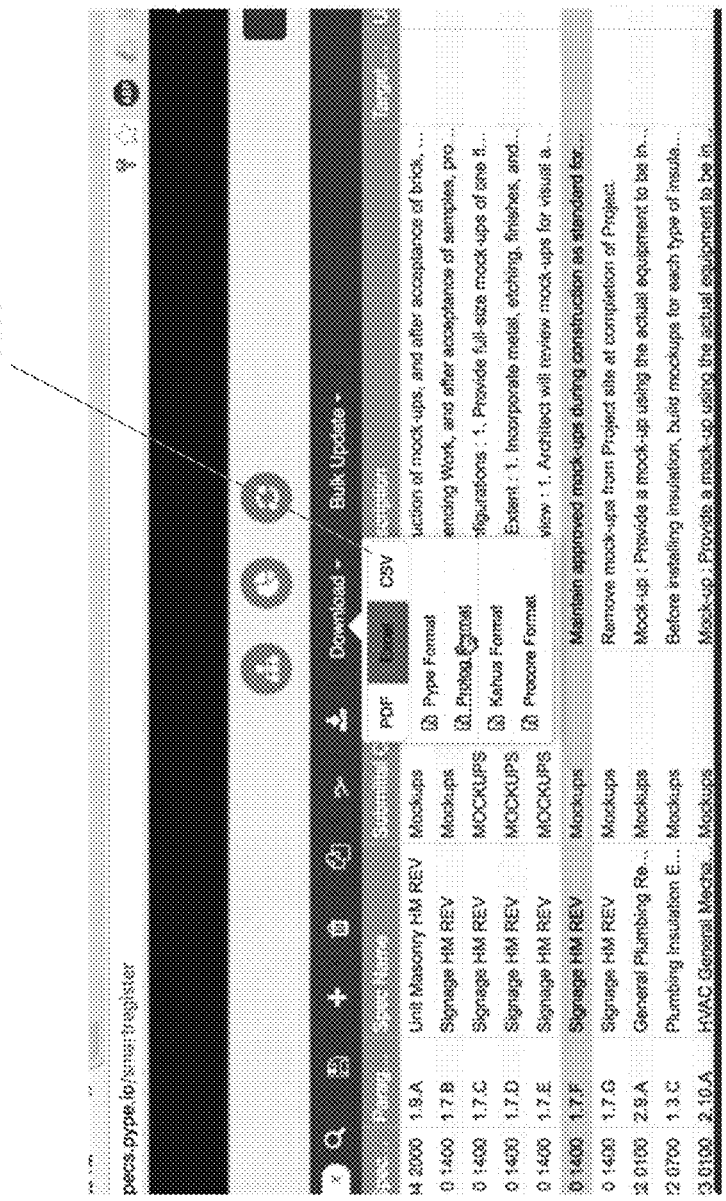
FIG. 61 shows the selection of a download of selected information for a specification in a spreadsheet format, in accordance with aspects of the present disclosure.
Figure 62:
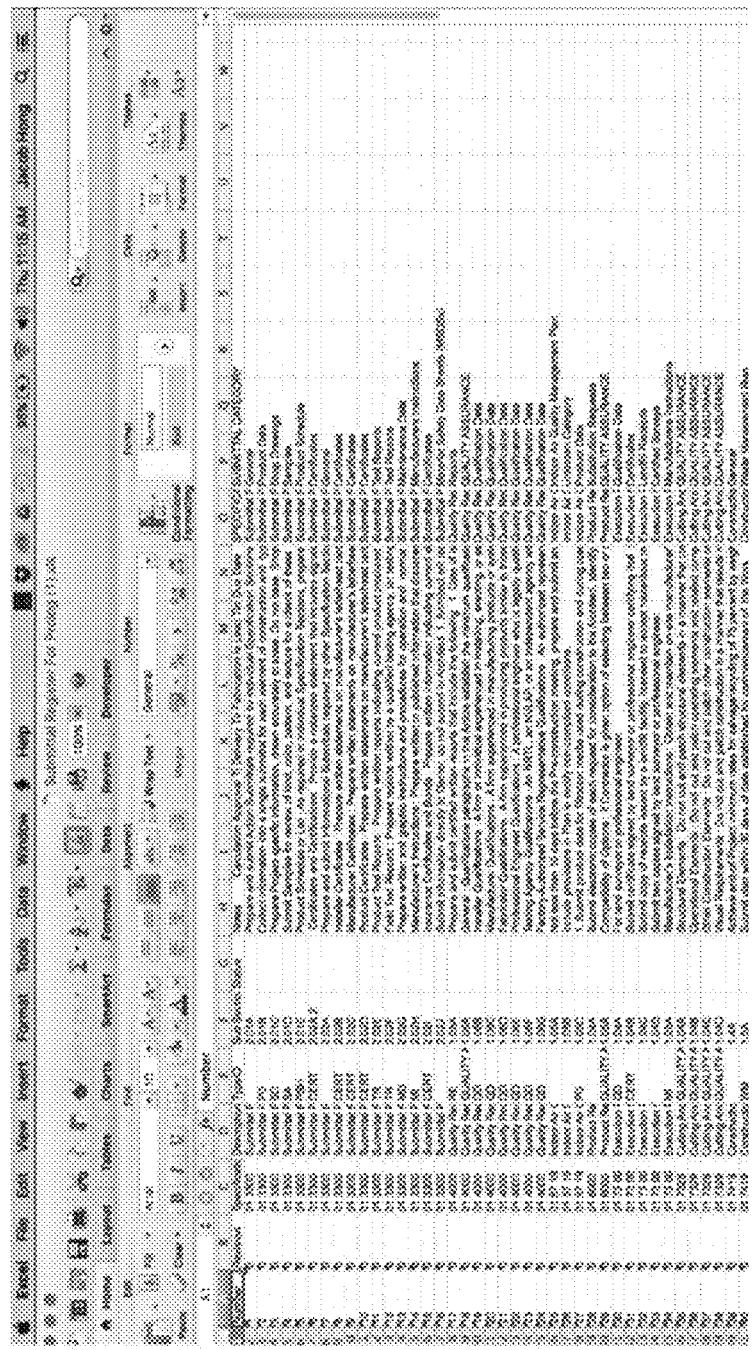
FIG. 62 shows the resulting downloaded formatted information from the selection in FIG. 61.

FIG. 61 shows the selection of a download of selected information for a specification in a spreadsheet format, and the resulting downloaded and formatted information form the selection in FIG. 61 is shown in FIG. 62.

Figure 4:
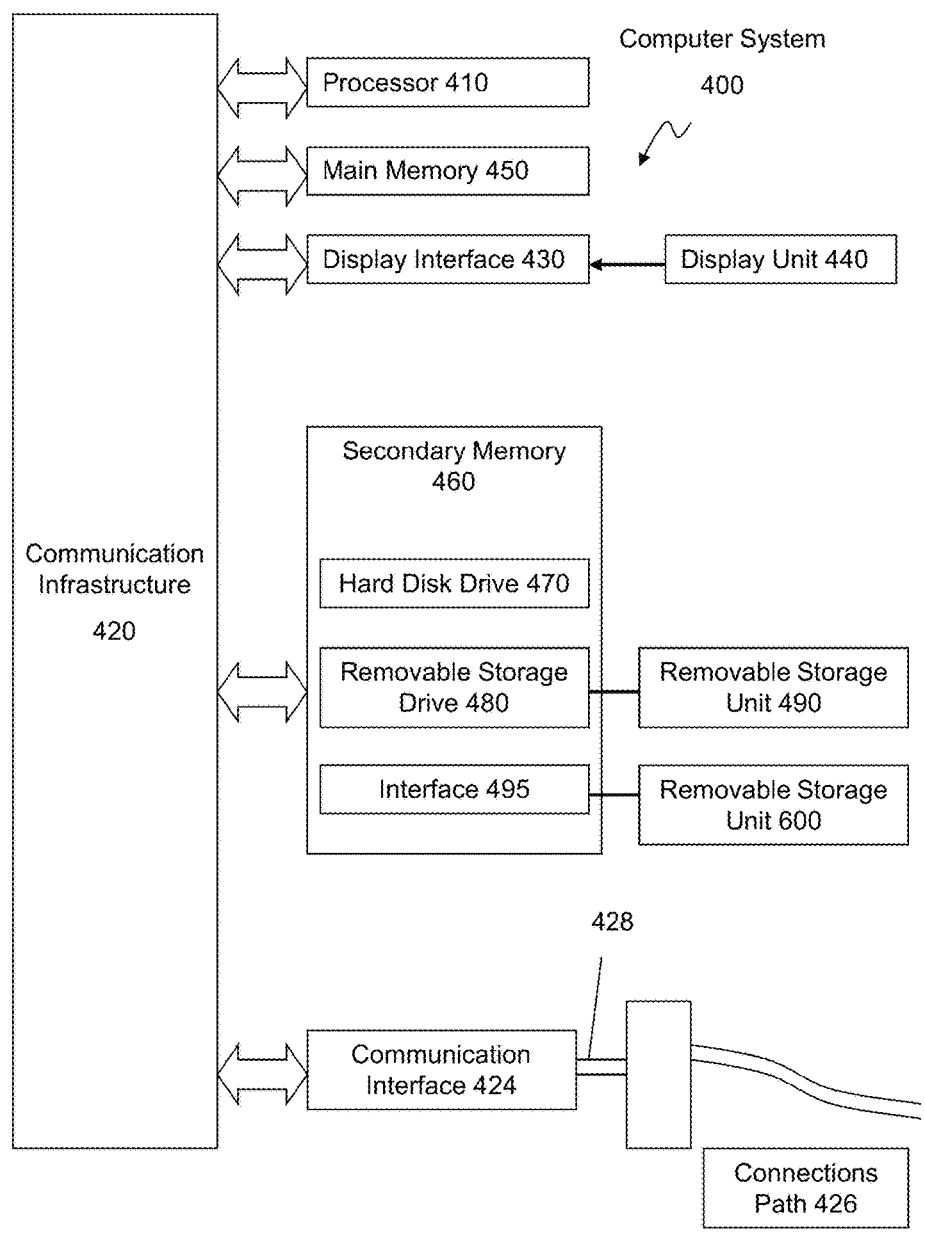
FIG. 4 a system diagram illustrating various example hardware components and other features, for use in accordance with aspects of the present disclosure.
Figure 5:
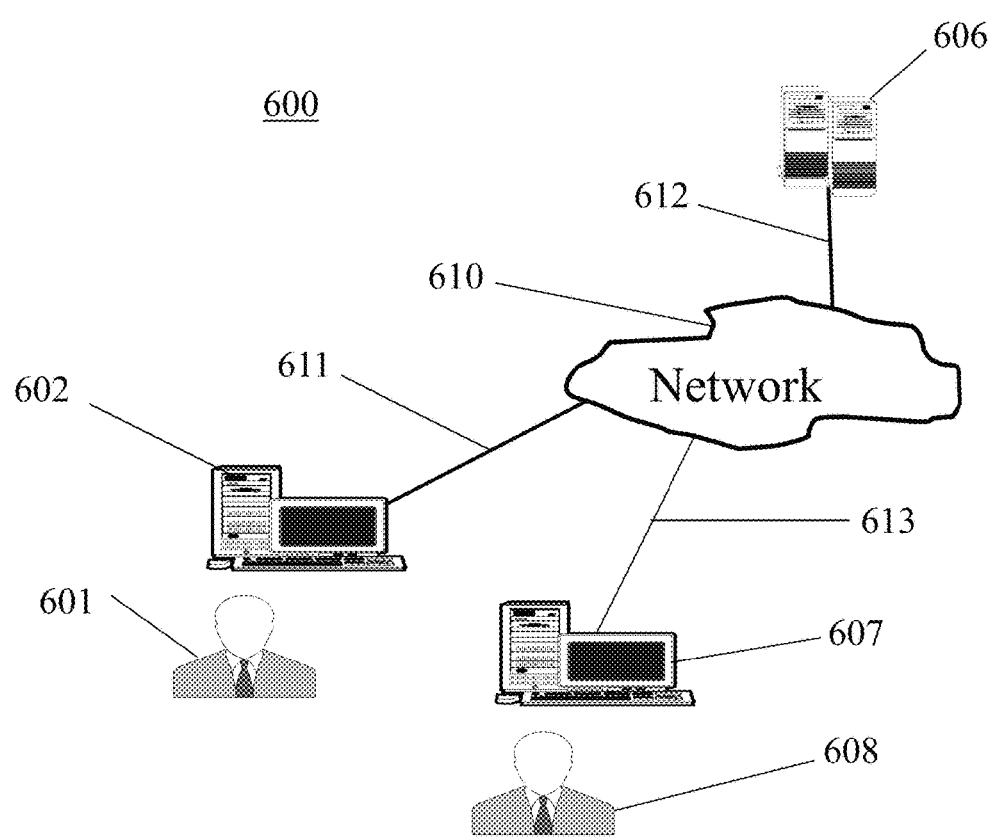
FIG. 5 is a diagram illustrating example aspects of a hardware implementation for a system employing a processing system in accordance with aspects of the present disclosure.
Figure 8:
FIG. 8 shows an example GUI screen for a form for modifying a submittal register, in accordance with aspects of the present disclosure.

FIG. 4 is an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIGS. 1 and/or 2. An example of such a computer system 300 is shown in FIGS. 3 and 5.

In FIG. 4, computer system 400 includes one or more processors, such as processor 404. For example, the processor 404 may be configured for FM modulating and/or PM modulating a local oscillator of a transmitter station. The processor 404 is connected to a communication infrastructure 406 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 400 can include a display interface 402 that forwards graphics, text, and other data from the communication infrastructure 406 (or from a frame buffer not shown) for display on a display unit 430. In an aspect, the display unit 430 may be included in a transmitter station. In another aspect, the display unit 430 may be located remote from the transmitter station and configured to display data and/or measurements associated with the transmitter station. Computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 allows software and data to be transferred between computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428, which may be electronic, electromagnetic, optical or other signals capable of being received by communications interface 424. These signals 428 are provided to communications interface 424 via a communications path (e.g., channel) 426. This path 426 carries signals 428 and may be implemented using wire or cable, fiber optics, a telephone line, a cellular link, wireless communications link, a radio frequency (RF) link and/or other communications channels. In this document, the terms "computer program medium", "computer-readable medium", and "computer usable medium" are used to refer generally to media such as a removable storage drive 480, a hard disk installed in hard disk drive 412, and signals 428. These computer program products provide software to the computer system 400. Aspects presented herein may include such computer program products.

Computer programs (also referred to as computer control logic) are stored in main memory 408 and/or secondary memory 410. Computer programs may also be received via communications interface 424. Such computer programs, when executed, enable the computer system 400 to perform the features presented herein, as discussed herein. In particular, the computer programs, when executed, enable the processor 410 to perform the features presented herein. Accordingly, such computer programs represent controllers of the computer system 400.

In aspects implemented using software, the software may be stored in a computer program product and loaded into computer system 400 using removable storage drive 414, hard drive 412, or communications interface 420. The control logic (software), when executed by the processor 404, causes the processor 404 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

FIG. 5 shows various features of another example computer system 600 for use in conjunction with transmitting, receiving, processing, and otherwise using information communicated in accordance with various methods and features according to aspects of the present disclosure. As shown in FIG. 6, the computer system 600 is used by a user 601 (e.g., a user of the device in accordance with aspects of the present disclosure) to access and/or otherwise use data, such as data relating to generating submittal registers. The data may be input or received, for example, at a terminal 602, such as or included within various components indicated for receiving data described herein.

Data may be transmitted among the terminal 602 and a server or other network device 606 or a remote terminal 607 via a network (e.g., the Internet) 610, and couplings 611, 612, 613. Each terminal 602, 607 may comprise, for example, a PC, minicomputer, mainframe computer, microcomputer, telephone device, PDA, or other device having a processor and input/output capability. The server 606 may comprise, for example, a PC, minicomputer, mainframe computer, microcomputer, or other device having a processor and a repository for data or that is capable of accessing a repository of data. Couplings 611, 612, 613 may include wired, wireless, or fiberoptic links.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

Although example aspects of the present disclosure have now been discussed in accordance with the above advantages, it will be appreciated by one of ordinary skill in the art that these examples are merely illustrative and that numerous variations and/or modifications may be made without departing from the spirit or scope hereof.

What is claimed is:

1. A method for generating a submittal register via a processing device, the submittal register for use in interactive construction planning and specification management, the method comprising:

receiving a first file containing a plurality of construction specification documents for a construction project in a first format;

converting the first file to a first file converted format;

removing conversion errors from the first file in the first file converted format;

applying an algorithm to the first file in the first file converted format to produce a second file;

running a quality control check of the second file;

applying a processing program to the second file;

generating the submittal register for the plurality of construction specification documents based on the applied processing program to the second file, the generated submittal register including a plurality of elements of information for the construction project, the plurality of elements of information including project specification data and at least one drawing image for the construction project;

identifying at least one hyperlink for each of the plurality of elements of information;

automatically associating the at least one hyperlink with each of the plurality of elements of information and with at least one other related one of the plurality of elements of information;

in response to receipt of a selection of any of the at least one hyperlink, providing at least one option to selectively access each of the at least one other related one of the plurality of elements of information;

in response to the access selection, presenting the selected at least one other related one of the plurality of elements of information, wherein the applying a processing program to the second file includes applying an algorithm to identify one or more selected from a group consisting of summary text in the second file, one or more submittal categories for submittal information in the second file, and a submittal description in the second file; and associating at least two selected from a group consisting of the submittal categories, the summary text, and the submittal description with one other, wherein at least one of the associated submittal categories, the summary text, or the submittal description are searchable.

2. The method of claim 1, further includes:
presenting a final submittal register on a screen coupled to the processing device.

3. The method of claim 1, further includes:
producing a printed copy of a final submittal register.

4. The method of claim 1, wherein the first file is received via a web application interface.

5. The method of claim 1, wherein the first file converted format is a text format.

6. The method of claim 1, wherein the second file is a spreadsheet format.

7. The method of claim 1, wherein the first file includes image data, the method further comprising:
identifying words or symbols in the image data; and
associating the identified words or symbols with at least one selected from a group consisting of the words and the symbols.

8. The method of claim 1, wherein applying an algorithm to identify one or more selected from a group consisting of summary text in the second file, one or more submittal categories for submittal information includes:
applying natural language processing.

9. The method of claim 1, further comprising:
receiving a revised version of the first file in the first file format;
converting the revised version of the first file to a first revised file converted format;
removing conversion errors from the first revised file in the first file converted format;
applying an algorithm to the first revised file in the first file converted format to produce a third file;
running a quality control check of the third file;
applying a processing program to the third file;
comparing the third file to the second file to produce a fourth file; and
generating a revised version of the submittal register based on the applied processing program to the fourth file.

10. The method of claim 9, wherein the fourth file includes markers showing changes between the first file and the revised version of the first file.

11. A system for generating a submittal register for use in interactive construction planning and specification management, the system comprising:
a server on a network;
a processor accessible via the server; and
a database accessible via the processor;
the server, processor, and database being interoperably configured to:
receive a first file containing a plurality of construction specification documents for a construction project in a first format;
convert the first file to a first file converted format;
remove conversion errors from the first file in the first file converted format;
apply an algorithm to the first file in the first file converted format to produce a second file;
run a quality control check of the second file;
apply a processing program to the second file;
generate the submittal register for the plurality of construction specification documents based on the applied processing program to the second file, the generated submittal register including a plurality of elements of information for the construction project, the plurality of elements of information including project specification data and at least one drawing image for the construction project;
identify at least one hyperlink for each of the plurality of elements of information;
automatically associating the at least one hyperlink with each of the plurality of elements of information and with at least one other related one of the plurality of elements of information;
in response to receipt of a selection of any of the at least one hyperlink, providing at least one option to selectively access each of the at least one other related one of the plurality of elements of information;
in response to the access selection, presenting the selected at least one other related one of the plurality of elements of information,
wherein the applying a processing program to the second file includes applying an algorithm to identify one or more selected from a group consisting of summary text in the second file, one or more submittal categories for submittal information in the second file, and a submittal description in the second file; and
associate at least two selected from a group consisting of the submittal categories, the summary text, and the submittal description with one other,
wherein at least one of the associated submittal categories, the summary text, or the submittal description are searchable.

12. The system of claim 11, wherein the first file includes image data, the server, processor, and database being interoperably configured to further:
identify words or symbols in the image data; and
associate the identified words or symbols with at least one selected from a group consisting of the words and the symbols.

13. The system of claim 11, wherein applying an algorithm to identify one or more selected from a group consisting of summary text in the second file, one or more submittal categories for submittal information includes:
applying natural language processing.

14. The system of claim 11, wherein the first file includes image data, the server, processor, and database being interoperably configured to further:
receive a revised version of the first file in the first file format;
convert the revised version of the first file to a first revised file converted format;
remove conversion errors from the first revised file in the first file converted format;
apply an algorithm to the first revised file in the first file converted format to produce a third file;
run a quality control check of the third file;
apply a processing program to the third file;

compare the third file to the second file to produce a fourth file; and generate a revised version of the submittal register based on the applied processing program to the fourth file.

15. The system of claim 14, wherein the fourth file includes markers showing changes between the first file and the revised version of the first file.

16. A computer program product comprising a non-transitory computer usable medium having control logic stored therein to generate a submittal register for use in interactive construction planning and specification management, the control logic causing the computer to:

receive a first file containing a plurality of construction specification documents for a construction project in a first format;

convert the first file to a first file converted format;

remove conversion errors from the first file in the first file converted format;

apply an algorithm to the first file in the first file converted format to produce a second file;

run a quality control check of the second file;

apply a processing program to the second file;

generate the submittal register for the plurality of construction specification documents based on the applied processing program to the second file, the generated submittal register including a plurality of elements of information for the construction project, the plurality of elements of information including project specification data and at least one drawing image for the construction project;

identify at least one hyperlink for each of the plurality of elements of information;

automatically associate the at least one hyperlink with each of the plurality of elements of information and with at least one other related one of the plurality of elements of information;

in response to receipt of a selection of any of the at least one hyperlink, provide at least one option to selectively access each of the at least one other related one of the plurality of elements of information;

in response to the access selection, present the selected at least one other related one of the plurality of elements of information, wherein the applying a processing program to the second file includes applying an algorithm to identify one or more selected from a group consisting of summary text in the second file, one or more submittal categories for submittal information in the second file, and a submittal description in the second file; and associate at least two selected from a group consisting of the submittal categories, the summary text, and the submittal description with one other, wherein at least one of the associated submittal categories, the summary text, or the submittal description are searchable.

* * * * *

UNITED STATES PATENT AND TRADEMARK OFFICE
CERTIFICATE OF CORRECTION

PATENT NO. : 10,102,209 B2
APPLICATION NO. : 15/900302
DATED : October 16, 2018
INVENTOR(S) : Sunil Dorairajan et al.

It is certified that error appears in the above-identified patent and that said Letters Patent is hereby corrected as shown below:

On the Title Page

(73) Assignee: "PYPY INC, Chantilly, VA (US)" should be "PYPE INC, Chantilly, VA (US)"

Signed and Sealed this
Fourth Day of December, 2018

Andrei Iancu
*Director of the United States Patent and Trademark Office*